US010469639B2

(12) United States Patent
Hosoda

(10) Patent No.: US 10,469,639 B2
(45) Date of Patent: Nov. 5, 2019

(54) MOBILE TERMINAL COMPRISING A DISPLAY ROTABLE ABOUT A CASING

(71) Applicant: SONY CORPORATION, Tokyo (JP)

(72) Inventor: Yasuhide Hosoda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/990,120

(22) Filed: May 25, 2018

(65) Prior Publication Data

US 2018/0278732 A1 Sep. 27, 2018

Related U.S. Application Data

(63) Continuation of application No. 15/406,222, filed on Jan. 13, 2017, now Pat. No. 10,036,680, which is a
(Continued)

(30) Foreign Application Priority Data

Oct. 17, 2012 (JP) ................. 2012-229888

(51) Int. Cl.
*H04M 1/00* (2006.01)
*H04M 1/02* (2006.01)
(Continued)

(52) U.S. Cl.
CPC ........ *H04M 1/0266* (2013.01); *G02B 27/017* (2013.01); *G06F 1/1626* (2013.01);
(Continued)

(58) Field of Classification Search
CPC ............. H04M 1/0216; H04M 1/0247; H04M 1/0268; H04M 2250/16; H04M 1/022; H04M 1/0227; H04M 1/0237; H04M 1/72522; H04M 2250/22; H04M 1/0214; H04M 1/0233; H04M 1/0245; H04M 1/0266; H04M 1/11; H04M 1/236;
(Continued)

(56) References Cited

U.S. PATENT DOCUMENTS 5,590,417 A 12/1996 Rydbeck
6,424,843 B1 * 7/2002 Reitmaa ............. H04M 1/0208
379/433.04
(Continued)

FOREIGN PATENT DOCUMENTS

CN 1910890 A 2/2007
CN 101512632 A 8/2009
(Continued)

OTHER PUBLICATIONS

Extended European Search Report dated Nov. 2, 2016, in EP Patent Application No. 13847294.9.
(Continued)

*Primary Examiner* — Ronald Eisner
(74) *Attorney, Agent, or Firm* — Xsensus, LLP

(57) ABSTRACT

There is provided a mobile terminal including a casing that includes an audio output unit that outputs audio, and a transmissive display unit provided rotatable about the casing. The transmissive display unit is disposable in a plane intersecting a principal face of the casing while the audio output unit is outputting audio.

16 Claims, 42 Drawing Sheets

Related U.S. Application Data continuation of application No. 14/419,687, filed as application No. PCT/JP2013/075006 on Sep. 17, 2013, now Pat. No. 9,609,097.

(51) Int. Cl.
*H04M 1/725* (2006.01)
*G02B 27/01* (2006.01)
*G06F 1/16* (2006.01)
*H04M 1/11* (2006.01)
*H04M 1/23* (2006.01)

(52) U.S. Cl.
CPC .......... *G06F 1/1649* (2013.01); *G06F 1/1681* (2013.01); *H04M 1/0214* (2013.01); *H04M 1/0233* (2013.01); *H04M 1/11* (2013.01); *H04M 1/72519* (2013.01); *H05K 999/99* (2013.01); *H04M 1/0245* (2013.01); *H04M 1/236* (2013.01); *H04M 2250/16* (2013.01)

(58) Field of Classification Search
CPC . H04M 1/72519; H04W 12/02; H04W 12/06; H04W 4/008; H04W 4/02; G02B 27/017; G06F 1/1626; G06F 1/1649; G06F 1/1681; H05K 999/99
See application file for complete search history.

(56) References Cited

U.S. PATENT DOCUMENTS

| | | | |
|---|---|---|---|
| 7,660,904 B2 | 2/2010 | Qureshi | |
| 2002/0058531 A1 | 5/2002 | Terasaki et al. | |
| 2003/0169212 A1 | 9/2003 | Nishihara | |
| 2004/0072589 A1 | 4/2004 | Hamamura | |
| 2004/0214610 A1 | 10/2004 | Tanemura | |
| 2005/0111417 A1 | 5/2005 | Ford | |
| 2007/0238493 A1 | 10/2007 | Richardson et al. | |
| 2008/0047413 A1* | 2/2008 | Laycock | G09B 5/12 84/477 R |
| 2009/0077488 A1* | 3/2009 | Ording | G06F 3/0485 715/784 |
| 2010/0077341 A1* | 3/2010 | Chen | G06F 1/1626 715/782 |
| 2010/0321369 A1* | 12/2010 | Cho | H05B 41/2827 345/211 |
| 2011/0216170 A1* | 9/2011 | Daiku | H04N 13/04 348/51 |
| 2011/0289108 A1 | 11/2011 | Bhandari | |
| 2012/0105428 A1 | 5/2012 | Fleck | |
| 2012/0105487 A1* | 5/2012 | Son | G06F 3/0487 345/671 |
| 2012/0158514 A1 | 6/2012 | Aldrey | |
| 2014/0051399 A1* | 2/2014 | Walker | H04L 65/1083 455/412.1 |
| 2015/0145753 A1 | 5/2015 | Sako et al. | |

FOREIGN PATENT DOCUMENTS

| | | |
|---|---|---|
| GB | 2409598 | 6/2005 |
| JP | 10-155141 A | 6/1998 |
| JP | 11-32379 A | 2/1999 |
| JP | 11-234637 A | 8/1999 |
| JP | 2002-508893 A | 3/2002 |
| JP | 2002-297645 A | 10/2002 |
| JP | 2004-15519 A | 1/2004 |
| JP | 2010-183378 A | 8/2010 |
| WO | WO 98/48548 | 10/1998 |

OTHER PUBLICATIONS

Partial European Search Report dated Jul. 22, 2016 in in corresponding application EP 13847294.9.
International Search Report dated Nov. 26, 2013 in PCT/JP2013/075006.
Japanese Office Action dated Sep. 5, 2017 in Patent Application No. 2014-542002.
Combined Chinese Office Action and Search Report dated Jan. 4, 2017 in Chinese Patent Application No. 201380053154.0 (with English language translation).

* cited by examiner

FIG. 4
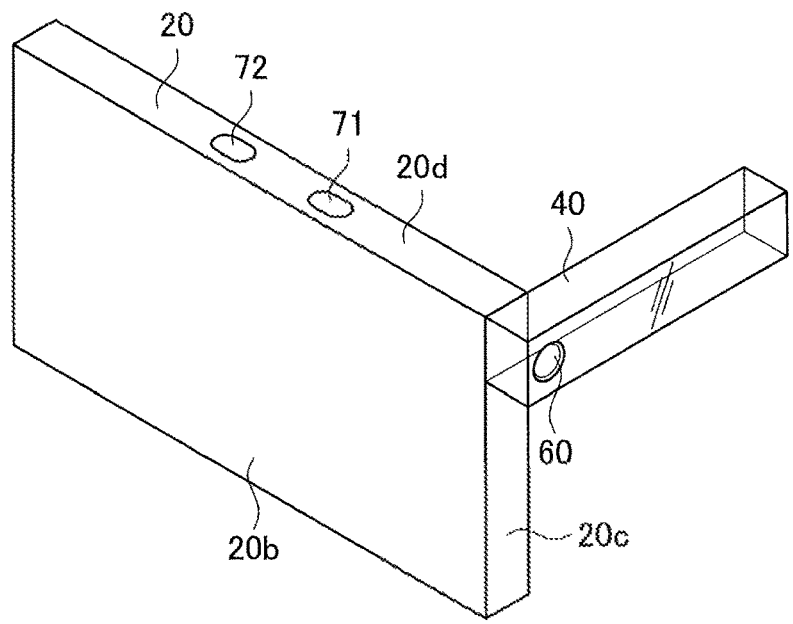
(a)
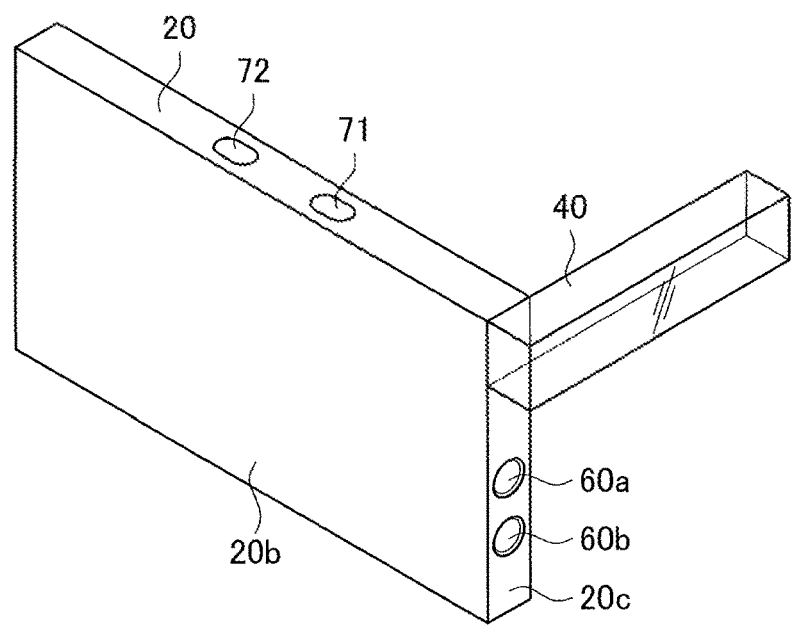
(b)

FIG. 5
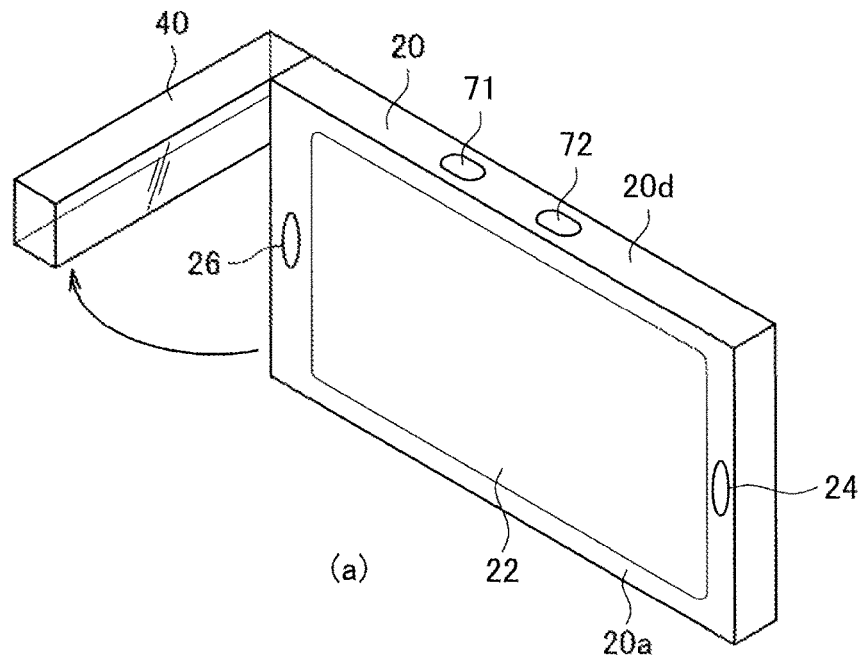
(a)
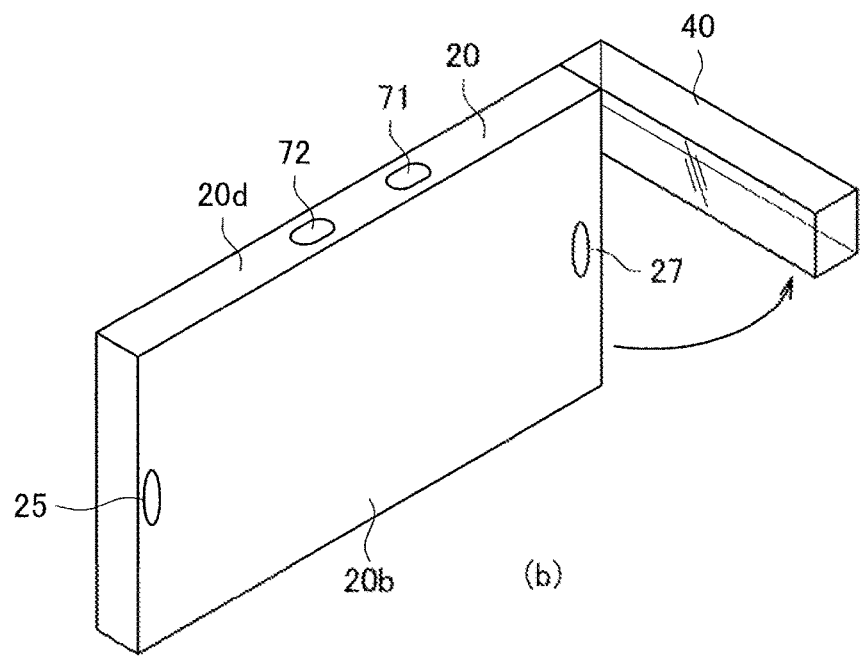
(b)

FIG. 6
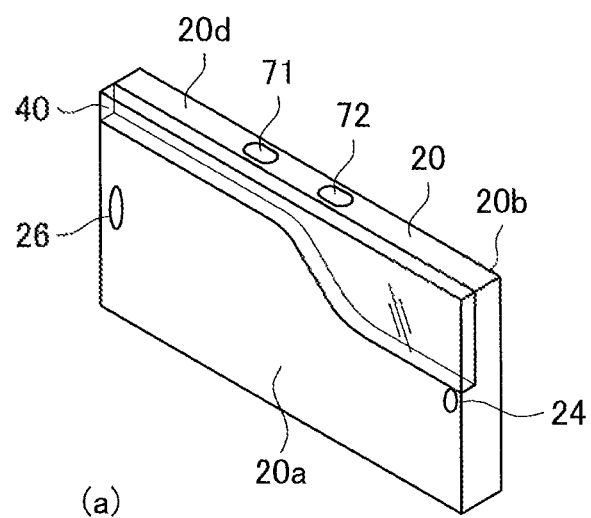
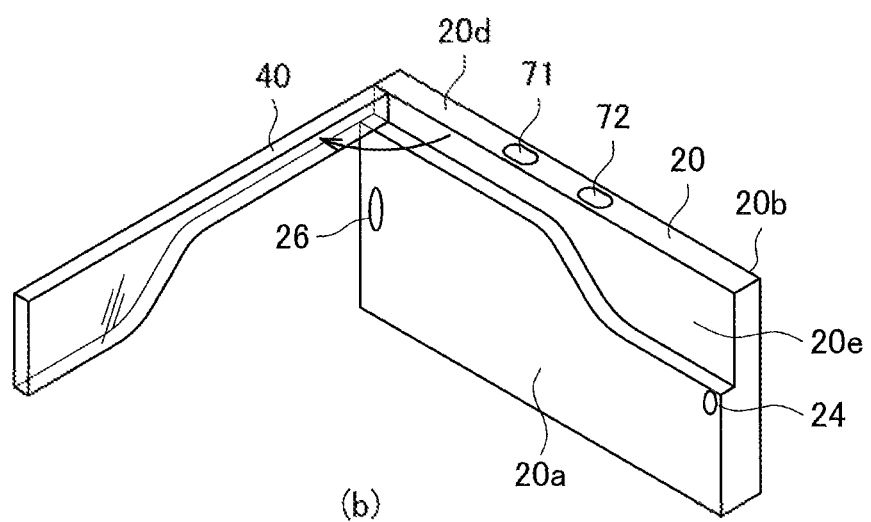

FIG. 7
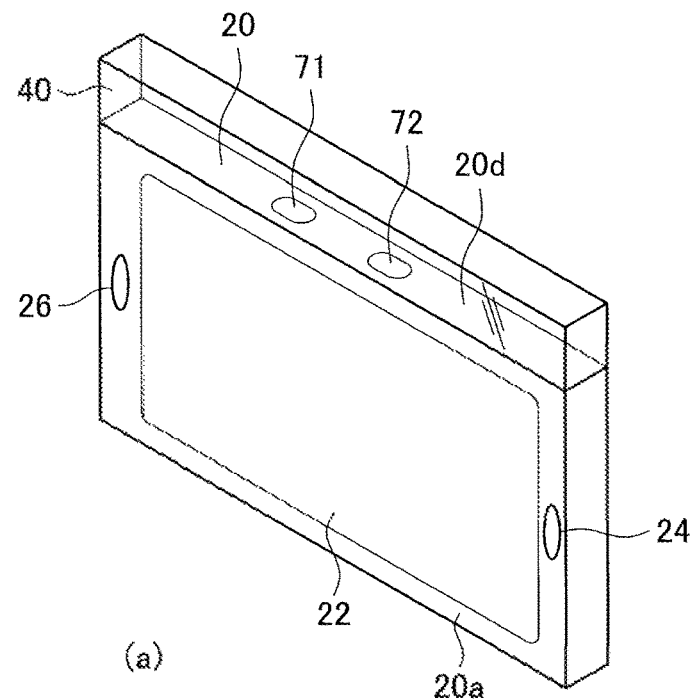
(a)
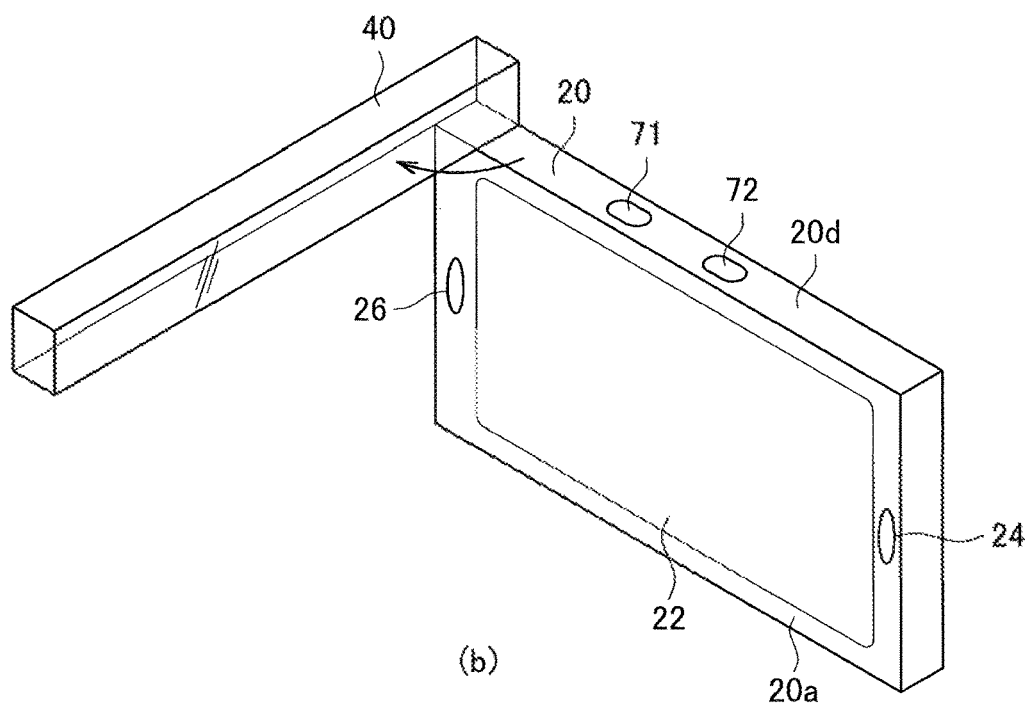
(b)

FIG. 9
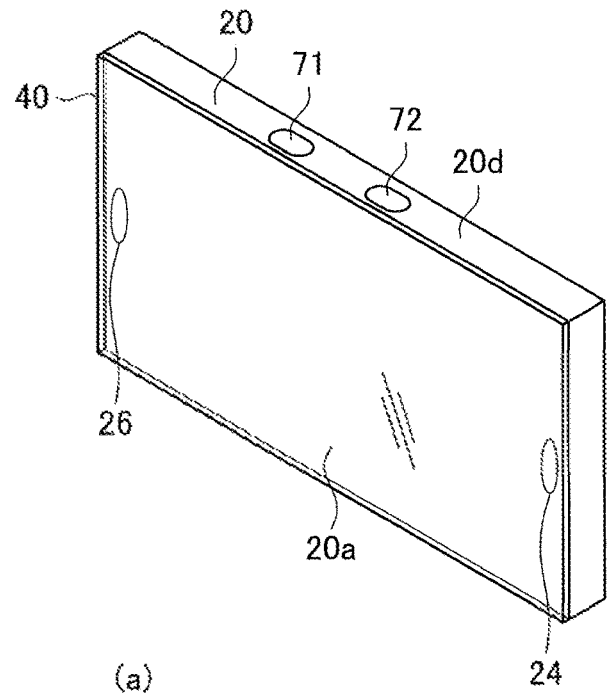
(a)
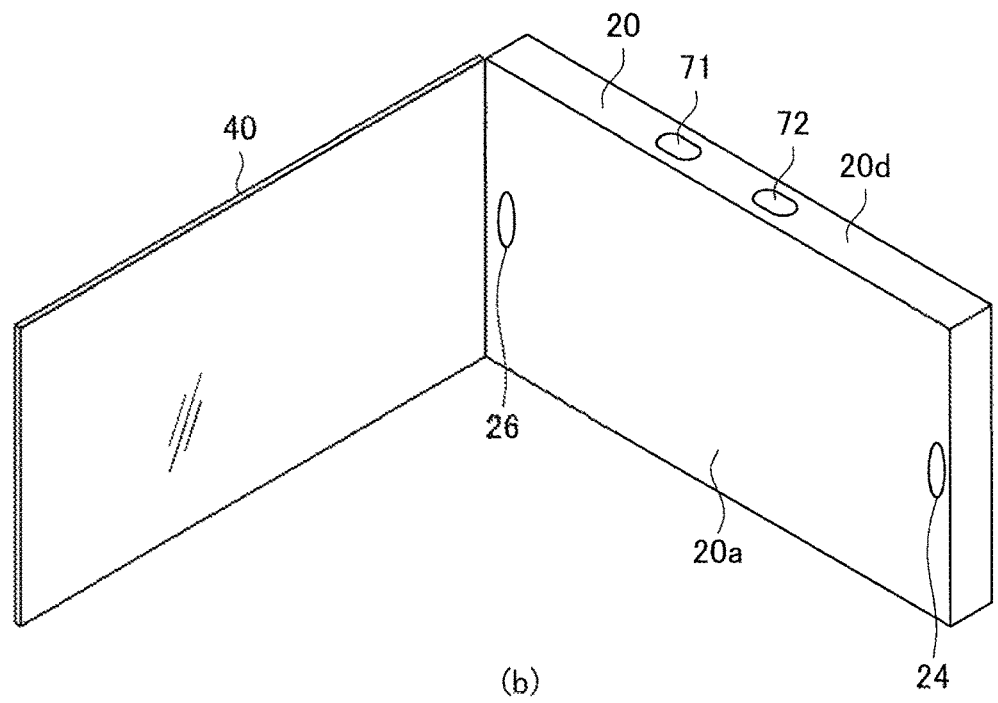
(b)

FIG. 10
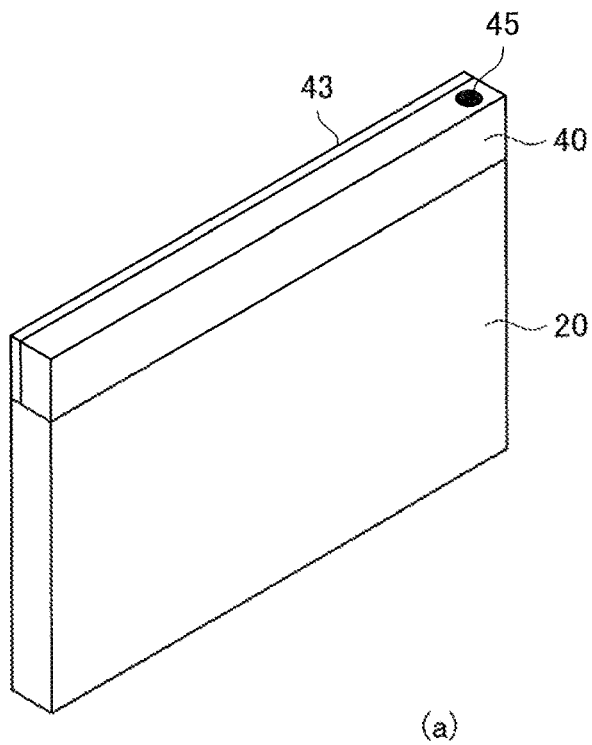
(a)
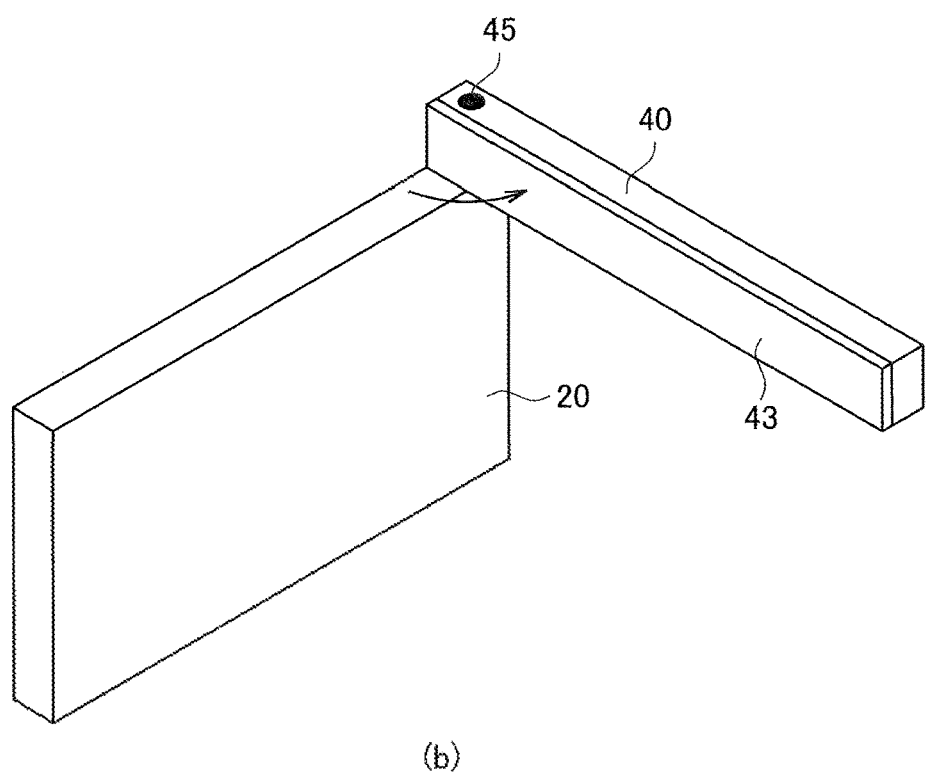
(b)

FIG. 11
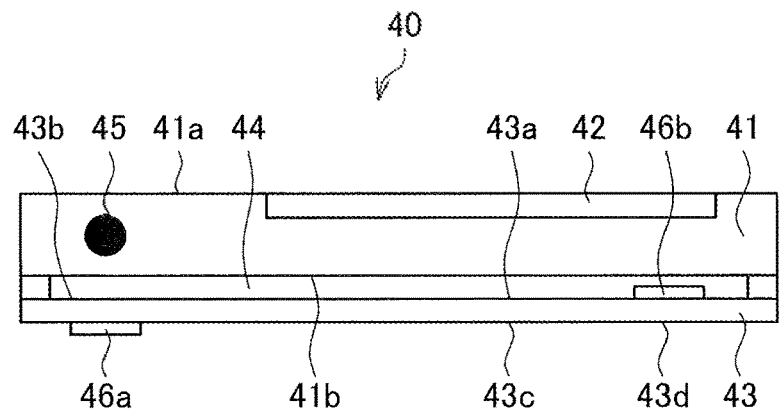
(a)
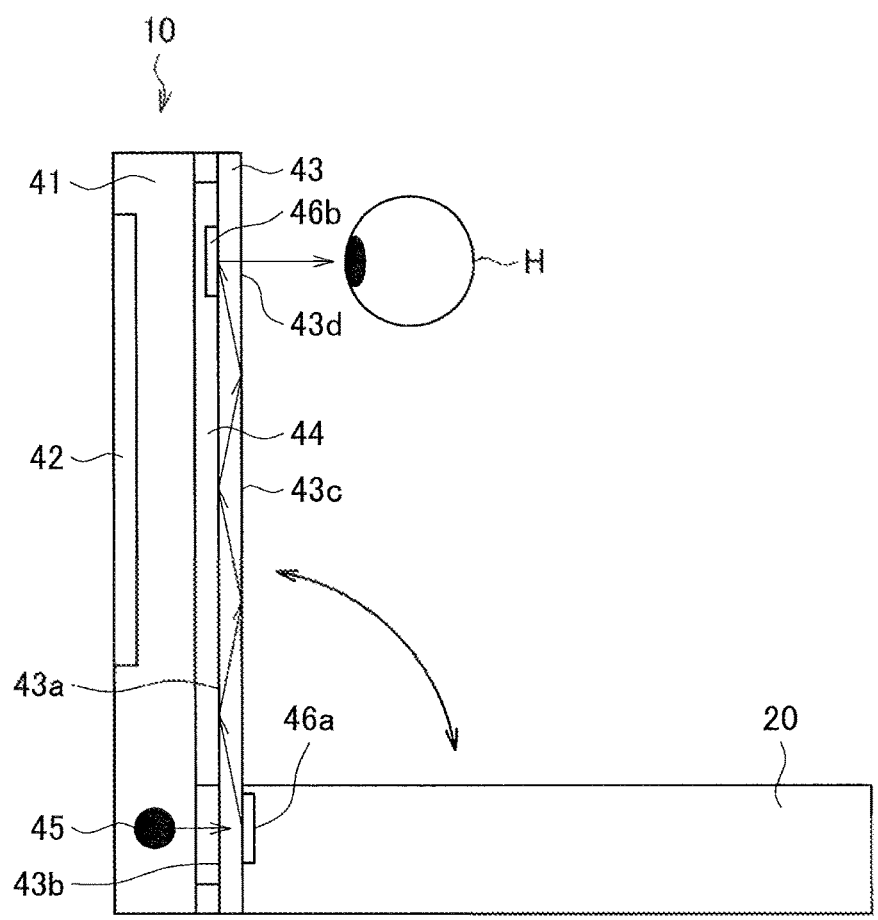
(b)

FIG. 14
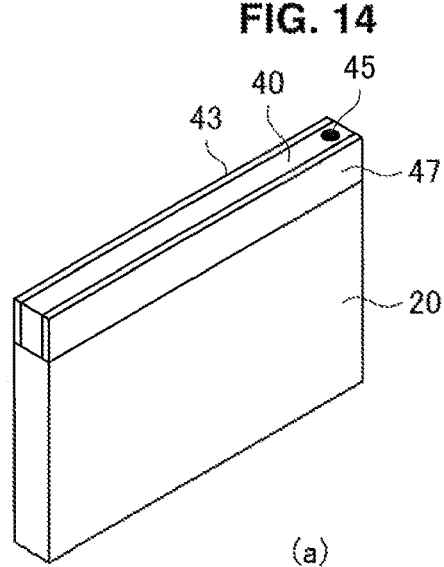
(a)
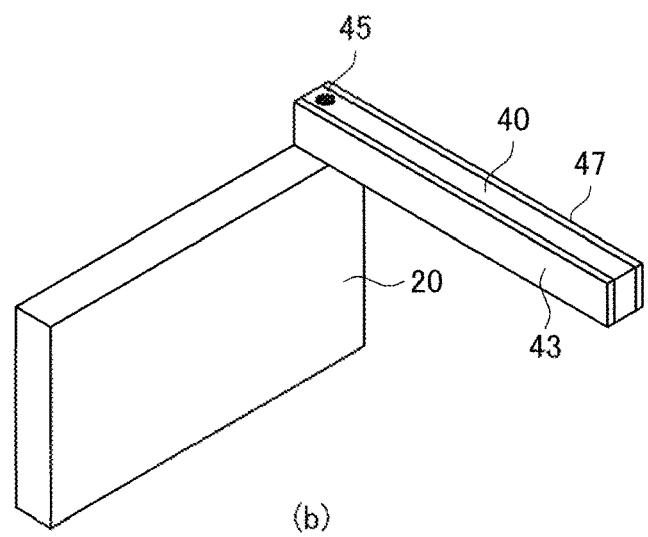
(b)
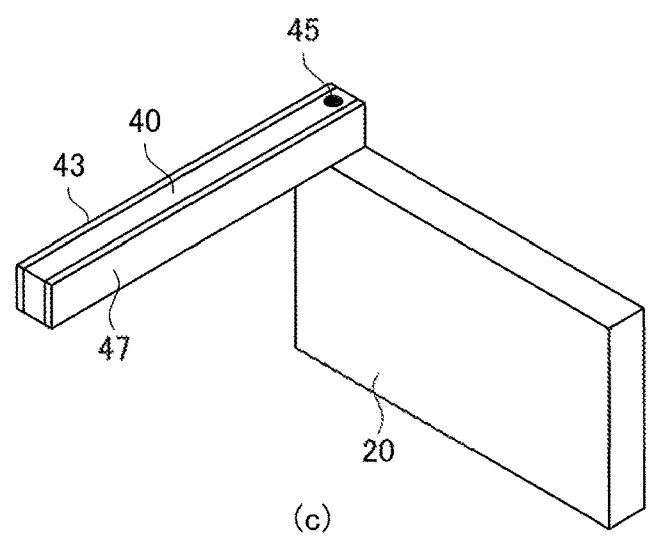
(c)

FIG. 20
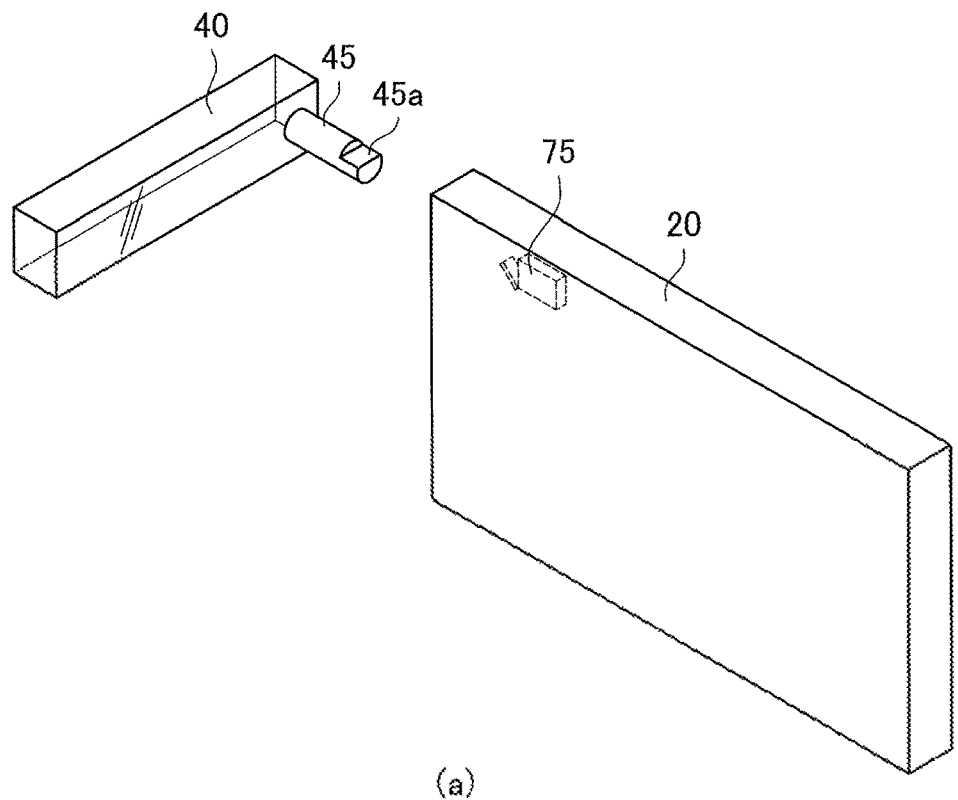
(a)
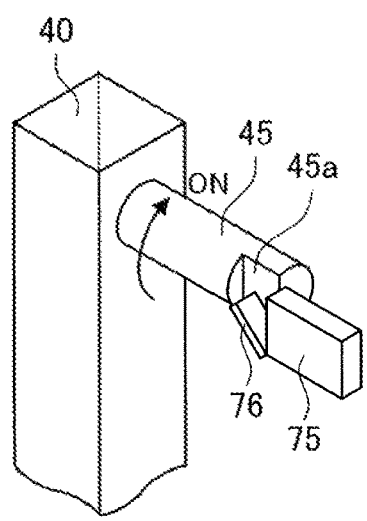
(b)

FIG. 25
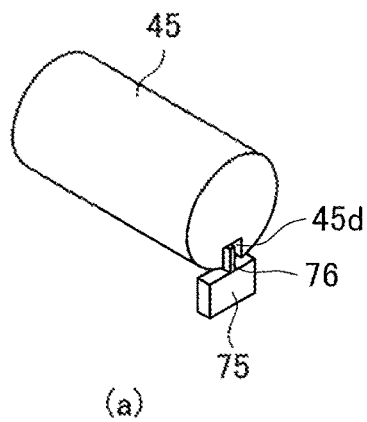
(a)
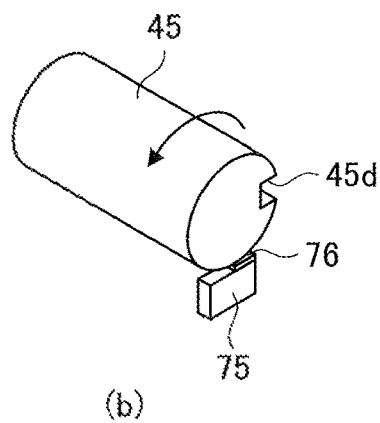
(b)
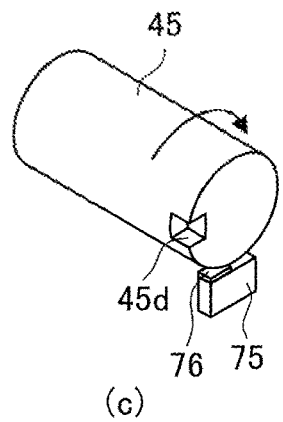
(c)

FIG. 41
(a) 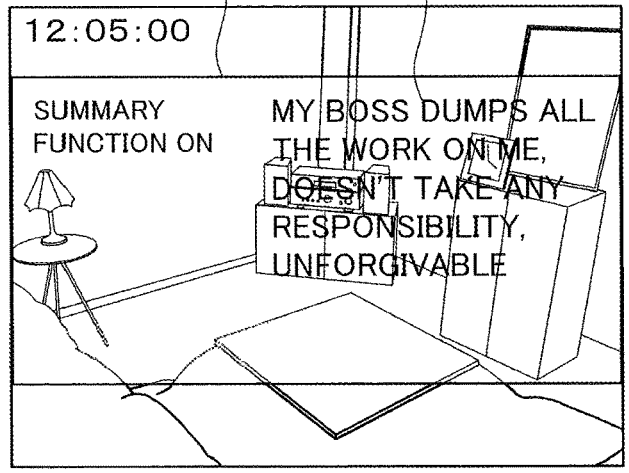
(b) 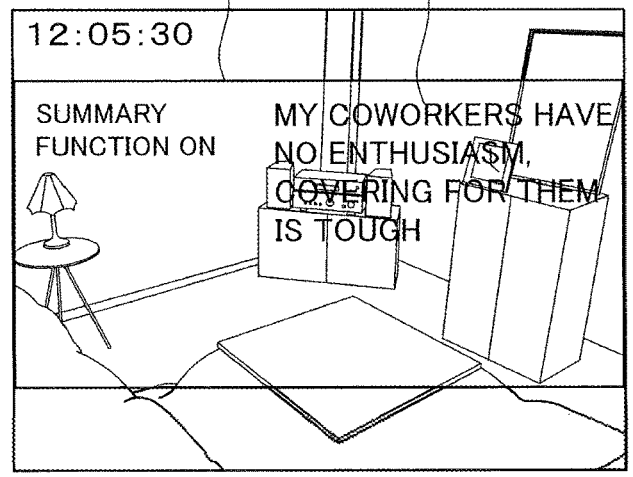
(c) 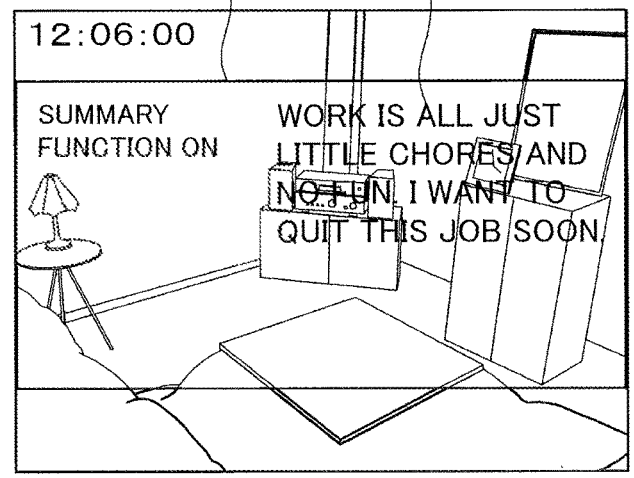

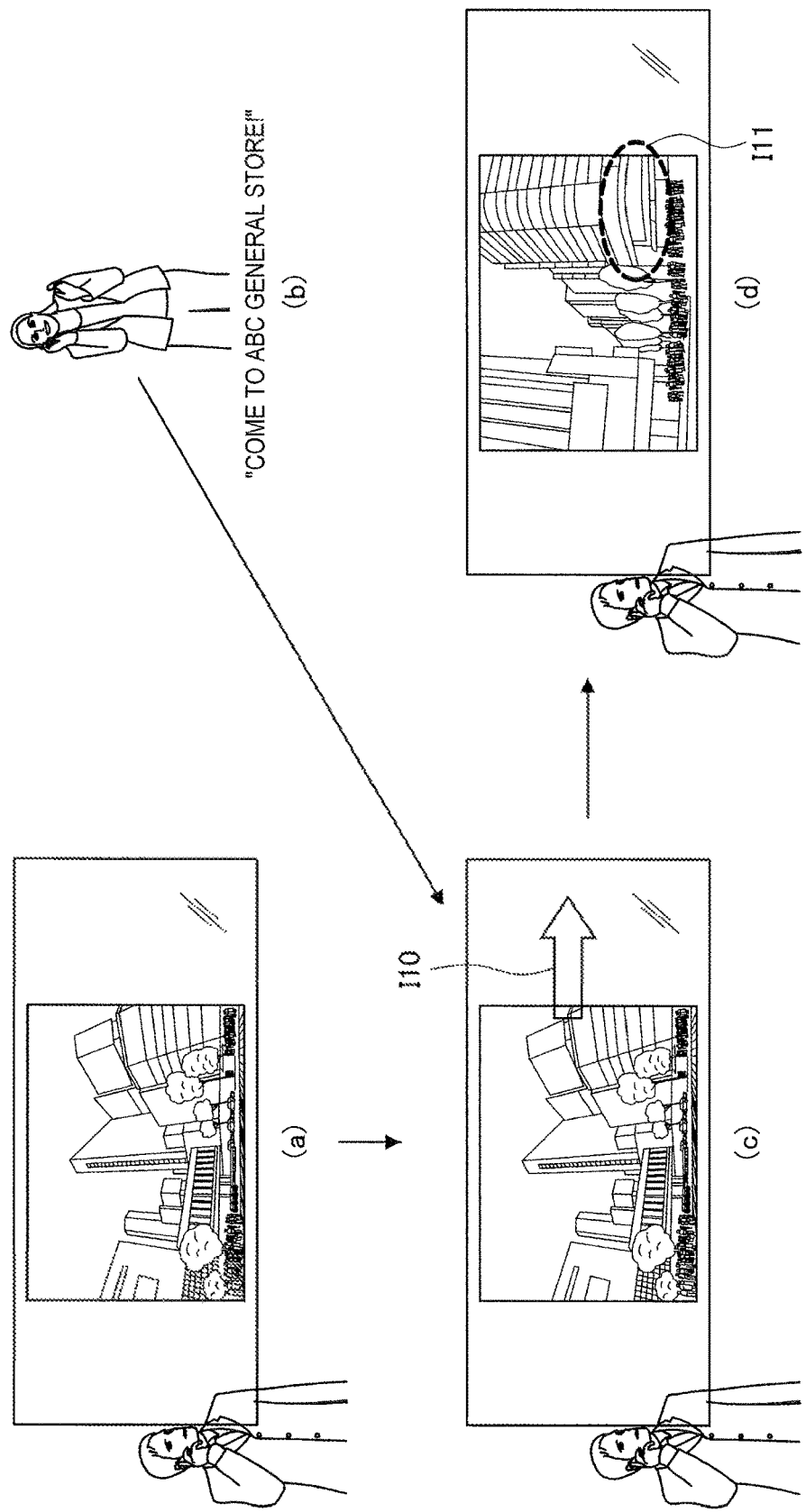

MOBILE TERMINAL COMPRISING A DISPLAY ROTABLE ABOUT A CASING

CROSS-REFERENCE TO RELATED APPLICATIONS

This application is a continuation application of U.S. application Ser. No. 15/406,222 filed Jan. 13, 2017, which is a continuation application of U.S. application Ser. No. 14/419,687 filed Feb. 5, 2015, now U.S. Pat. No. 9,609,097 issued on Mar. 28, 2017, which is the U.S. National Stage application of PCT International Application No. PCT/JP13/75006 filed Sep. 17, 2013, which claims priority to Japanese Application No. 2012-229888 filed Oct. 17, 2012. U.S. application Ser. Nos. 15/406,222 and 14/419,687 are herein incorporated by reference in their entirety for all purposes.

TECHNICAL FIELD

The present disclosure relates to a mobile terminal equipped with a transmissive display unit.

BACKGROUND ART

Mobile terminals are proliferating in the form of various devices such as mobile phones and smartphones. Such mobile terminals include an audio output unit that outputs audio during a phone call and the like. In addition, a mobile terminal that displays an image or the like on a display unit while audio is being output has been proposed from the perspective of improving convenience and other factors (see Patent Literature 1).

Also, a mobile terminal that includes a portable see-through transmissive display unit has been proposed (see Patent Literature 2). Patent Literature 2 discloses technology that controls the display surface of the transmissive display unit in a see-through state when taking a photograph with a camera unit.

CITATION LIST

Patent Literature

Patent Literature 1: JP H11-234637A
Patent Literature 2: JP 2010-183378A

SUMMARY OF INVENTION

Technical Problem

Meanwhile, there is demand for a mobile terminal to present a display on a transmissive display unit while audio is being output. However, display by a transmissive display unit while audio is being output has not been fully investigated thus far.

Accordingly, the present disclosure proposes a mobile terminal that enables a user to suitably perceive a display by a transmissive display unit while audio is being output by the mobile terminal.

Solution to Problem

According to the present disclosure, there is provided a mobile terminal equipped with a casing that includes an audio output unit that outputs audio, and a transmissive display unit provided rotatable about the casing, wherein the transmissive display unit is disposable in a plane intersecting a principal face of the casing while the audio output unit is outputting audio.

According to such a mobile terminal, since the transmissive display unit is disposable in a plane intersecting a principal face of the casing while the audio output unit is outputting audio, the transmissive display unit is positioned at an easy-to-see position while the user is listening to audio being output by placing the mobile terminal against his or her ear, for example, and thus the user is able to suitably grasp the display of the transmissive display unit.

Advantageous Effects of Invention

According to the present disclosure as described above, a user becomes able to suitably perceive a display by a transmissive display unit while audio is being output by a mobile terminal.

BRIEF DESCRIPTION OF DRAWINGS

FIG. 4 is an example illustrating a camera provided on the mobile terminal 10.

FIG. 5 is a diagram illustrating an example of two open states of the transmissive display unit 40.

FIG. 6 is a diagram illustrating a second practical example of the exterior configuration of the mobile terminal 10.

FIG. 7 is a diagram illustrating a third practical example of the exterior configuration of the mobile terminal 10.

FIG. 9 is a diagram illustrating a fourth practical example of the exterior configuration of the mobile terminal 10.

FIG. 10 is a diagram illustrating an exterior configuration of the mobile terminal 10 according to a first display method.

FIG. 11 is a schematic diagram illustrating an internal configuration of the transmissive display unit 40 and a light beam propagation path according to the first display method.

FIG. 14 is a diagram illustrating an example of an exterior configuration of the mobile terminal 10 according to a third modification of the first display method.

FIG. 20 is a diagram illustrating a first practical example of a rotation detecting mechanism of the transmissive display unit 40.

FIG. 25 is a diagram illustrating a fifth practical example of a rotation detecting mechanism of the transmissive display unit 40.

FIG. 41 is a diagram illustrating an example display of the transmissive display unit 40 during a process of displaying a summary of a talk with a person on the phone.

FIG. 45 is an explanatory diagram for explaining a flow of a process of displaying navigation information based on a keyword extracted from speech by a person on the phone.

DESCRIPTION OF EMBODIMENTS

Figure 1:
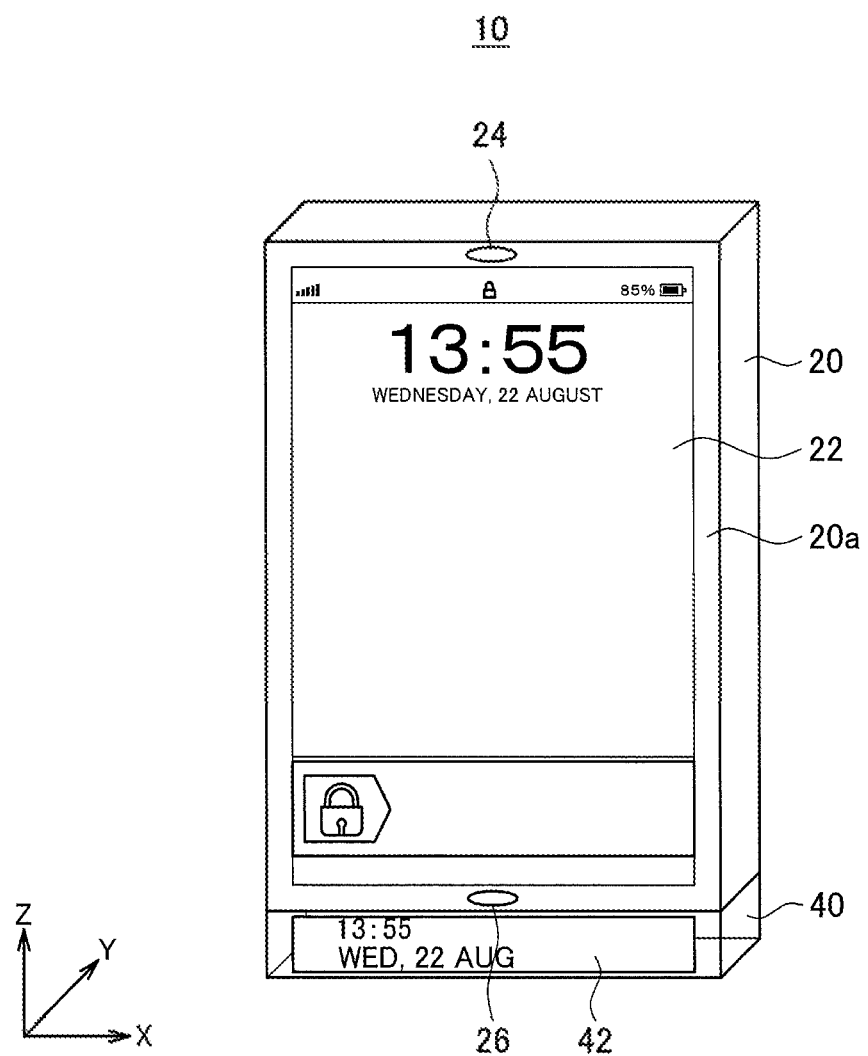
FIG. 1 is a front view illustrating an example of a configuration of a mobile terminal 10 according to the present embodiment.

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Hereinafter, the description will proceed in the following order.

1. Exemplary exterior configuration of mobile terminal
   1-1. First practical example of exterior configuration
   1-2. Second practical example of exterior configuration
   1-3. Third practical example of exterior configuration
   1-4. Fourth practical example of exterior configuration
2. Display method of transmissive display unit
   2-1. First display method
   2-2. Second display method
   2-3. Third display method
3. Rotation detecting mechanism of transmissive display unit
   3-1. First practical example of rotation detecting mechanism of transmissive display unit
   3-2. Second practical example of rotation detecting mechanism of transmissive display unit
   3-3. Third practical example of rotation detecting mechanism of transmissive display unit
   3-4. Fourth practical example of rotation detecting mechanism of transmissive display unit
   3-5. Fifth practical example of rotation detecting mechanism of transmissive display unit
4. Exemplary internal configuration of mobile terminal
5. Display process by transmissive display unit
   5-1. Display of related information by extracting topic from conversation during phone call
   5-2. Display of related information related to TV screen being viewed at the same time
   5-3. Process of automatically displaying summary of talk with other person
   5-4. Process of displaying navigation information based on gesture by person on the phone
   5-5. Process of displaying navigation information based on keyword extracted from speech 6. Conclusion <1. Exemplary Exterior Configuration of Mobile Terminal>

A mobile terminal according to an exemplary embodiment may be a mobile phone or smartphone that includes a telephony function, for example. Hereinafter, four practical examples will be given as exemplary exterior configurations of a mobile terminal.

(1-1. First Practical Example of Exterior Configuration)

FIG. 1 is a front view illustrating an example of a configuration of a mobile terminal 10 according to the present embodiment. As illustrated in FIG. 1, the mobile terminal 10 includes a casing 20 and a transmissive display unit 40. The transmissive display unit 40 is coupled to the casing 20 by a hinge unit 45, and is movable about the hinge unit 45.

The casing 20 has an approximate rectangular cuboid shape. The casing 20 includes a touch panel 22, a speaker 24 which is an example of an audio output unit, and a microphone 26 on a front face 20a.

The touch panel 22 displays information such as text, graphics, and images, and additionally detects various operations performed on the touch panel 22 using a finger or the like. The touch panel 22 includes a display unit and a touch sensor laid over the display unit. The display unit is made up of a device such as a liquid crystal display or an organic EL panel, for example, and displays information such as text, graphics, and images. The touch sensor implements a pressure-sensitive or capacitive detection method, for example, and detects various operations performed on the touch panel 22 using a finger, along with the position on the touch panel 22 where an operation was performed.

The speaker 24 outputs audio. For example, the speaker 24 outputs speech from another person during a phone call. The microphone 26 picks up audio. For example, the microphone 26 converts picked-up speech from the user of the mobile terminal 10 into an electrical signal. Note that the speaker 24 and the microphone 26 correspond to a telephony unit that makes a phone call.

The transmissive display unit 40 is a display unit made up of a transparent member. The transmissive display unit 40 is rotatably provided with respect to the casing 20. The width (length in the X direction of FIG. 1) and thickness (length in the Y direction of FIG. 1) of the transmissive display unit 40 are the same as the width and thickness of the casing 20. In the present embodiment, the transmissive display unit 40 contacts the casing 20 in the lengthwise direction of the mobile terminal 10.

The transmissive display unit 40 displays information such as text, graphics, and images. The transmissive display unit 40 includes a light guide unit for guiding image light displayed by a display element to the user's eye. Consequently, when the transmissive display unit 40 is positioned in front of the eye, the user is able to view an image displayed by the display element. Note that the display mechanism of the transmissive display unit 40 will be later discussed in detail.

Figure 2:
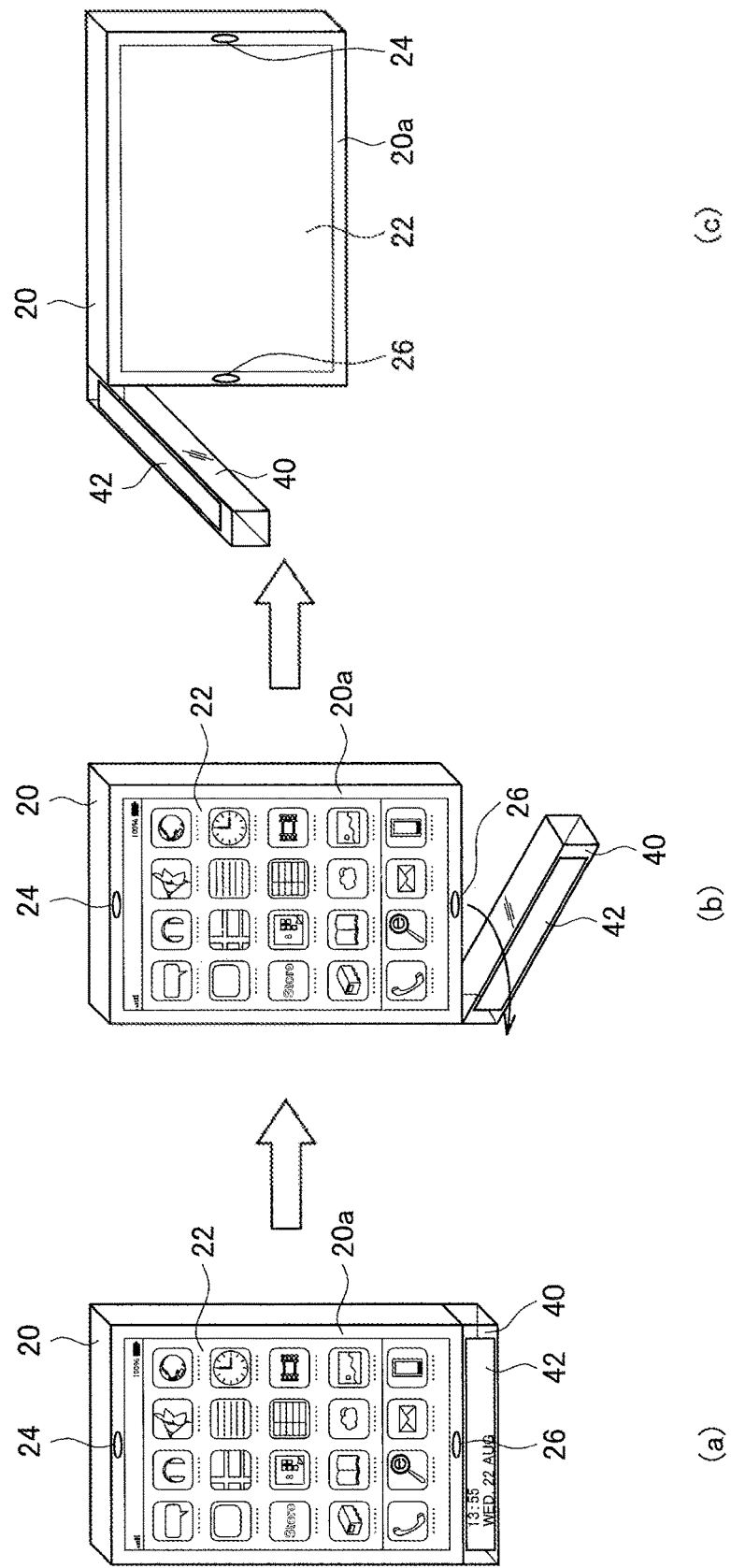
FIG. 2 is a diagram illustrating an example of a rotated state of a transmissive display unit 40.

FIG. 2 is a diagram illustrating an example of a rotated state of a transmissive display unit 40. As illustrated in FIG. 2, the transmissive display unit 40 is rotatable about one end on the short-edge face of the casing 20. FIG. 2(a) illustrates the transmissive display unit 40 positioned in a closed state, while FIG. 2(b) illustrates the transmissive display unit 40 in mid-rotation, and FIG. 2(c) illustrates the transmissive display unit 40 positioned in an open state. Note that the open state in FIG. 2(c) is a position resulting from rotating the transmissive display unit 40 by 90 degrees from the closed state in the direction indicated by the arrow in FIG. 2(b). In this way, the transmissive display unit 40 rotates between an open state and a closed state with respect to the casing 20.

In addition, when the transmissive display unit 40 is positioned in the closed state, as illustrated in FIG. 2(a), a display face provided with a second display unit 42 of the transmissive display unit 40 is positioned on the same face as the front face 20a of the casing 20. Alternatively, when the transmissive display unit 40 is to positioned in the closed state, the display face provided with a second display unit 42 of the transmissive display unit 40 is parallel to the front face front face 20a of the casing 20. Consequently, the boundary between the transmissive display unit 40 and the casing 20 becomes less noticeable, or in other words, a sense of unity between the transmissive display unit 40 and the casing 20 may be imparted to the user, and a loss of design aesthetics may be prevented.

Figure 3:
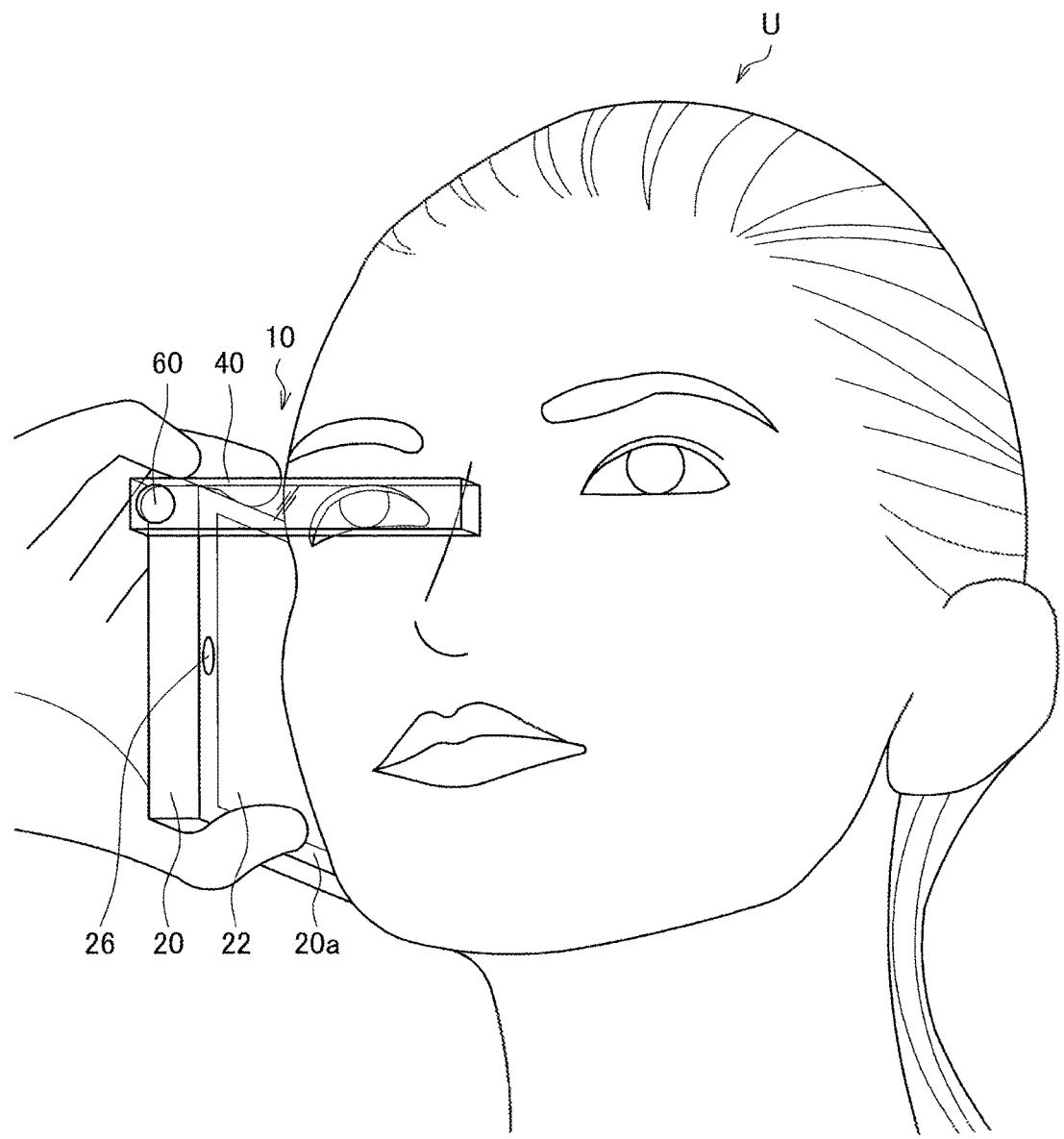
FIG. 3 is a diagram illustrating an example of a usage pattern of the mobile terminal 10.

FIG. 3 is a diagram illustrating an example of a usage pattern of the mobile terminal 10, and illustrates a usage pattern of the mobile terminal 10 when a user U is making a phone call with the mobile terminal 10. As FIG. 3 demonstrates, during a phone call, the transmissive display unit 40 positioned in the open state of FIG. 2(c) is disposed on a plane intersecting the front face 20a that is the principal face of the casing 20. Specifically, the front face 20a of the casing 20 faces the user's right ear, while the transmissive display unit 40 positioned in the open state is positioned in front of the user's right eye. As a result, the user is able to see a display on the transmissive display unit 40 while making a phone call. Additionally, since the transmissive display unit 40 is a display unit of the transmissive type as discussed earlier, even if the transmissive display unit 40 is positioned in front of the eye, the user is still able to see through the transmissive display unit 40 and observe the outside world.

The transmissive display unit 40 may also include a second display unit 42 capable of displaying information such as the date and time. The second display unit 42 presents a display when the transmissive display unit 40 is positioned in the closed state with respect to the casing 20, for example. The second display unit 42 is a display unit of the non-transmissive type, and is made up of an organic EL panel which is one example of a light-emitting display device, for example. Note that displays by the transmissive display unit 40 and the second display unit 42 are controlled by a system controller 110 discussed later (see FIG. 26).

FIG. 4 is an example illustrating a camera provided on the mobile terminal 10. The mobile terminal 10 may also include a camera 60, which is an image capture unit. The camera 60 may be provided on the transmissive display unit 40, as illustrated in FIG. 4(a), or provided on the casing 20, as illustrated in FIG. 4(b). For example, while making a phone call in the state illustrated in FIG. 3, the user may use the camera 60 to capture an image of the landscape or the like seen in front of the eye.

Note that FIG. 4(b) illustrates two camera 60a and 60b, and the capture of a stereoscopic image is enabled by the two cameras 60a and 60b. However, the configuration is not limited thereto, and only one camera may be provided on the casing 20, or two cameras for capturing a stereoscopic image may be provided on the transmissive display unit 40.

Although FIG. 3 discussed above illustrates an example of the transmissive display unit 40 being positioned in front of the user's right eye, the configuration is not limited thereto. As illustrated in FIG. 5, the transmissive display unit 40 in the open state may also be configured to be able to rotate to a position in front of either the user's right eye or left eye.

Additionally, operating buttons 71 and 72 are provided on the long-edge face 20d of the mobile terminal 10. Consequently, the user is able to operate the mobile terminal 10 by pressing the buttons 71 and 72 while an image is being displayed on the transmissive display unit 40 positioned in front of the right eye.

FIG. 5 is a diagram illustrating an example of two open states of the transmissive display unit 40. FIG. 5(a) illustrates a first open state of the transmissive display unit 40 for use with the user's right eye, while FIG. 5(b) illustrates a second open state of the transmissive display unit 40 for use with the user's left eye. For this reason, when positioned in the first open state or the second open state, the transmissive display unit 40 becomes positioned in a plane intersecting the front face 20a of the casing 20.

Also, since the orientation of the display when the transmissive display unit 40 is positioned in the first open state is upside down compared to the orientation of the display when the transmissive display unit 40 is positioned in the second open state, the display of the transmissive display unit 40 is toggled. In other words, the display of the transmissive display unit 40 is controlled according to the rotated state of the transmissive display unit 40. Consequently, even if the transmissive display unit 40 may be positioned in multiple open states, an easy-to-see display is presented while the user is making a phone call.

Note that when using the transmissive display unit 40 for both of the user's eyes, it is desirable not only to provide the speaker 24 and the microphone 26 on the front face 20a of the casing 20 as illustrated in FIG. 5(a), but also to provide a speaker 25 and a microphone 27 on the back face 20b of the casing as illustrated in FIG. 5(b). Consequently, phone calls may be conducted appropriately when used with either the right or left eyes.

(1-2. Second Practical Example of Exterior Configuration)

FIG. 6 is a diagram illustrating a second practical example of the exterior configuration of the mobile terminal 10. FIG. 6(a) illustrates a closed state that is the default state of the transmissive display unit 40 according to the second practical example, while FIG. 6(b) illustrates an open state of the transmissive display unit 40.

In the transmissive display unit 40 illustrated in the second practical example, the width of the part distant from the hinge unit that acts as the rotating shaft is greater than the width of the part close to the hinge unit. Also, in the closed state, the transmissive display unit 40 contacts a depressed unit 20e that is depressed compared to the front face 20a of the casing 20. Note that the touch panel 22 differs from the structure illustrated in FIG. 2, and is provided on the back face 20b of the casing 20.

(1-3. Third Practical Example of Exterior Configuration)

FIG. 7 is a diagram illustrating a third practical example of the exterior configuration of the mobile terminal 10. In the third practical example, the transmissive display unit 40 contacts the casing 20 in the widthwise direction of the mobile terminal 10. Additionally, the transmissive display unit 40 is rotatable about one end on the long-edge face 20d of the casing 20.

FIG. 7(a) illustrates a closed state of the transmissive display unit 40 according to the third practical example, while FIG. 7(b) illustrates an open state of the transmissive display unit 40. The transmissive display unit 40 illustrated in FIG. 7(b) may be positioned in front of the user's right eye during a phone call (see FIG. 3).

Figure 8:
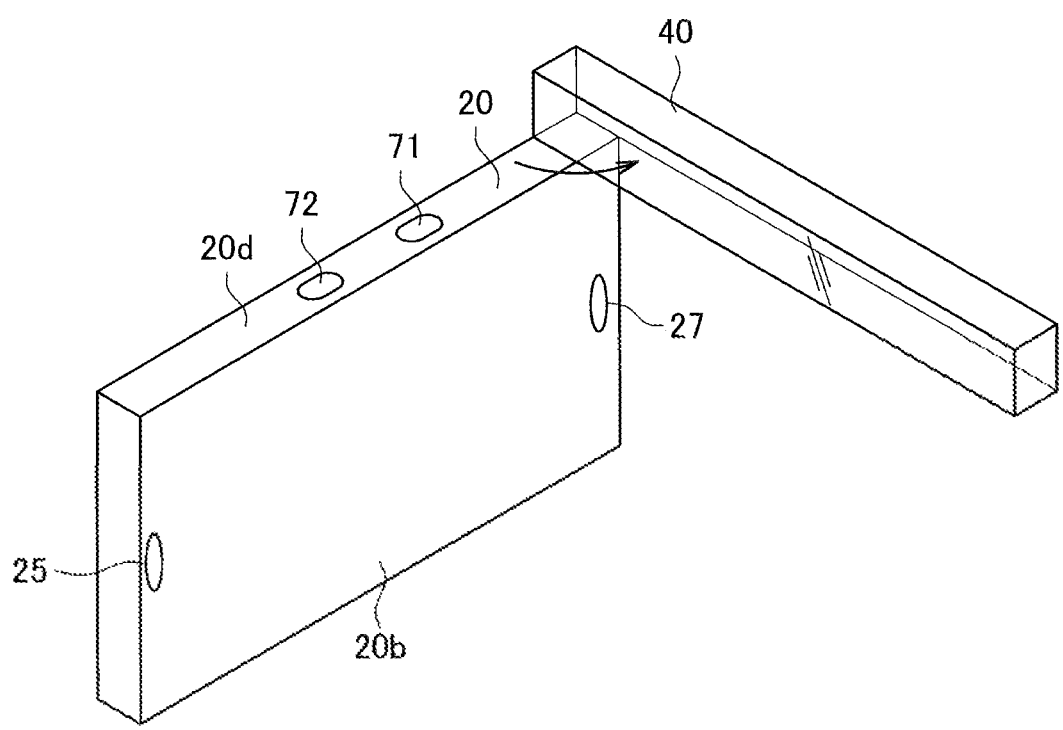
FIG. 8 illustrates an open state of the transmissive display unit 40 for use with the user's left eye.

Likewise in the third practical example, the transmissive display unit 40 is rotatable to a position in front of either the user's right eye or left eye. In other words, the transmissive display unit 40 may rotate to an open state for use with the right eye as illustrated in FIG. 7(b), or to an open state for use with the left eye as illustrated in FIG. 8. Note that FIG. 8 illustrates an open state of the transmissive display unit 40 for use with the user's left eye.

(1-4. Fourth Practical Example of Exterior Configuration)

FIG. 9 is a diagram illustrating a fourth practical example of the exterior configuration of the mobile terminal 10. FIG. 9(a) illustrates a closed state of the transmissive display unit 40 according to the fourth practical example, while FIG. 9(b) illustrates an open state of the transmissive display unit 40.

The display face 40a of the transmissive display unit 40 in the fourth practical example is the same size as the front face 20a of the casing 20. In this way, since the size of the display face 40a is large compared to the first to third practical examples, more information may be displayed. Also, the transmissive display unit 40 of the fourth practical example is thin compared to the transmissive display unit 40 of the first to third practical examples.

In the above, the mobile terminal 10 is a mobile phone or smartphone with a telephony function, but the configuration is not limited thereto. For example, the mobile terminal may also be a device that provides voice guidance, without including a telephony function. Even in the case of such a device, the transmissive display unit 40 may be disposed in a plane intersecting the front face 20a of the casing 20 during audio output. As a result, the user is able to see a display that is displayed on the transmissive display unit 40 while listening to the voice guidance.

<2. Display Method of Transmissive Display Unit>

As discussed earlier, the transmissive display unit 40 includes a light guide unit for guiding image light displayed by a display element to the user's eye. Consequently, when the transmissive display unit 40 is positioned in front of the eye, the user is able to view an image displayed by the display element. Hereinafter, three methods will be given as examples of display methods of the transmissive display unit 40.

(2-1. First Display Method)

The first display method provides a hologram grating that reflects or transmits a light beam inside the transmissive display unit 40, and guides image light displayed by a display element to the user's eye. Hereinafter, the mechanism of the first display method will be described with reference to FIGS. 10 and 11.

FIG. 10 is a diagram illustrating an exterior configuration of the mobile terminal 10 according to the first display method. FIG. 11 is a schematic diagram illustrating an internal configuration of the transmissive display unit 40 and a light beam propagation path according to the first display method. Suppose that the mobile terminal 10 according to the first display method rotates about the hinge unit 45 between the closed state illustrated in FIG. 10(a) and the open state illustrated in FIG. 10(b). In addition, the transmissive display unit 40 in the open state illustrated in FIG. 10(b) is positioned in front of the user's left eye as illustrated in FIG. 11(b) during a phone call, for example.

As illustrated in FIG. 11(a), the transmissive display unit 40 includes a base unit 41, a second display unit 42, a light guide plate 43 which is an example of the light guide unit, a hinge unit 45, a first hologram grating 46a, and a second hologram grating 46b.

The base unit 41 is the part that acts as the foundation of the transmissive display unit 40, and is made of a transparent member. The second display unit 42 is provided on a first face 41a side of the base unit 41, and displays information such as the date and time when the transmissive display unit 40 is in closed state as discussed earlier.

The light guide plate 43 is a flat plate provided on a second face 41b side of the base unit 41 via an air layer 44. The light guide plate 43 is formed thinner compared to the base unit 41 to enable total internal reflection of light inside the plate. A light beam emitted from an image display element (not illustrated) provided inside the hinge unit 45 enters the light guide plate 43, for example.

The light guide plate 43 includes a light entrance 43b formed at one end of an optical face 43a, and a light exit 43d formed on the other end of an optical face 43c opposite the optical face 43a. A light beam from the image display element enters the light entrance 43b. The light exit 43d emits a light beam that advances while being totally reflected between the optical face 43a and the optical face 43c.

Note that a collimating lens (not illustrated) that converts the light beam emitted from the image display element into a parallel light beam may also be provided between the image display element and the light guide plate 43. In such a case, the parallel light beam emitted from the collimating lens enters the light guide plate 43. Also, although the image display element is provided in the hinge unit 45 in the above description, the configuration is not limited thereto, and the image display element may also be provided in the casing 20, for example.

The hinge unit 45 forms a cylindrical shape projecting out from the transmissive display unit 40 towards the casing 20 (see FIG. 20). An image display element may be provided in the hinge unit 45 as discussed above. The image display element emits a light beam when the transmissive display unit 40 is in the open state. Also, a cable connected to the second display unit 42 passes through the hinge unit 45 internally.

The first hologram grating 46a is provided at a position facing the light entrance 43b of the optical face 43c, and diffractively reflects a light beam entering in from the light entrance 43b. The light beam diffractively reflected by the first hologram grating 46a advances while being repeatedly and totally reflected between the optical faces 43a and 43c, and is incident on the second hologram grating 46b, as illustrated in FIG. 11(b).

The second hologram grating 46b is provided at a position facing the light exit 43d of the optical face 43a, and diffractively reflects the incident light beam. The light beam is shifted off the total reflection condition by being diffractively reflected by the second hologram grating 46b. Consequently, as illustrated in FIG. 11(b), the light beam is emitted from the light exit 43d, and enters the user's eye H. Consequently, the user is able to perceive the image displayed by the image display element.

(First Modification)

The first hologram grating 46a and the second hologram grating 46b discussed above are configured to be reflective hologram gratings that reflect a light beam, but are not limited thereto. For example, as illustrated in FIG. 12, the first hologram grating 46a and the second hologram grating 46b may also be transmissive hologram gratings.

Figure 12:
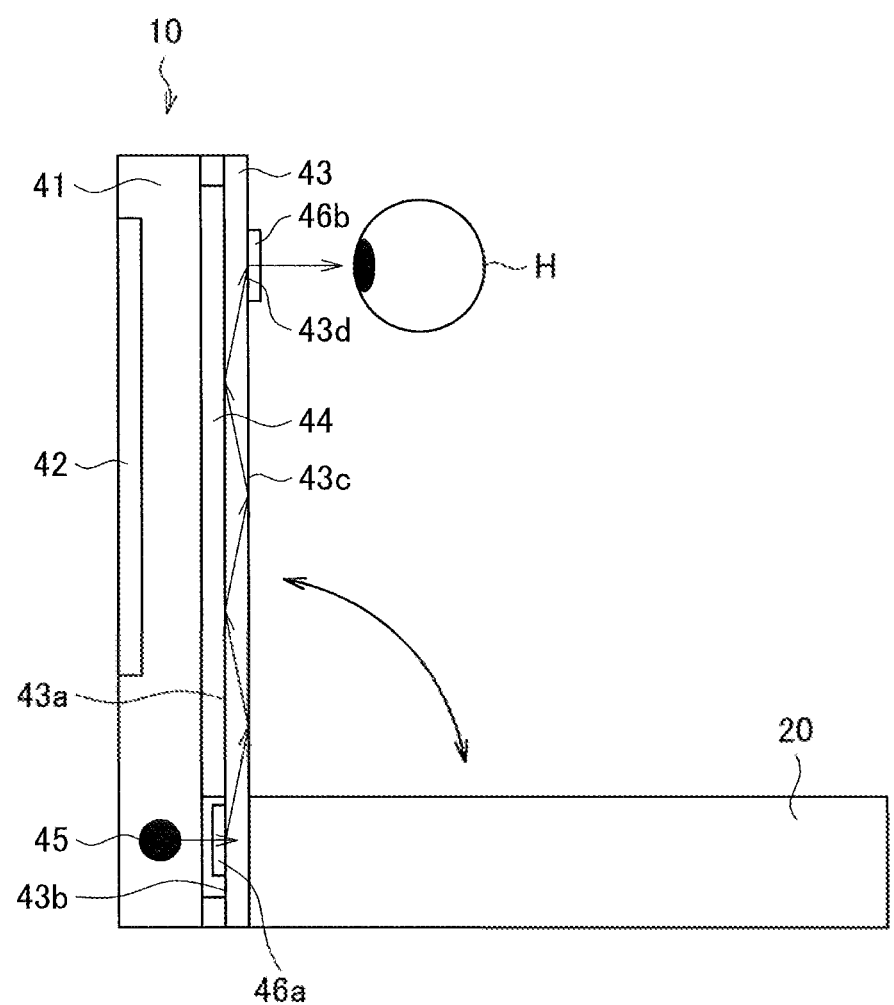
FIG. 12 is a schematic diagram illustrating an internal configuration of the transmissive display unit 40 and a light beam propagation path according to a first modification of the first display method.

FIG. 12 is a schematic diagram illustrating an internal configuration of the transmissive display unit 40 and a light beam propagation path according to a first modification of the first display method. As illustrated in FIG. 12, in the first modification, the first hologram grating 46a is provided at the same position as the light entrance 43b of the optical face 43a, while the second hologram grating 46b is provided at the same position as the light exit 43d of the optical face 43c. Consequently, a light beam transmitted through the first hologram grating 46a advances while being repeatedly and totally reflected between the optical face 43a and the optical face 43c, and is incident on the second hologram grating 46b. Subsequently, the light beam is transmitted through the second hologram grating 46b, and after being emitted from the light exit 43d, enters the user's eye H.

(Second Modification)

Figure 13:
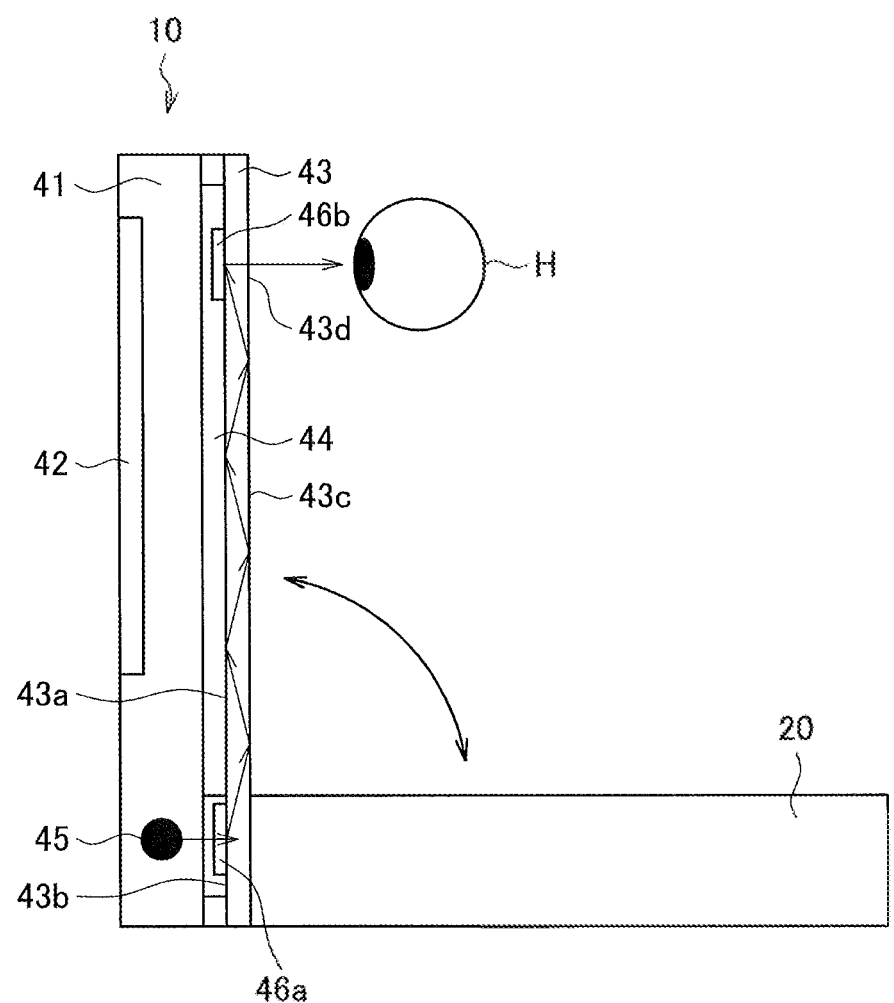
FIG. 13 is a schematic diagram illustrating an internal configuration of the transmissive display unit 40 and a light beam propagation path according to a second modification of the first display method.

Additionally, as illustrated in FIG. 13, a combination of a reflective hologram grating and a transmissive hologram grating may also be configured. As a result, the freedom of placement for the hologram gratings may be raised.

FIG. 13 is a schematic diagram illustrating an internal configuration of the transmissive display unit 40 and a light beam propagation path according to a second modification of the first display method. As illustrated in FIG. 13, in the second modification, a transmissive first hologram grating 46a is provided at the same position as the light entrance 43b of the optical face 43a, while a reflective second hologram grating 46b is provided at the same position facing opposite the light exit 43d of the optical face 43a. Consequently, a light beam transmitted through the first hologram grating 46a advances while being repeatedly and totally reflected between the optical face 43a and the optical face 43c, and is incident on the second hologram grating 46b. Subsequently, the light beam is diffractively reflected by the second hologram grating 46b, and after being emitted from the light exit 43d, enters the user's eye H.

(Third Modification)

Meanwhile, the mobile terminal 10 may be positioned in two open states (a first open state and a second open state) to enable positioning in front of either the user's right eye or left eye during a phone call (see FIG. 5). Accordingly, the mechanism of the first display method in such a configuration will be described with reference to FIGS. 14 to 17.

Figure 15:
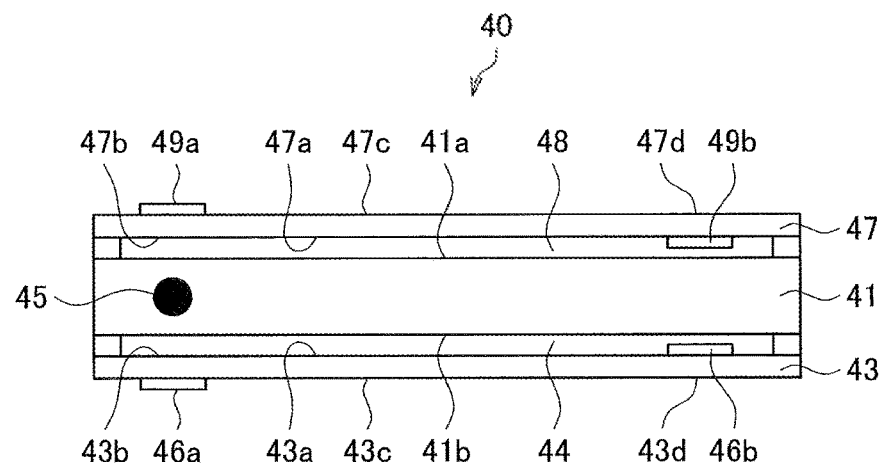
FIG. 15 is a schematic diagram illustrating an internal configuration of the transmissive display unit 40 according to a third modification of the first display method.
Figure 16:
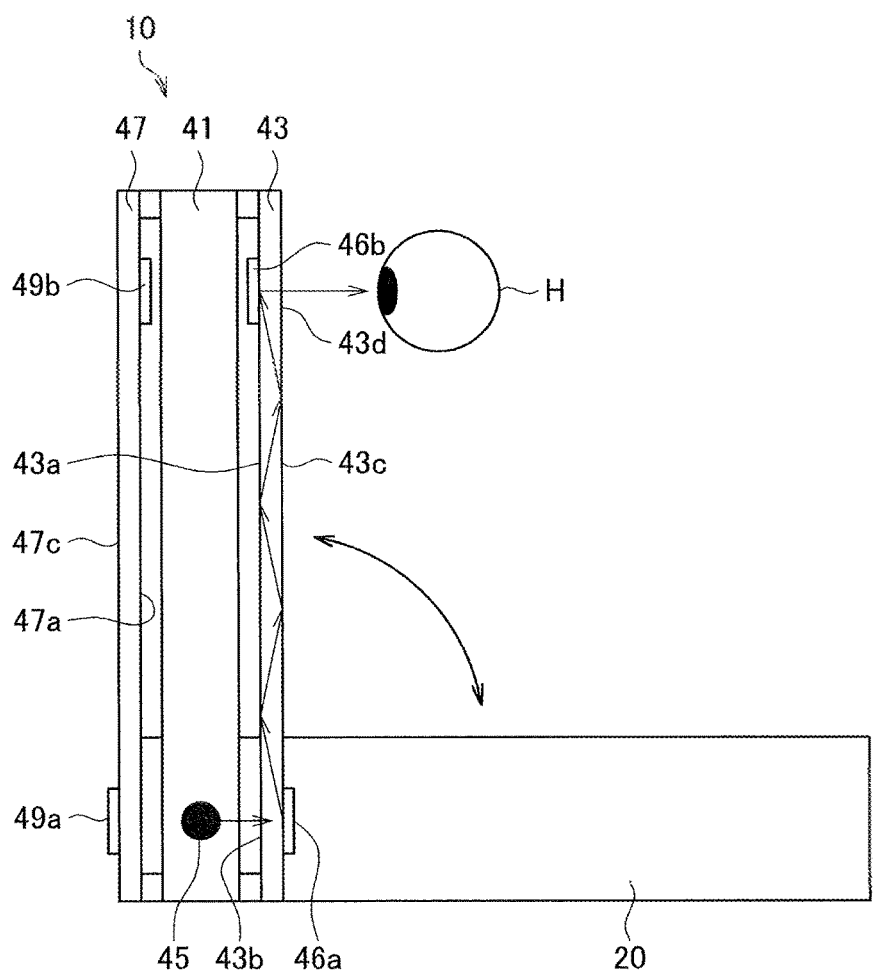
FIG. 16 is a schematic diagram illustrating a light beam propagation path when the transmissive display unit 40 is positioned in a first open state.
Figure 17:
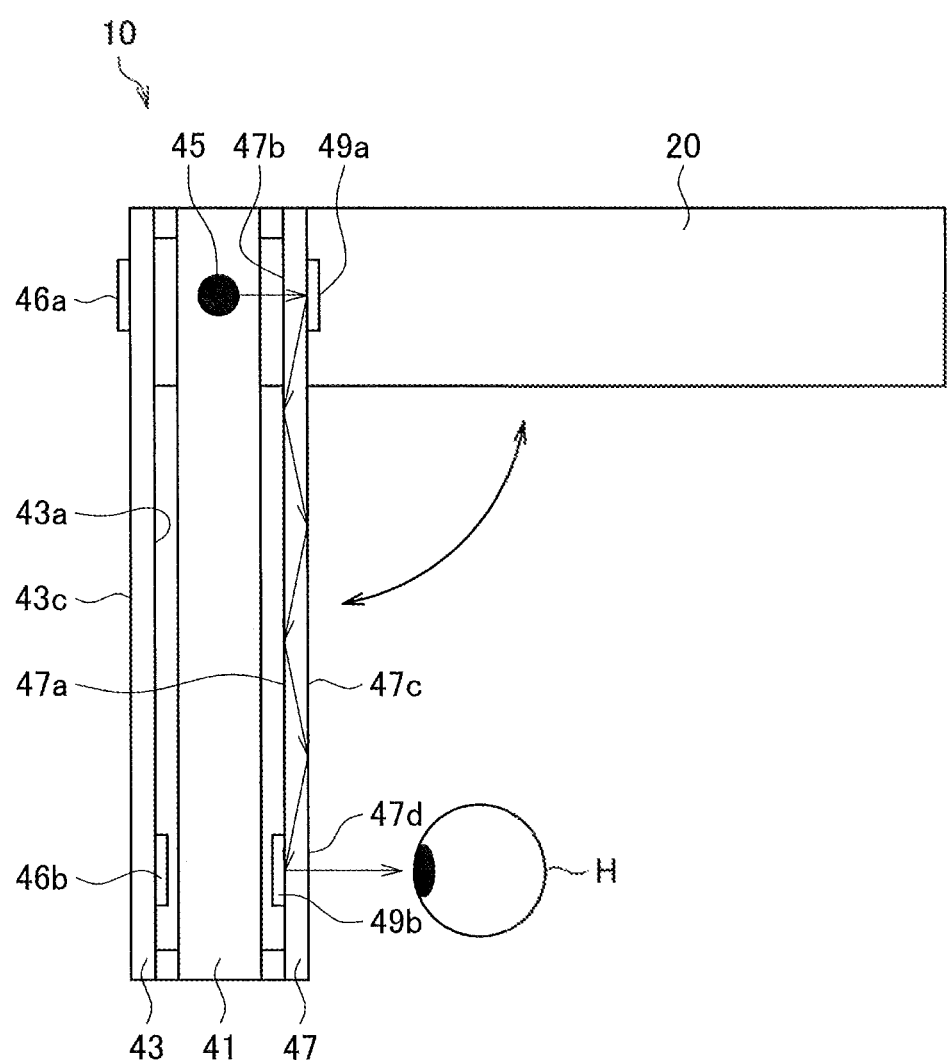
FIG. 17 is a schematic diagram illustrating a light beam propagation path when the transmissive display unit 40 is positioned in a second open state.

FIG. 14 is a diagram illustrating an example of an exterior configuration of the mobile terminal 10 according to a third modification of the first display method. FIG. 15 is a schematic diagram illustrating an internal configuration of the transmissive display unit 40 according to the third modification of the first display method. FIG. 16 is a schematic diagram illustrating a light beam propagation path when the transmissive display unit 40 is positioned in the first open state. FIG. 17 is a schematic diagram illustrating a light beam propagation path when the transmissive display unit 40 is positioned in the second open state.

Suppose that the mobile terminal 10 according to the third modification rotates about the hinge unit 45 between the closed state illustrated in FIG. 14(a), the first open state illustrated in FIG. 14(b), and the second open state illustrated in FIG. 14(c). Additionally, during a phone call, for example, the transmissive display unit 40 in the first open state illustrated in FIG. 14(b) is positioned in front of the user's left eye as illustrated in FIG. 16, while the transmissive display unit 40 in the second open state illustrated in FIG. 14(c) is positioned in front of the user's right eye as illustrated in FIG. 17.

As illustrated in FIG. 15, the transmissive display unit 40 according to the third modification includes two light guide plates 43 and 47. The light guide plate 43 is a first light guide unit, and is provided on a second face 41*b* (corresponding to a first surface) side of the base unit 41 via an air layer 44 (corresponding to a first air layer). The light guide plate 47 is a second light guide unit, and is provided on a first face 41*a* (corresponding to a second surface) side of the base unit 41 via an air layer 48 (second air layer). Additionally, a pair of hologram gratings is provided on each of the two light guide plates 43 and 47.

The first hologram grating 46*a* and the second hologram grating 46*b* of the light guide plate 43 are reflective hologram gratings. For this reason, as illustrated in FIG. 16, a light beam entering in via the light entrance 43*b* from an image display element inside the hinge unit 45 is diffractively reflected by the first hologram grating 46*a*, and is incident on the second hologram grating 46*b* while being totally reflected repeatedly between the optical faces 43*a* and 43*c*. Subsequently, the light beam is diffractively reflected by the second hologram grating 46*b*, emitted from the light exit 43*d*, and enters the user's left eye.

Similarly, a first hologram grating 49*a* and a second hologram grating 49*b* of the light guide plate 47 are reflective hologram gratings, as illustrated in FIG. 17. For this reason, as illustrated in FIG. 17, a light beam entering in via the light entrance 47*b* from an image display element inside the hinge unit 45 is diffractively reflected by the first hologram grating 49*a*, and is incident on the second hologram grating 49*b* while being totally reflected repeatedly between the optical faces 47*a* and 47*c*. Subsequently, the light beam is diffractively reflected by the second hologram grating 49*b*, emitted from the light exit 47*d*, and enters the user's right eye H.

Although FIGS. 15 to 17 discussed above take reflective hologram gratings as an example, the configuration is not limited thereto. For example, transmissive hologram gratings as described in FIG. 12 may be used, or a combination of a reflective hologram grating and a transmissive hologram grating as described in FIG. 13 may be used.

(2-2. Second Display Method)

The second display method provides a reflective face that reflects a light beam inside the transmissive display unit 40 instead of the hologram grating of the first display method, and guides image light display by a display element to the user's eye.

Figure 18:
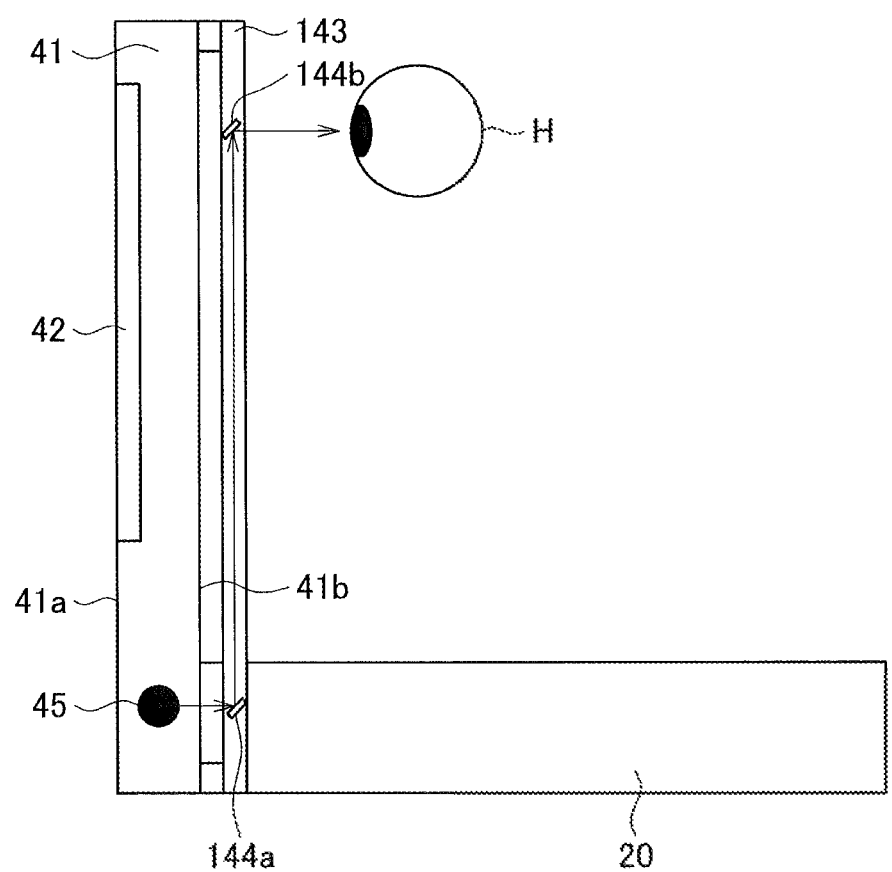
FIG. 18 is a schematic diagram illustrating an internal configuration of the transmissive display unit 40 and a light beam propagation path according to a second display method.

FIG. 18 is a schematic diagram illustrating an internal configuration of the transmissive display unit 40 and a light beam propagation path according to the second display method. As illustrated in FIG. 18, the transmissive display unit 40 includes a base unit 41, a second display unit 42, a hinge unit 45, and a light guide unit 143. Since the base unit 41, the second display unit 42, and the hinge unit 45 are similar to the configuration discussed earlier, description will be omitted.

The light guide unit 143 has a function of guiding a light beam emitted from an image display element (not illustrated) inside the hinge unit 45 to the user's eye H. The light guide unit 143 is a planar member, and is provided on the second face 41*b* side of the base unit 41. The light guide unit 143 internally includes two reflective faces 144*a* and 144*b* that reflect the light beam. Accordingly, a light beam entering the light guide unit 143 from the image display element is reflected by the reflective face 144*a*, reaches the reflective face 144*b*, is additionally reflected by the reflective face 144*b*, and enters the user's eye H. Consequently, the user is able to perceive the image displayed by the image display element.

Note that although the above describes the light guide unit 143 provided on the second face 41*b* of the base unit 41, the configuration is not limited thereto, and the light guide unit 143 may also be provided on the first face 41*a* side of the base unit 41, for example. In such a case, it becomes possible for a light beam to enter the user's left eye or right eye, as described earlier using FIGS. 16 and 17.

(2-3. Third Display Method)

The third display method forms inside the transmissive display unit 40 a reflective face having a half-mirror layer that partially reflects light while transmitting the remaining light, and guides image light display by a display element to the user's eye.

Figure 19:
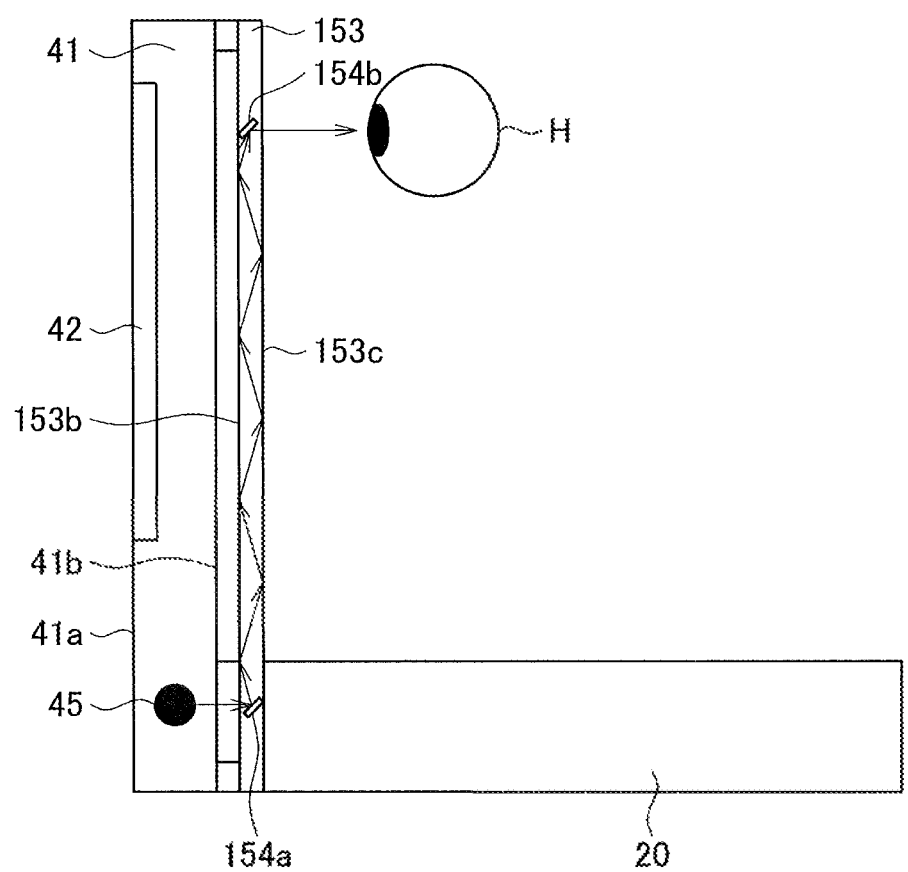
FIG. 19 is a schematic diagram illustrating an internal configuration of the transmissive display unit 40 and a light beam propagation path according to a third display method.

FIG. 19 is a schematic diagram illustrating an internal configuration of the transmissive display unit 40 and a light beam propagation path according to the third display method. As illustrated in FIG. 19, the transmissive display unit 40 includes a base unit 41, a second display unit 42, a hinge unit 45, and a light guide unit 153. Since the base unit 41, the second display unit 42, and the hinge unit 45 are similar to the configuration discussed earlier, description will be omitted.

The light guide unit 153 has a function of guiding a light beam emitted from an image display element inside the hinge unit 45 to the user's eye H. The light guide unit 153 is a planar member, and is provided on the second face 41*b* side of the base unit 41. The light guide unit 153 includes four reflective faces 154*a*, 154*b*, 154*c*, and 154*d* that reflect the light beam.

The reflective face 154*a* totally reflects the incident light beam from the image display element. The reflective faces 154*b* and 154*c* are formed along the lengthwise direction of the light guide unit 153 as illustrated in FIG. 19. The light beam reflected by the reflective face 154*a* advances while being totally reflected between the reflective face 154*b* and the reflective face 154*c*, and is incident on the reflective face 154*d*.

The reflective face 154*d* is a flat face for emitting the incident light beam from the light guide unit 154, and partially includes a half-mirror layer. The reflectance of the half-mirror layer is set to 20%, for example, while the transmittance is set to 80%, for example. Accordingly, the light beam reflected by the reflective face 154*d* enters the user's eye H. Consequently, the user is able to perceive the image displayed by the image display element. Note that the light beam transmitted through the reflective face 154*d* is not used to form an image.

Note that in the third display method, the light guide unit 143 may also be provided on the second face 41*b* of the base unit 41. As a result, it becomes possible for a light beam to enter the user's left eye or right eye, as described earlier using FIGS. 16 and 17.

<3. Rotation Detecting Mechanism of Transmissive Display Unit>

As discussed earlier, the transmissive display unit 40 rotates about the hinge unit 45 with respect to the casing 20. Additionally, the mobile terminal 10 includes a rotation detecting mechanism that detects the rotated state of the transmissive display unit 40, and controls operation according to the rotated state of the transmissive display unit 40. For example, when the transmissive display unit 40 is in the closed state, the mobile terminal 10 turns on the display of the touch panel 22 and the second display unit 42, and turns off the display of the transmissive display unit 40. Also, when the transmissive display unit 40 is in the open state, the mobile terminal 10 turns off the display of the touch panel 22 and the second display unit 42, and turns on the display of the transmissive display unit 40.

Hereinafter, first to fifth practical examples will be described as examples of a rotation detecting mechanism that includes a rotation detecting unit 75 that detects the rotated state of the transmissive display unit 40.

(3-1. First Practical Example of Rotation Detecting Mechanism of Transmissive Display Unit)

FIG. 20 is a diagram illustrating a first practical example of a rotation detecting mechanism of the transmissive display unit 40. FIG. 20(*a*) is a perspective view illustrating a state in which the transmissive display unit 40 is separated from the casing 20. FIG. 20(*b*) is a diagram illustrating the positional relationship between the hinge unit 45 and the rotation detecting unit 75 inside the casing 20.

The hinge unit 45 forms a cylindrical shape projecting out from the transmissive display unit 40. At the tip of the hinge unit 45 according to the first practical example, there is formed a cut unit 45*a* in which the outer circumferential surface is partially cut away. The cut unit 45*a* is D-cut so that the cross-section becomes an approximate D-shape.

The rotation detecting unit 75 is a sensor provided inside the casing 20 at a position facing opposite the hinge unit 45. The rotation detecting unit 75 includes a switch 76 contactable with the hinge unit 45, and detects the rotated state of the hinge unit 45 according to the state of the switch 76. The switch 76 is biased by a biasing member such as a spring (not illustrated). Note that FIG. 20(*a*) illustrates the switch 76 in the biased state. The switch 76 is pushed by the hinge unit 45 according to the rotated state of the transmissive display unit 40. Accordingly, the rotation detecting unit 75 detects that the transmissive display unit 40 is in the open state if the switch 76 is not being pushed by the hinge unit 45, and detects that the transmissive display unit 40 is in the closed state if the switch 76 is pushed by the hinge unit 45, for example.

Figure 21:
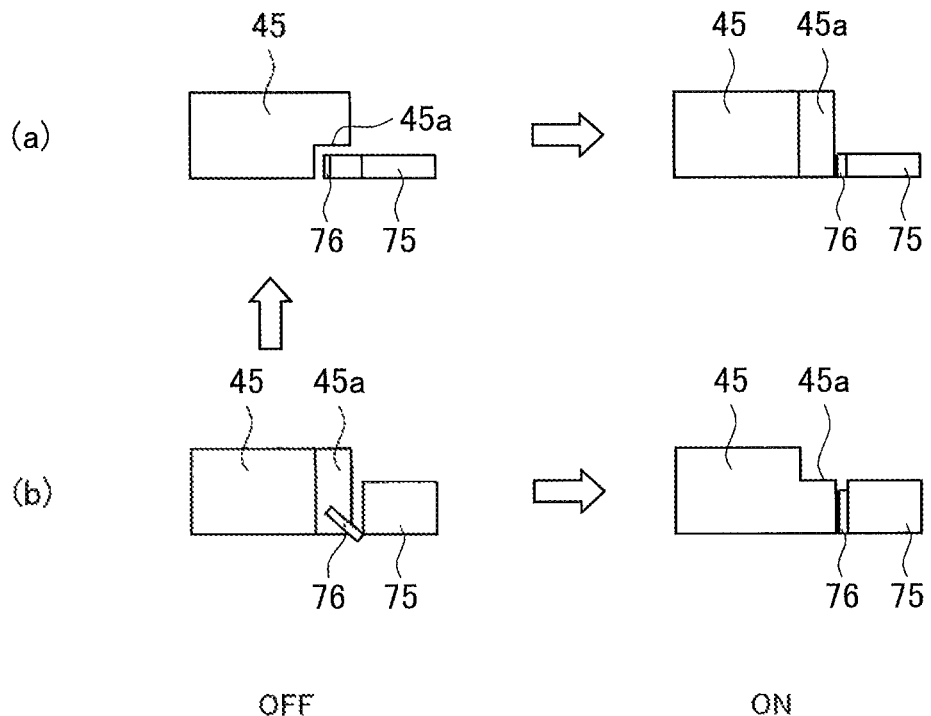
FIG. 21 is a diagram illustrating the relationship between the rotated state of the transmissive display unit 40 and the biased state of a switch 76.

FIG. 21 is a diagram illustrating the relationship between the rotated state of the transmissive display unit 40 and the biased state of the switch 76. FIG. 21(*b*) is a diagram viewed from the direction of the arrow in FIG. 21(*a*). When the transmissive display unit 40 is in the closed state, the switch 76 faces the cut unit 45*a*, and thus the switch 76 is not pushed by the hinge unit 45. When the transmissive display unit 40 is in the open state, the switch 76 makes contact with, and is pushed by, the outer circumferential surface of the part of the hinge unit 45 other than the cut unit 45*a*.

(3-2. Second Practical Example of Rotation Detecting Mechanism of Transmissive Display Unit)

Figure 22:
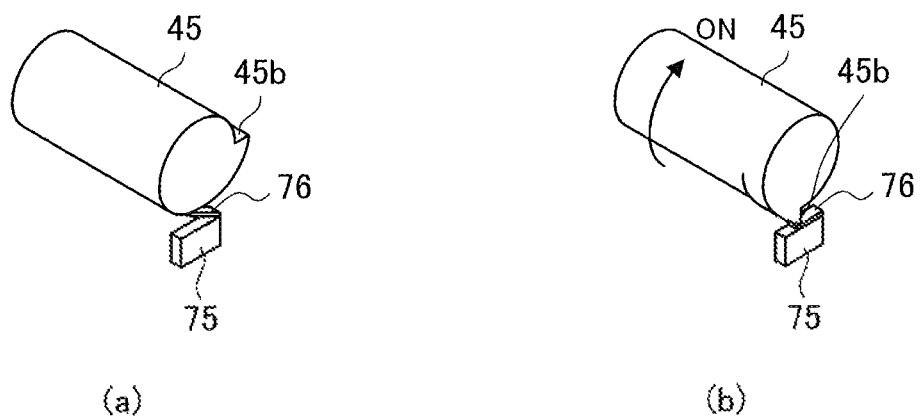
FIG. 22 is a diagram illustrating a second practical example of a rotation detecting mechanism of the transmissive display unit 40.

FIG. 22 is a diagram illustrating a second practical example of the rotation detecting mechanism of the transmissive display unit 40. FIG. 22(*a*) illustrates the positional relationship between the hinge unit 45 and the rotation detecting unit 75 when the transmissive display unit 40 is in the closed state, while FIG. 22(*b*) illustrates the positional relationship between the hinge unit 45 and the rotation detecting unit 75 when the transmissive display unit 40 is in the open state.

In the second practical example, instead of the cut unit 45*a* of the first practical example described using FIG. 20, a projecting unit 45*b* projecting outward from the outer circumferential surface is formed at the tip of the hinge unit 45. When the transmissive display unit 40 is in the closed state, the projecting unit 45*b* does not contact the switch 76 as illustrated in FIG. 22(*a*), and thus the switch 76 is not pushed. On the other hand, when the transmissive display unit 40 is in the open state, the projecting unit 45*b* contacts the switch 76 as illustrated in FIG. 22(*b*), and thus pushes the switch 76. Consequently, the open state or closed state of the transmissive display unit 40 may be determined.

(3-3. Third Practical Example of Rotation Detecting Mechanism of Transmissive Display Unit)

Figure 23:
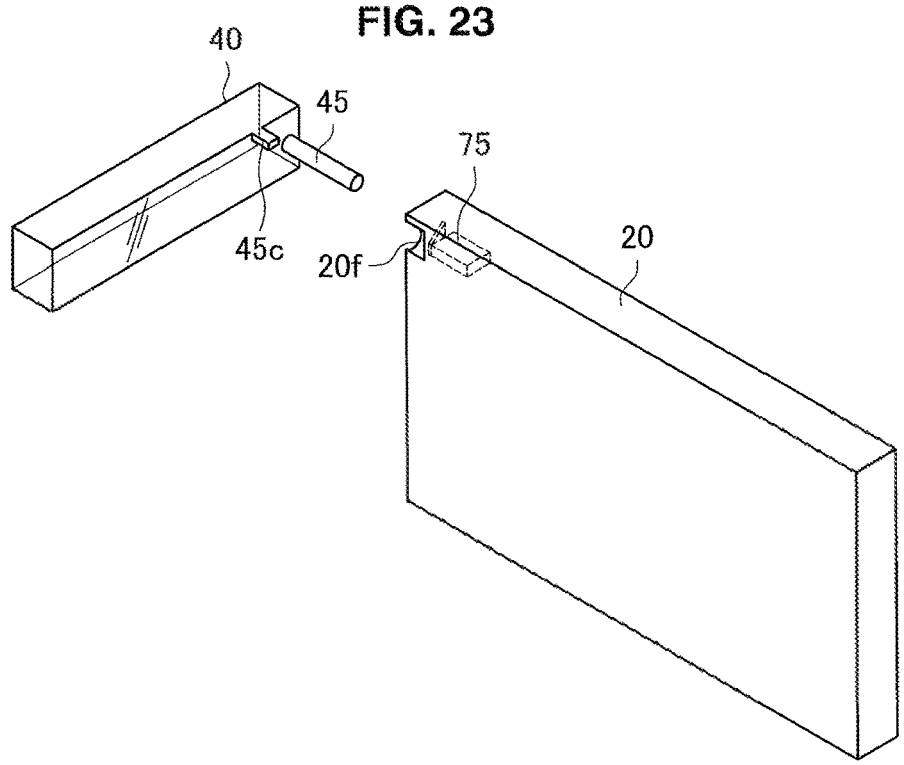
FIG. 23 is a diagram illustrating a third practical example of a rotation detecting mechanism of the transmissive display unit 40.

FIG. 23 is a diagram illustrating a third practical example of the rotation detecting mechanism of the transmissive display unit 40.

In the first and second practical examples discussed above, the switch 76 is pushed by the hinge unit 45. In contrast, in the third practical example, instead of the hinge unit 45, a projecting unit 45*c* of the transmissive display unit 40 formed to the side of the hinge unit 45 pushes the switch 76 when the transmissive display unit 40 is in the closed state. Note that the switch 76 is positioned near a depressed unit 20*f* into which the projecting unit 45*c* is inserted. On the other hand, the projecting unit 45*c* does not push the switch 76 when the transmissive display unit 40 is in the open state. Consequently, the open state or closed state of the transmissive display unit 40 may be determined.

(3-4. Fourth Practical Example of Rotation Detecting Mechanism of Transmissive Display Unit)

Figure 24:
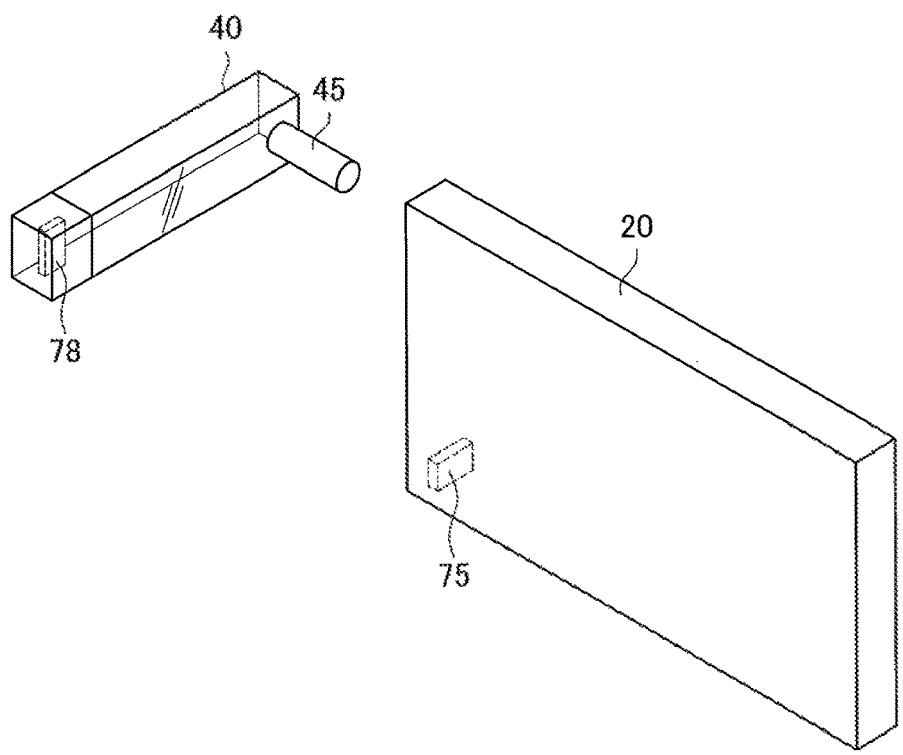
FIG. 24 is a diagram illustrating a fourth practical example of a rotation detecting mechanism of the transmissive display unit 40.

FIG. 24 is a diagram illustrating a fourth practical example of the rotation detecting mechanism of the transmissive display unit 40.

The rotation detecting unit 75 of the fourth practical example differs from the first to third practical examples, and does not include a switch pushed by the hinge unit 45 or the like. Instead, the rotation detecting unit 75 is a Hall effect sensor, for example, and a magnet 78 is provided in the transmissive display unit 40. As a result, the rotation detecting unit 75 detects the magnetic force of the magnet 78 when the transmissive display unit 40 is in the closed state, and does not detect the magnetic force of the magnet 78 when the transmissive display unit 40 is in the open state. Consequently, the open state or closed state of the transmissive display unit 40 may be determined.

(3-5. Fifth Practical Example of Rotation Detecting Mechanism of Transmissive Display Unit)

As described using FIG. 5, the transmissive display unit 40 may be positioned in a first open state or a second open state to enable positioning in front of either the user's right eye or left eye. Accordingly, in the fifth practical example, the rotation detecting unit 75 is configured to be able to detect the first open state and the second open state as open states of the transmissive display unit 40.

FIG. 25 is a diagram illustrating the fifth practical example of the rotation detecting mechanism of the transmissive display unit 40. FIG. 25(*a*) illustrates the positional relationship between the hinge unit 45 and the rotation detecting unit 75 when the transmissive display unit 40 is in the closed state, while FIG. 25(*b*) illustrates the positional relationship between the hinge unit 45 and the rotation detecting unit 75 when the transmissive display unit 40 is in the first open state, and FIG. 25(*c*) illustrates the positional relationship between the hinge unit 45 and the rotation detecting unit 75 when the transmissive display unit 40 is in the second open state.

The hinge unit 45 of the fifth practical example has a depressed unit 45*d* instead of the D-cut cut unit 45*a* illustrated in FIG. 20. As illustrated in FIG. 25(*a*), when the transmissive display unit 40 is in the closed state, the switch 76 of the rotation detecting unit 75 enters the depressed unit 45*d*. The switch 76 illustrated in FIG. 25(*a*) is biased by a biasing member (not illustrated), but does not contact the hinge unit 45, and is in a non-pushed state.

When the transmissive display unit 40 in the closed state illustrated in FIG. 25(*a*) rotates 90 degrees in the direction of the arrow illustrated in FIG. 25(b) and transitions to the first open state, the switch 76 resists the biasing force due to a side wall of the depressed unit 45d, and is pushed over in a first direction (for example, the clockwise direction illustrated in FIG. 25(b)). Also, when the transmissive display unit 40 in the closed state rotates 90 degrees in the direction of the arrow illustrated in FIG. 25(c) and transitions to the second open state, the switch 76 resists the biasing force due to a side wall of the depressed unit 45d, and is pushed over in a second direction (for example, the counter-clockwise direction illustrated in FIG. 25(c)). Subsequently, by detecting the direction in which the switch 76 falls over, the first open position and the second open position of the transmissive display unit 40 may be determined.

<4. Exemplary Internal Configuration of Mobile Terminal>

Figure 26:
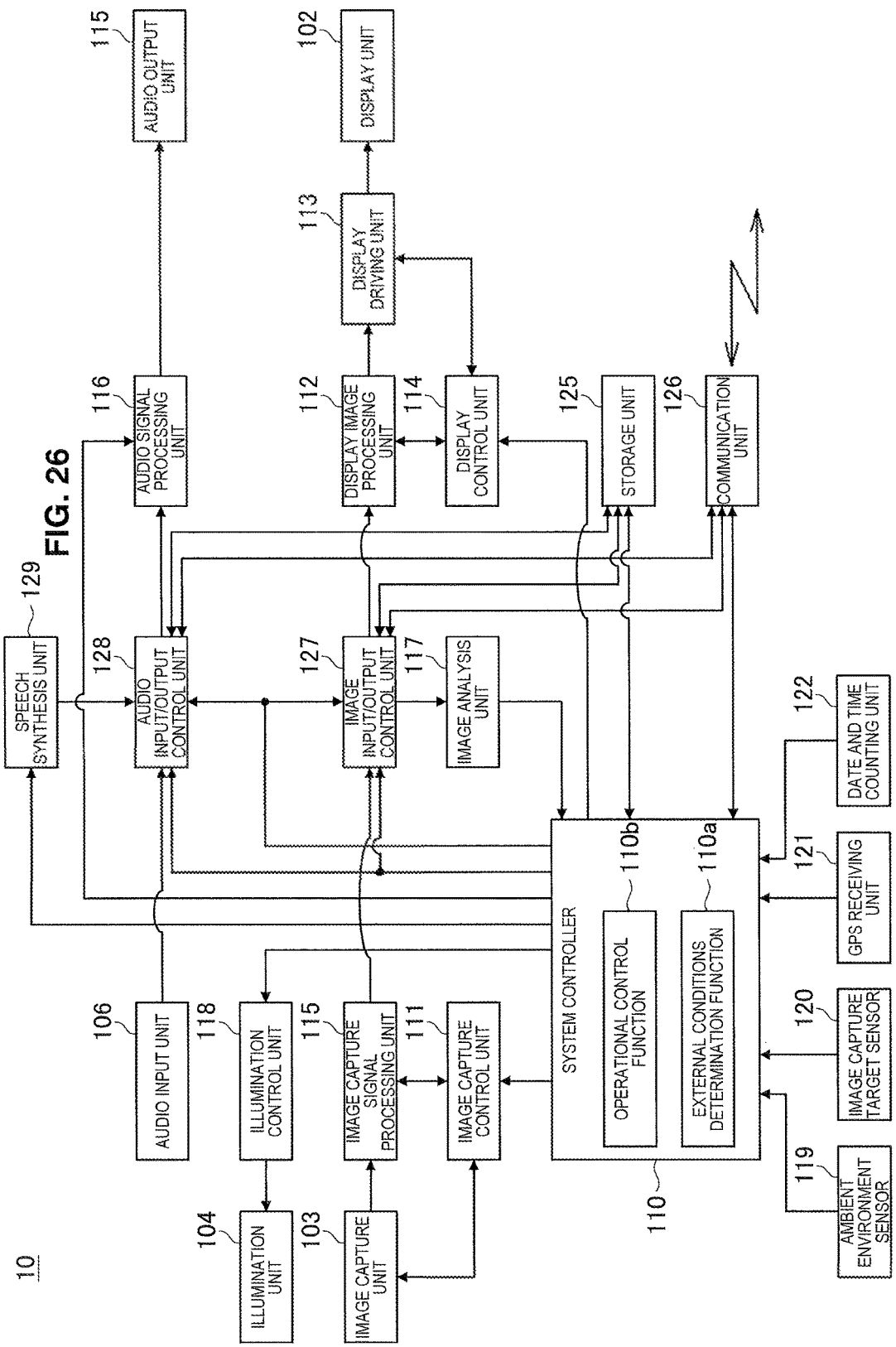
FIG. 26 is a block diagram illustrating an exemplary internal configuration of the mobile terminal 10.

An exemplary internal configuration of the mobile terminal 10 will be described with reference to FIG. 26. FIG. 26 is a block diagram illustrating an exemplary internal configuration of a mobile terminal 10.

The system controller 110 is made up of a microcontroller equipped with a central processing unit (CPU), read-only memory (ROM), random access memory (RAM), a non-volatile memory unit, and an interface unit, for example, and is a control unit that controls the mobile terminal 10 overall.

The system controller 110 controls the components of the mobile terminal on the basis of the conditions of the outside world. In other words, the system controller 110 senses and determines the conditions of the outside world, and operates accordingly by following an operation program configured to execute operational control of the components. Thus, if viewed functionally, the system controller 110 includes an external conditions determination function 110a that determines the conditions of the external world, and an operational control function 110b that transmits control instructions to the components in accordance with a determination result of the external conditions determination function 110a.

In the mobile terminal 10, a image capture unit 103, an image capture control unit 111, and an image capture signal processing unit 115 are provided as a configuration for capturing the view in front of the user.

The image capture unit 103 is provided with a lens subsystem made up of an image capture lens, a diaphragm, a zoom lens, a focus lens, and the like, a driving subsystem that causes the lens subsystem to conduct focus operations and zoom operations, as well as a solid-state image sensor array that generates an image capture signal by detecting and photoelectrically converting captured light obtained with the lens subsystem, and the like. The solid-state image sensor array may be a charge-coupled device (CCD) sensor array or a complementary metal-oxide-semiconductor (CMOS) sensor array, for example.

The image capture signal processing unit 115 is equipped with a sample and hold/automatic gain control (AGC) circuit that applies gain control and waveform shaping to signals obtained by the solid-state image sensor of the image capture unit 103, and a video A/D converter, and obtains an image capture signal as digital data. The image capture signal processing unit. 115 also conducts white balance processing, luma processing, chroma signal processing, shake correction processing, and the like on an image capture signal.

The image capture control unit 111 controls operations of the image capture unit 103 and the image capture signal processing unit 115 on the basis of instructions from the system controller 110. For example, the image capture control unit 111 controls the switching on/off of the operations of the image capture unit 103 and the image capture signal processing unit 115. The image capture control unit 111 is also configured to apply control (motor control) causing the image capture unit 103 to execute operations such as autofocus, automatic exposure adjustment, diaphragm adjustment, and zooming.

The image capture control unit 111 is also equipped with a timing generator, and controls signal processing operations with timing signals generated by the timing generator for the solid-state image sensor as well as the sample and hold/AGC circuit and video A/D converter of the image capture signal processing unit 111. In addition, this timing control enables variable control of the image capture frame rate.

Furthermore, the image capture control unit 111 controls image capture sensitivity and signal processing in the solid-state image sensor and the image capture signal processing unit 115. For example, as image capture sensitivity control, the image capture controller 11 is able to conduct gain control of a signal read out from the solid-state image sensor, set the black level, control various coefficients for image capture signal processing at the digital data stage, control the correction magnitude in a shake correction process, and the like. Regarding image capture sensitivity, overall sensitivity adjustment that does not particularly account for the wavelength band is possible, as well as sensitivity adjustment that adjusts the image capture sensitivity of a particular wavelength band (for example, image capture that cuts a specific wavelength band), such as the infrared region or the ultra-violet region, for example. Wavelength-dependent sensitivity adjustment is possible with the insertion of a wavelength filter in the image capture lens subsystem, or with wavelength filter computational processing on an image capture signal. In these cases, the image capture control unit 111 is able to control sensitivity with insertion control of a wavelength filter, specification of filter computation coefficients, or the like.

An image capture signal that is captured by the image capture unit 103 and processed by the image capture signal processing unit 115 (image data from image capture) is supplied to an image input/output control unit 127.

The image input/output control unit 127 controls the transfer of image data according to control by the system controller 110. In other words, the transfer of image data between the image capture subsystem (image capture signal processing unit 115), a display subsystem (display image processing unit 112), a storage unit 125, and a communication unit 126 is controlled. For example, the image input/output control unit 127 may conduct operation to supply image data in the form of an image capture signal processed by the image capture signal processing unit 115 to the display image processing unit 112, the storage unit 125, or the I communication unit 26. Also, the image input/output control unit 127 conducts operation to supply image data played back from the storage unit 125 to the display image processing unit 112 or the communication unit 126, for example. Also, the image input/output control unit 127 conducts operation to supply image data received by the communication unit 126 to the display image processing unit 112 or the storage unit 125, for example.

In the mobile terminal 10, a display unit 102, the display image processing unit 112, a display driving unit 113, and a display control unit 114 are provided as a configuration that presents a display to the user.

For example, image data in the form of an image capture signal captured by the image capture unit 103 and processed by the image capture signal processing unit 115 may be supplied to the display image processing unit 112 via the image input/output control unit 127. The display image processing unit 112 is what is called a video processor, for example, and is a component able to execute various display processing on supplied image data. For example, brightness level adjustment, color correction, contrast adjustment, and sharpness adjustment of the image may be conducted. Additionally, the display image processing unit 112 is also able to conduct processes such as the generation of an enlarged image enlarging part of the supplied image data or the generation of a reduced image, the separating or combining of images for split-screen display of supplied image data, image processing to highlight part of an image, the generation of a character image or representational image, and the combining of a generated image with supplied image data. In other words, various processes may be conducted on supplied image data.

The display driving unit 113 is made up of a pixel driving circuit for causing a display unit 102 realized as a liquid crystal display, for example, to display image data supplied from the display image processing unit 112. In other words, for each pixel arranged in a matrix in the display unit 102, a driving signal based on a picture signal is applied at respectively predetermined horizontal/vertical drive timings to execute a display. Additionally, the display driving unit 113 may also control the transmittance of each pixel of the display unit 102 to create a see-through state.

The display control unit 114 controls the processing operation of the display image processing unit 112 and the operation of the display driving unit 113 on the basis of instructions from the system controller 110. In other words, the display control unit 114 causes the display image processing unit 112 to execute the various processes described above. In addition, the display control unit 114 controls the display driving unit 113 to switch between a see-through state and an image display state.

Note that image data played back from the storage unit 125 or image data received by the communication unit 126 may also be supplied to the display image processing unit 112 via the image input/output control unit 127. In this case, the playback image or received image is output on the display unit 102 by the above operations of the display image processing unit 112 and the display driving unit 113.

In addition, the mobile terminal 10 is provided with an audio input unit 106, an audio signal processing unit 116, and an audio output unit 105.

The audio input unit 106 includes the microphone 26 illustrated in FIG. 1 as well as a microphone amp unit and A/D converter that amplify and process an audio signal obtained by the microphone 26, and outputs audio data. Audio data obtained by the audio input unit 106 is supplied to an audio input/output control unit 128.

The audio input/output control unit 128 controls the transfer of audio data according to control by the system controller 110. In other words, the transfer of an audio signal between the audio signal processing unit 116, the storage unit 125, and the communication unit 126 is controlled. For example, the audio input/output control unit 128 may conduct operation to supply audio data obtained by the audio input unit 106 to the audio signal processing unit 116, the storage unit 125, or the communication unit 126. Also, the audio input/output control unit 128 conducts operation to supply audio data played back from the storage unit 125 to the audio signal processing unit 116 or the communication unit 126, for example. Also, the audio input/output control unit 128 conducts operation to supply audio data received by the communication unit 126 to the audio signal processing unit 116 or the storage unit 125, for example.

The audio signal processing unit 116 is made up of a digital signal processor, D/A converter, and the like, for example. The audio signal processing unit 116 is supplied with audio data obtained by the audio input unit 106, or audio data from the storage unit 125 or the communication unit 126, via the audio input/output control unit 128. The audio signal processing unit 116 conducts processes such as volume adjustment, audio quality adjustment, and acoustic effects processing on the supplied audio data under control by the system controller 110. Subsequently, the processed audio data is converted into an analog signal and supplied to the display unit 102. Note that the audio signal processing unit 116 is not limited to a configuration that conducts digital signal processing, and may also conduct signal processing with an analog amp or analog filter.

The audio output unit 105 includes the speaker 24 illustrated in FIG. 1, and an amp circuit for the speaker 24. With the audio input unit 106, the audio signal processing unit 116, and the audio output unit 105, the user may listen to external audio, listen to audio played back from the storage unit 125, or listen to audio received by the communication unit 126. Note that the audio output unit 105 may also be configured as what is called a bone conduction speaker.

The storage unit 125 is a member that records or plays back data with respect to a designated recording medium, and is realized as a hard disk drive (HDD), for example. Obviously, various media such as flash memory or other solid-state memory, a memory card housing solid-state memory, an optical disc, a magneto-optical disc, and holographic memory are conceivable as the recording medium, and it is sufficient to configure the storage unit 125 to be able to execute recording and playback in accordance with the implemented recording medium.

Image data in the form of an image capture signal captured by the image capture unit 103 and processed by the image capture signal processing unit 115, or image data received by the communication unit 126, may be supplied to the storage unit 125 via the image input/output control unit 127. Also, audio data obtained by the audio input unit 106 or audio data received by the communication unit 126 may be supplied to the storage unit 125 via the audio input/output control unit 128.

The storage unit 125, following control by the system controller 110, conducts an encoding process on the supplied image data or audio data for encoding to a recording medium, and records encoded data to a recording medium. Additionally, the storage unit 125, following control by the system controller 110, plays back image data or audio data from a recording medium. Played-back image data is output to the image input/output control unit 127, while played-back audio data is output to the audio input/output control unit 128.

The communication unit 126 transmits and receives data to and from external equipment. The communication unit 126, using a scheme such as wireless LAN or Bluetooth, may be configured to conduct network communication via short-range wireless communication with a network access point, or be configured to conduct direct wireless communication with external equipment provided with a compatible communication function, for example.

Image data in the form of an image capture signal captured by the image capture unit 103 and processed by the image capture signal processing unit 115, or image data played back from the storage unit 125, may be supplied to the communication unit 126 via the image input/output control unit 127. Also, audio data obtained by the audio input unit 106 or audio data played back from the storage unit 125 may be supplied to the communication unit 126 via the audio input/output control unit 128.

The communication unit 126, following control by the system controller 110, conducts processes such as an encoding process and an modulation process for transmission on the supplied image data or audio data, and transmits to external equipment. Additionally, the communication unit 126 receives data from external equipment. The communication unit 126 outputs received and demodulated image data to the image input/output control unit 127, and outputs received and demodulated audio data to the audio input/output control unit 128.

In addition, the mobile terminal 10 is provided with a speech synthesis unit 127. The speech synthesis unit 127 conducts speech synthesis according to an instruction from the system controller 110, and outputs an audio signal. The audio signal output from the speech synthesis unit 127 is supplied to and processed by the audio signal processing unit 116 via the audio input/output control unit 128, supplied to the audio output unit 105, and output as audio to the user. The speech synthesis unit 127 may also produce an audio signal of text-to-speech or screen reader speech.

The mobile terminal 10 is provided with an illumination unit 104 and an illumination control unit 118. The illumination unit 104 is made up of a light emitter (an LED, for example), and a light emission circuit that causes the light emitter to emit light. The illumination control unit 118 causes the illumination unit 4 to execute light-emitting operation on the basis of an instruction from the system controller 110.

The mobile terminal 10 includes an ambient environment sensor 119, an image capture target sensor 120, a GPS receiving unit 121, a date and time counting unit 122, an image analysis unit 117, and the communication unit 126 as a configuration for acquiring external world information.

The ambient environment sensor 119 conceivably includes sensors such as an illumination sensor, a temperature sensor, a humidity sensor, and a barometric sensor, for example, and is a sensor that obtains information for detecting information such as the ambient brightness, temperature, humidity, or weather as the ambient environment of the mobile terminal 10.

The image capture target sensor 120 is a sensor that detects information related to an image capture target treated as the photographic subject of image capture operation by the image capture unit 103. For example, a range sensor that detects information about the distance from the mobile terminal 10 to the image capture target, or a sensor that detects energy or information such as a specific wavelength of infrared light produced by the image capture target, like an infrared sensor such as a pyroelectric sensor, is conceivable. In the case of a pyroelectric sensor, it becomes possible to detect whether or not the image capture target is a living body such as a person or animal, for example. Furthermore, a sensor that detects energy or information such as a specific wavelength of infrared light produced by the image capture target, like various ultraviolet (UV) sensors, is also conceivable. In this case, it becomes possible to detect whether or not the image capture target is a fluorescent material or a fluorescent body, or detect the amount of ultraviolet rays in the external world, which is required to protect against sunburn, for example.

The GPS receiving unit 121 receives radio waves from Global Positioning to System (GPS) satellites, and outputs latitude and longitude information as the current position.

The date and time counting unit 122 acts as a so-called clock unit that counts the date and time (year, month, day, hour, minute, second), and outputs current date and time information.

The image analysis unit 117 conducts image analysis of image data. The image analysis unit 117 is supplied with image data via the image input/output control unit 127. The image data subjected to image analysis in the image analysis unit 117 is image data in the form of a captured image obtained by the image capture unit 103 and the image capture signal processing unit 115, image data received by the communication unit 126, or image data played back from a recording medium by the storage unit 125. In other words, input image data that the mobile terminal 10 is capable of displaying on the display unit 102 is subjected to image analysis by the image analysis unit 117. Subsequently, the image analysis unit 117 analyses the image data, and obtains information about an image included in the image data.

The communication unit 126 conducts data communication with external equipment. The external equipment may be any equipment provided with information processing and communication functions, such as computer equipment, a personal digital assistant (PDA), a mobile phone, video equipment, audio equipment, or tuner equipment. Additionally, devices such as terminal devices and server devices connected to a network such as the Internet are also conceivable as external equipment to communicate with. Furthermore, objects such as a contactless communication IC card with a built-in IC chip, a two-dimensional barcode such as a QR code, or hologram memory may be treated as external equipment, and the communication unit 126 conceivably may be configured to read out information from such external equipment. Furthermore, another mobile terminal 10 is also conceivable as external equipment. The communication unit 126, using a scheme such as wireless LAN or Bluetooth, may be configured to conduct network communication via short-range wireless communication with a network access point, or be configured to conduct direct wireless communication with external equipment provided with a compatible communication function, for example.

With the ambient environment sensor 119, the image capture target sensor 120, the GPS receiving unit 121, the date and time counting unit 122, the image analysis unit 117, and the communication unit 126, information about the external world from the perspective of the mobile terminal 10 is acquired and supplied to the system controller 110.

The system controller 110, according to external world information acquired by the processing of the external conditions determination function 110a, conducts control related to image capture operation and display operation with the processing of the operational control function 110b. In other words, the system controller 110 instructs the display control unit 114 to control the operation of the display image processing unit 112 and the display driving unit 113, selects a source of data to display, and controls playback operation of the storage unit 125 and communication operation of the communication unit 126.

Note that although the ambient environment sensor 119, the image capture target sensor 120, the GPS receiving unit 121, the date and time counting unit 122, the image analysis unit 117, and the communication unit 126 are illustrated as a configuration for acquiring external world information, it is not strictly necessary to provide all of the above. In addition, other sensors may also be provided, such as an audio analysis unit that senses and analyzes ambient audio.

<5. Display Process by Transmissive Display Unit>

The mobile terminal 10 displays information such as text, images, and graphics on the transmissive display unit 40 in the open state during a phone call, for example. Hereinafter, examples of display processes by the transmissive display unit 40 during a phone call will be described.

(5-1. Processing of Displaying Related Information by Extracting Topic from Conversation During Phone Call)

When the user is in the middle of a phone call with a third party (the person on the phone), the mobile terminal 10 according to the present embodiment is able to extract a topic from the conversation, and display related information corresponding to the extracted topic on the transmissive display unit 40. Hereinafter, a process of displaying related information related to a topic during a phone call will be described with reference to FIGS. 27 to 32.

Figure 27:
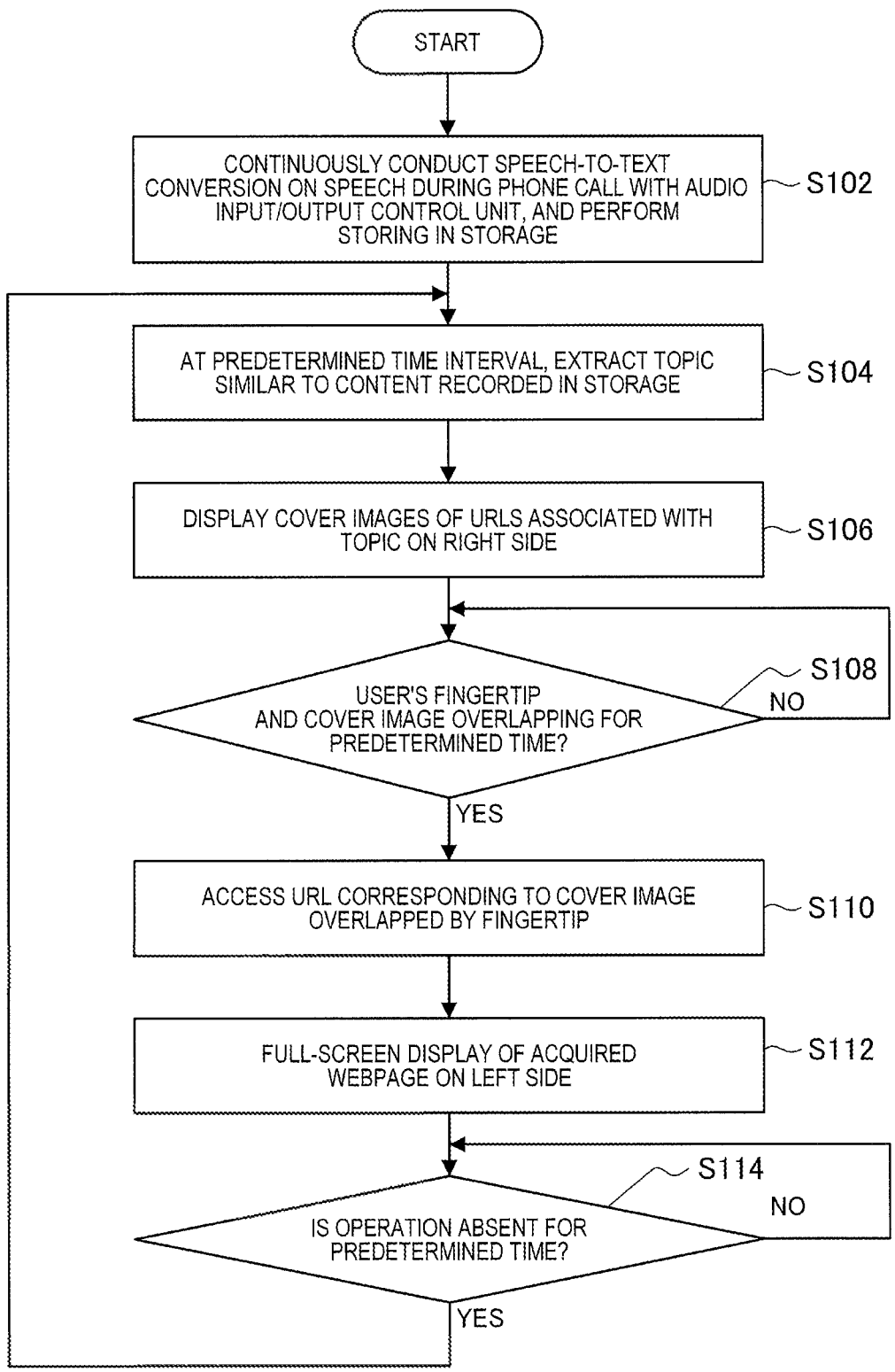
FIG. 27 is a flowchart illustrating a process of displaying related information based on a topic extracted from a conversation.

FIG. 27 is a flowchart illustrating a process of displaying related information based on a topic extracted from a conversation. FIGS. 28 to 32 are diagrams illustrating an example display of the transmissive display unit 40 during a process of displaying related information related to a topic during a telephone call.

Figure 28:
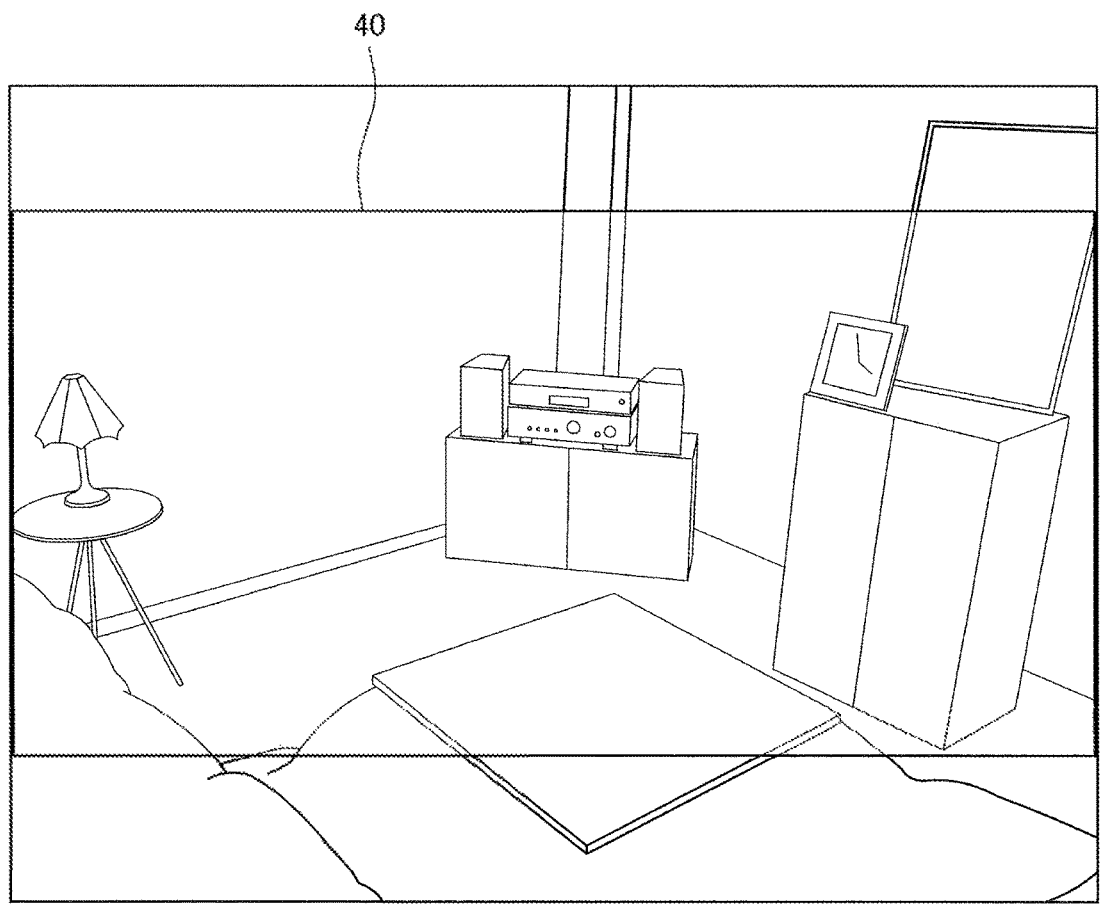
FIG. 28 is a diagram illustrating an example display of the transmissive display unit 40 during a process of displaying related information related to a topic during a phone call.

The flowchart in FIG. 27 starts when the user of the mobile terminal 10 makes a phone call to the person on the phone while the transmissive display unit 40 is also in the open state and positioned in front of the user's eye. At this point, suppose that an image or the like is not displayed on the transmissive display unit 40 as illustrated in FIG. 28, and that the user is seeing the state of a room through the transmissive display unit 40.

First, the system controller 110 of the mobile terminal 10 converts the speech of the user and the person on the phone into text with the audio input/output control 128, and stores the converted text data in the storage 125 (step S102).

Next, the system controller 110 extracts a topic similar to the content of the text data stored in the storage 125 at a predetermined interval (step S104). Herein, the predetermined interval is 5 minutes, for example, but is not limited thereto.

An example of a topic extraction method will now be described. First, morphological analysis of the text data is performed, words obtained by excluding extraneous words (feature words) are extracted, and the weighting of each word is computed. As a result, a feature vector of the text data is computed. Next, a database stored in advance in the storage 125 or the like (in which feature vectors for individual topics are stored) is searched, and similarities are respectively computed from the inner product of the feature vector of the text data and the feature vectors for individual topics stored in the database. Subsequently, the topic of greatest similarity is extracted, for example.

Figure 29:
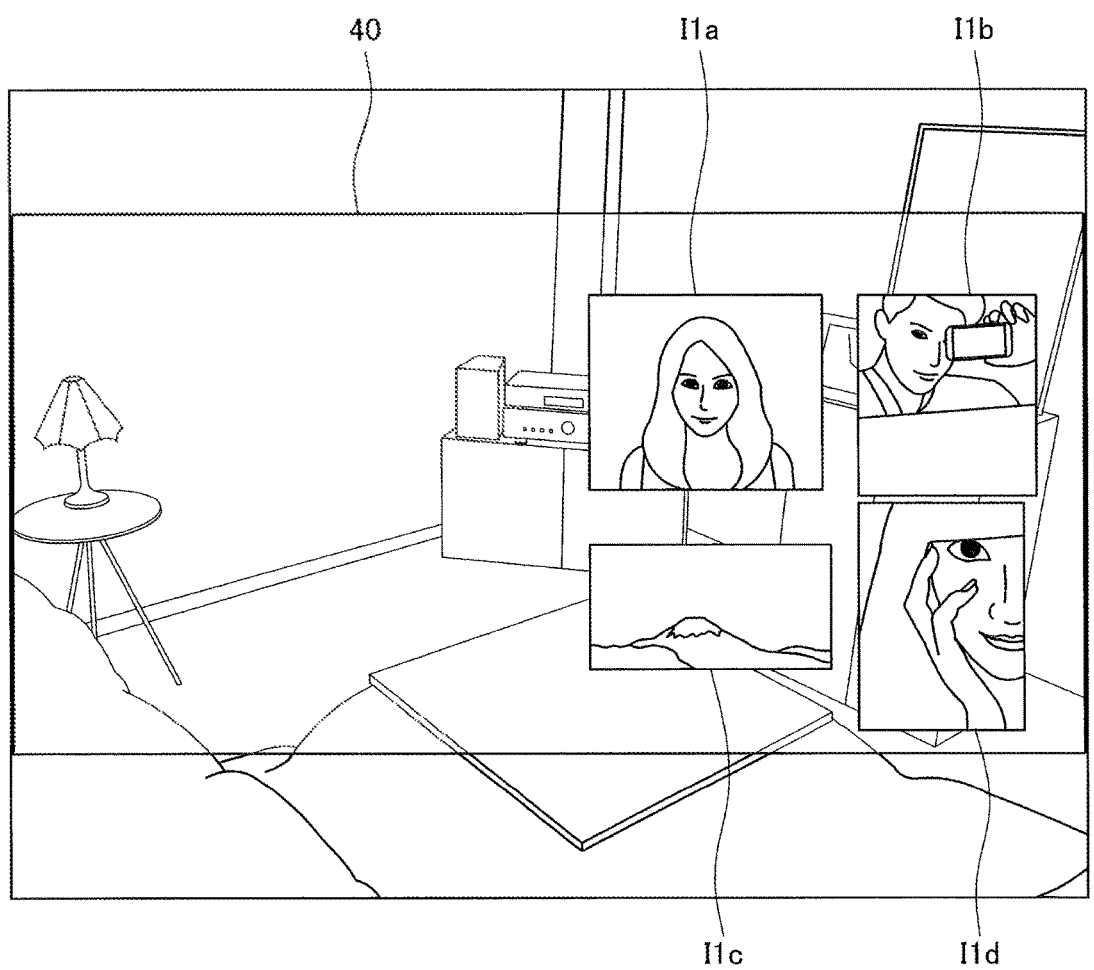
FIG. 29 is a diagram illustrating an example display of the transmissive display unit 40 during a process of displaying related information related to a topic during a phone call.

The description will now return to the flowchart in FIG. 27 and proceed. The system controller 110 displays images (for example, cover images) of URLs associated with the extracted topic on the transmissive display unit 40 as illustrated in FIG. 29 (step S106). In FIG. 29, multiple cover images I1a to I1d related to the topic of drama are displayed in the area on the right half of the transmissive display unit 40. However, the display position of the cover images is not limited thereto, and may also be an area on the left side of the transmissive display unit 40, for example.

Figure 30:
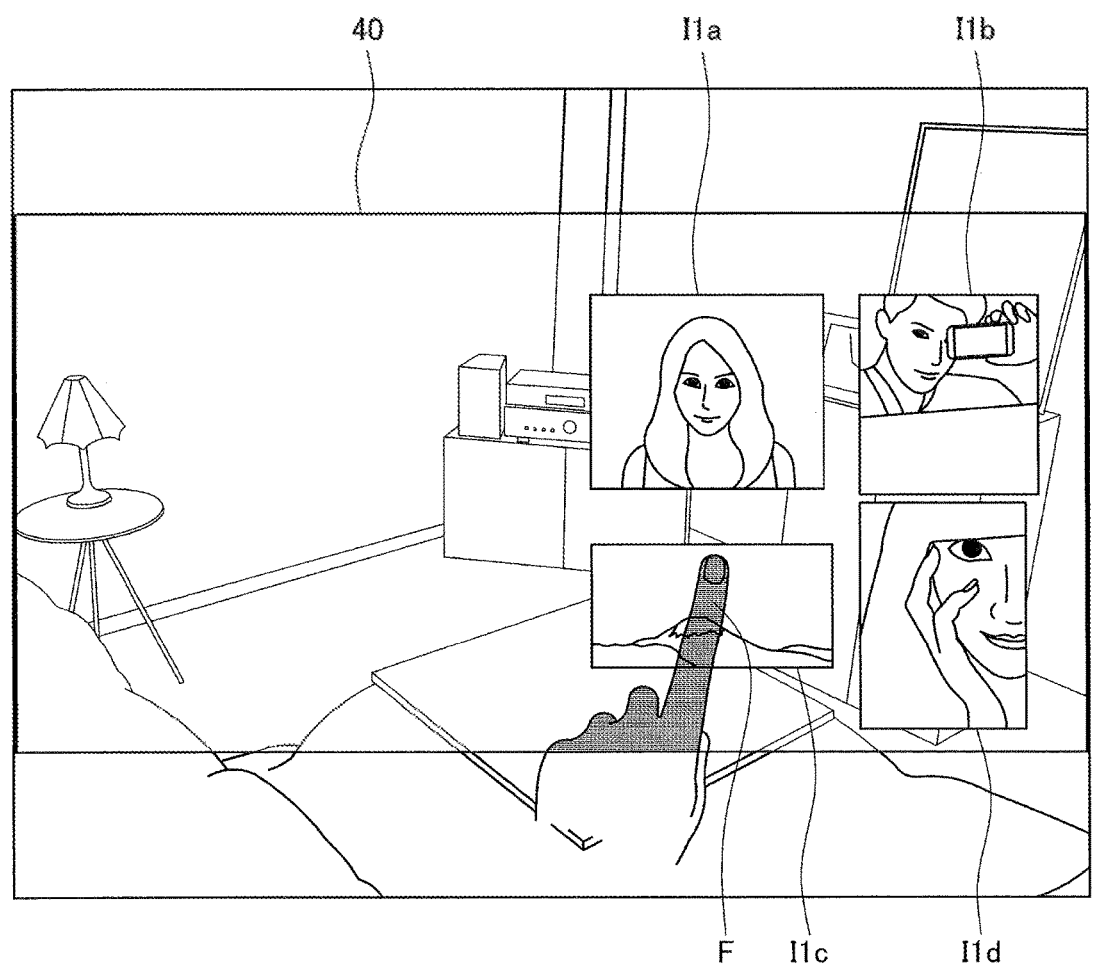
FIG. 30 is a diagram illustrating an example display of the transmissive display unit 40 during a process of displaying related information related to a topic during a phone call.

While the transmissive display unit 40 is displaying the multiple cover images, the user may place a fingertip over one of the cover images as illustrated in FIG. 30 to select one cover image from among the multiple displayed cover images. Note that if the system controller 110 recognizes via the image capture unit 103 that a hand is positioned at a position corresponding to the transmissive display unit 40, a pseudo-hand may be displayed superimposed over a cover image on the transmissive display unit 40, as illustrated in FIG. 30.

Next, the system controller 110 determines whether or not the user's fingertip and the one cover image have been overlapping for a predetermined time (step S108). Subsequently, if it is determined in step S108 that the fingertip and the one cover image have been overlapping for a predetermined time (Yes), the system controller 110 accesses the URL corresponding to the cover image overlapped by the fingertip (step S110). Consequently, a webpage corresponding to the cover image is acquired.

Figure 31:
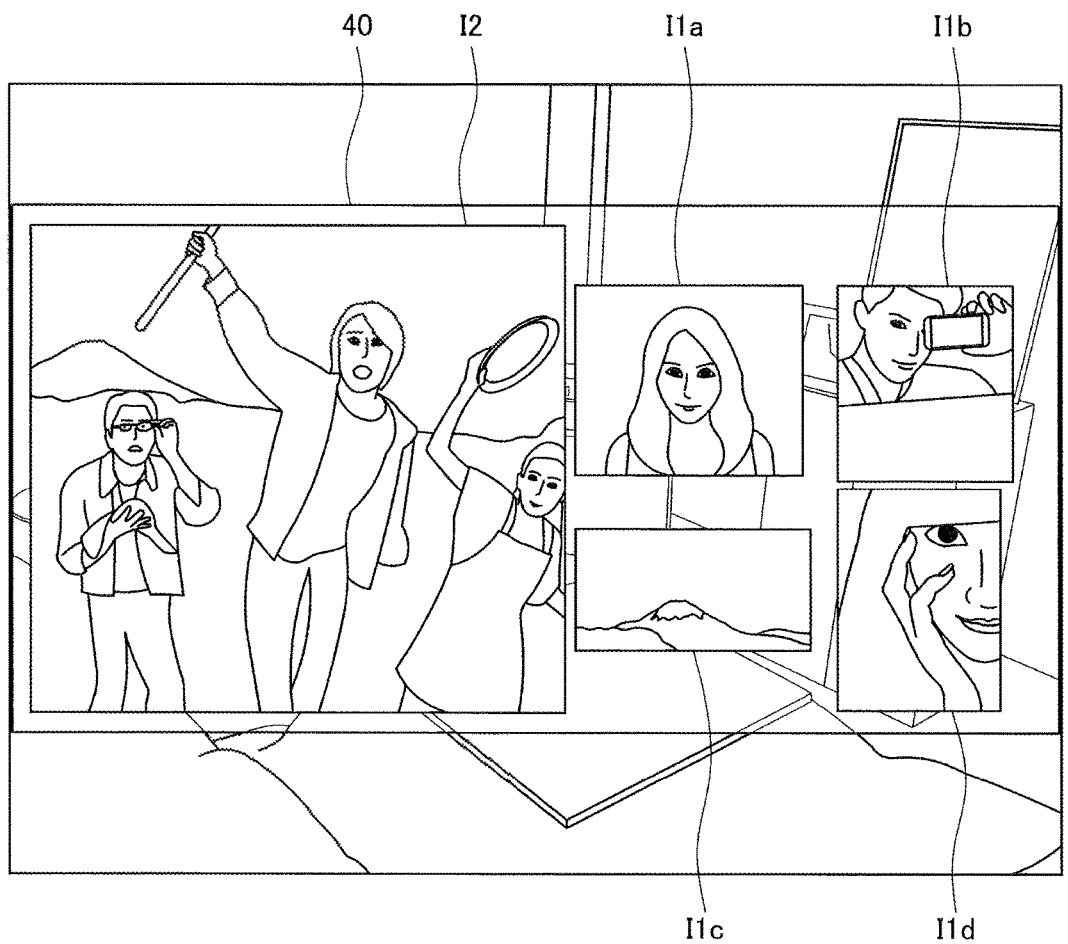
FIG. 31 is a diagram illustrating an example display of the transmissive display unit 40 during a process of displaying related information related to a topic during a phone call.

Next, the system controller 110 displays the acquired webpage in the area of the left half of the transmissive display unit 40 as illustrated in FIG. 31 (step S112). At this point, the webpage 12 is displayed full-screen, as illustrated in FIG. 31.

Figure 32:
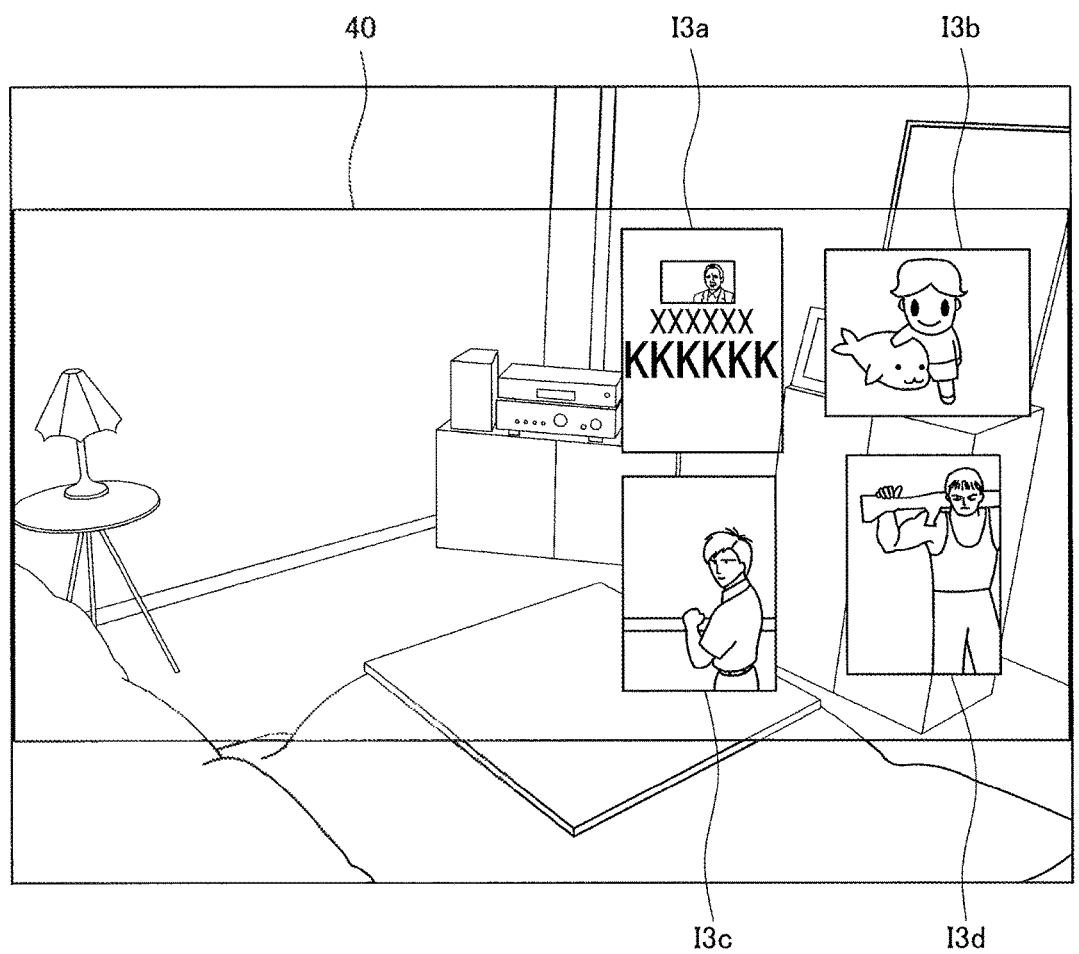
FIG. 32 is a diagram illustrating an example display of the transmissive display unit 40 during a process of displaying related information related to a topic during a phone call.

Next, the system controller 110 determines whether a user's operation is absent for a predetermined time after the display of the webpage (step S114). Subsequently, if the user's operation is absent in step S114 (Yes), the system controller 110 returns to the process of step S104, extracts another topic, and displays cover images as illustrated in FIG. 32. In FIG. 32, multiple cover images 13a to 13d related to the topic of anime are displayed.

Note that if the user performs an operation within a predetermined time in step S114, the system controller 112 conducts a process corresponding to the user's operation (for example, browsing or accessing another URL).

According to the process of displaying related information based on a topic extracted from a conversation as discussed above, the user is able to view images or the like corresponding to a topic on the transmissive display unit 40 during a phone call with a third party.

According to the display process discussed above, the system controller 110 generates related information of speech or an image (webpage) according to speech or an image acquired during a phone call, and displays the related information on the transmissive display unit 40. Specifically, the system controller 110 accesses a URL related to a topic corresponding to speech (conversation) acquired during the phone call, and acquires a webpage corresponding to the URL. Subsequently, the system controller 110 displays the acquired webpage on the transmissive display unit 40. As a result, by viewing the displayed webpage, the user more easily obtains information about a topic related to a conversation while making a phone call.

(5-2. Process of Displaying Related Information Related to TV Screen being Viewed at the Same Time)

When the user is watching TV at the same time as a third party, the mobile terminal 10 according to the present embodiment is able to display, on the transmissive display unit 40, related information about the TV screen being viewed. Hereinafter, a process of displaying related information related to a TV screen being viewed at the same time will be described with reference to FIGS. 33 to 38.

Figure 33:
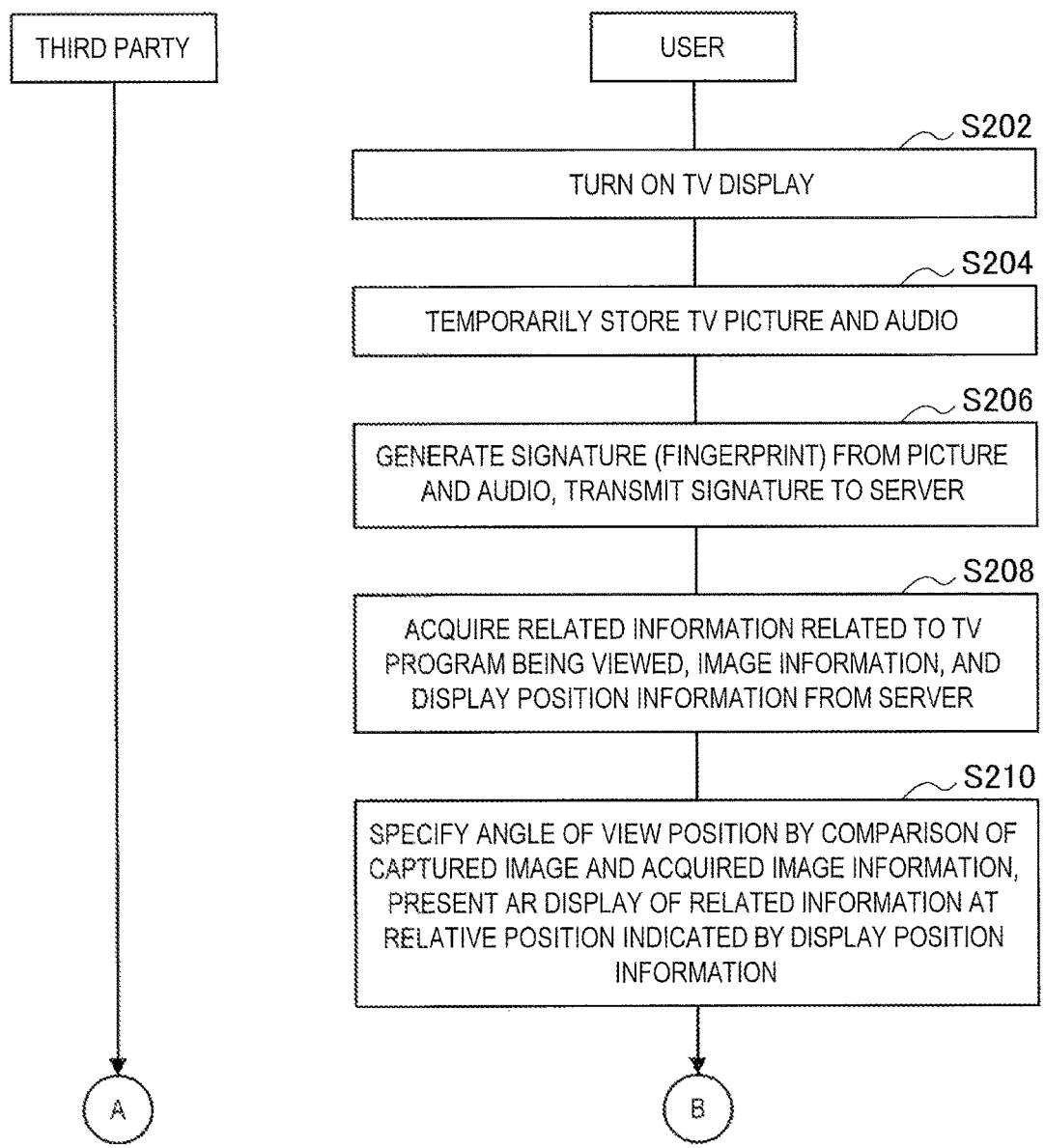
FIG. 33 is a flowchart illustrating a process of displaying related information related to a TV screen being viewed at the same time.
Figure 34:
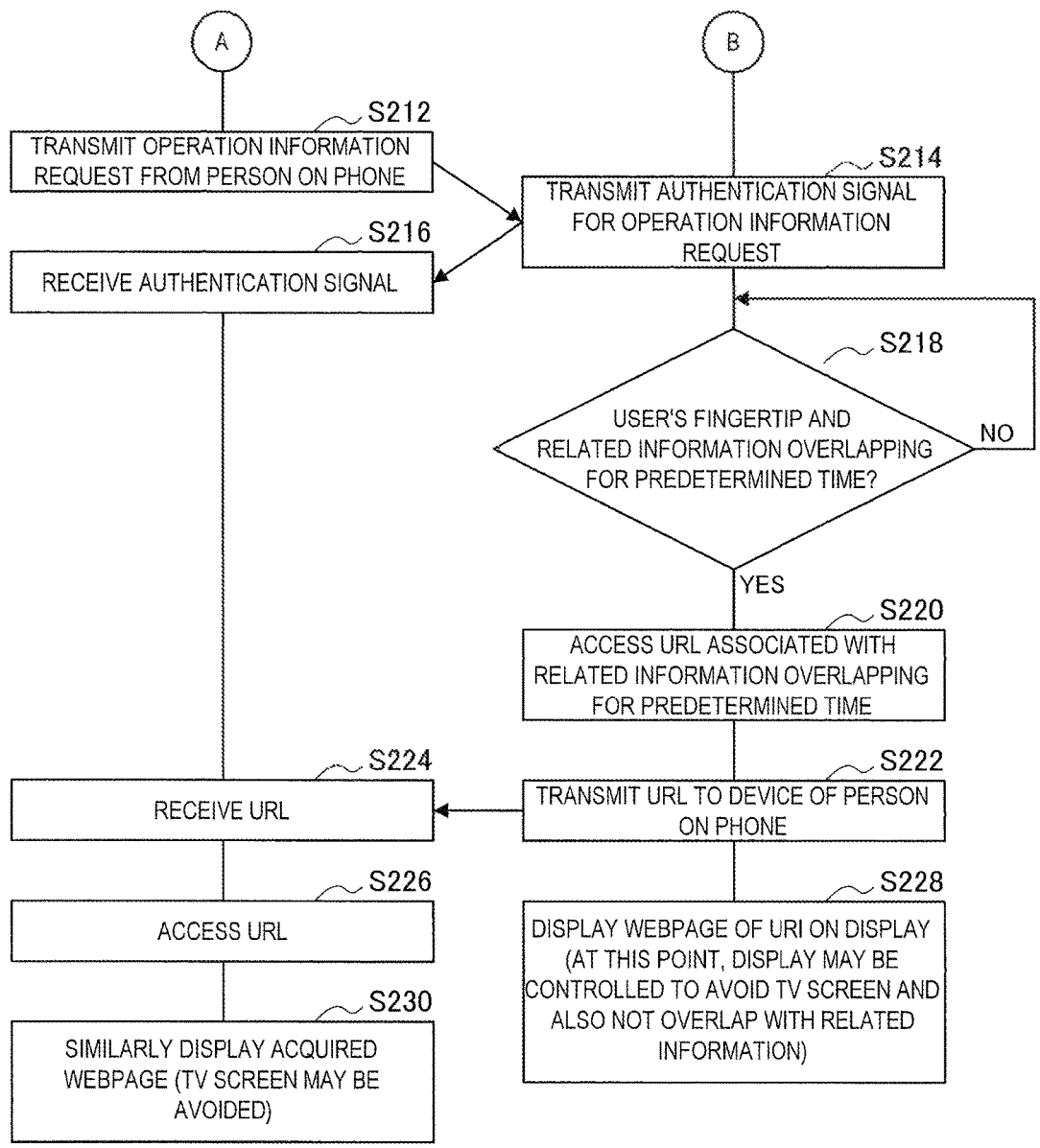
FIG. 34 is a flowchart illustrating a process of displaying related information related to a TV screen being viewed at the same time.

FIGS. 33 and 34 are a flowchart illustrating a process of displaying related information related to a TV screen being viewed at the same time. FIGS. 35 to 38 are diagrams illustrating an example display of the transmissive display unit 40 during a process of displaying related information related to a TV screen being viewed at the same time.

The flowchart in FIG. 33 starts when the user of the mobile terminal 10, who is in the middle of a phone call with a third party, turns on the display of a TV to view (step S202). At this point, the transmissive display unit 40 is in the open state and positioned in front of the user's eye.

Next, the system controller 110 of the mobile terminal 10 temporarily stores the picture and audio of a TV program being broadcast (step S204). Next, the system controller 110 generates a signature from the picture and audio (for example, a fingerprint), and transmits the signature to a server, which is an external device (step S206). Note that although the above generates a signature from a picture and audio, the configuration is not limited thereto, and a signature may also be generated from audio only.

The server, on the basis of the signature received from the mobile terminal 10, generates related information related to the TV program being viewed, image information, display position information for the related information, and the like. Herein, the related information is the title of the TV program being viewed, and information related to the characters, for example. The image information is information for deciding the angle of the TV screen.

Figure 35:
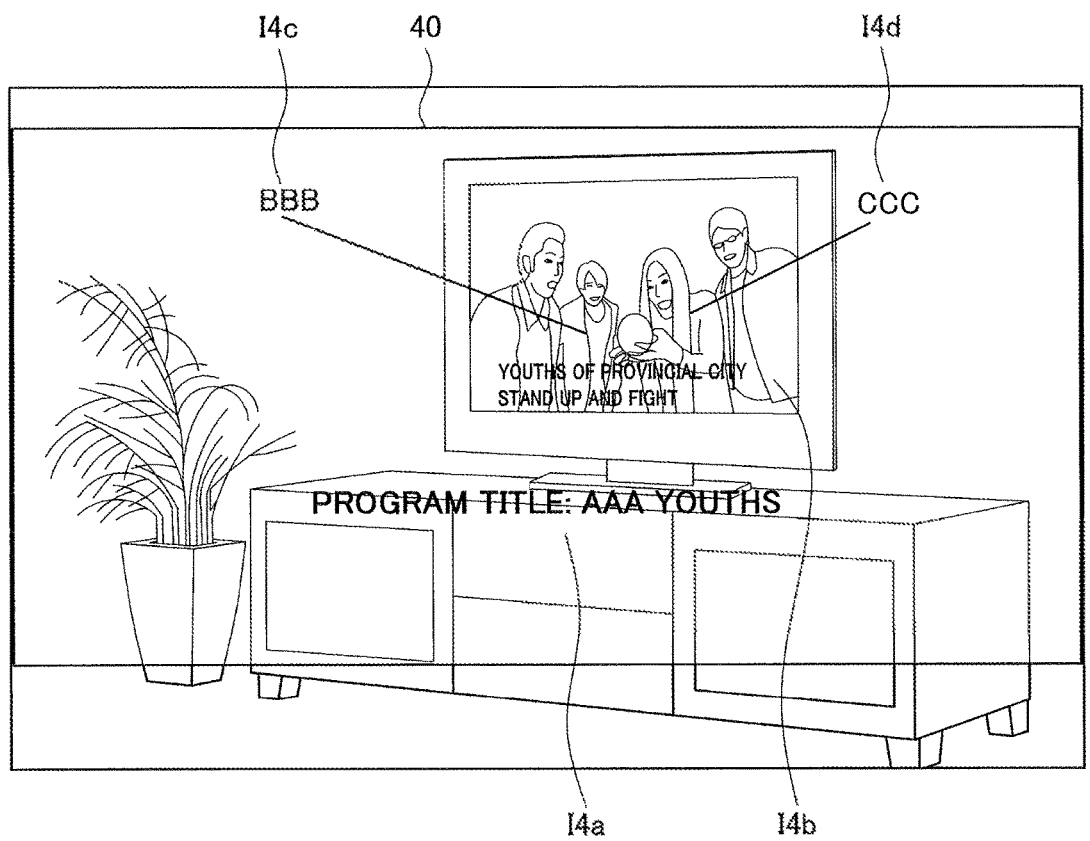
FIG. 35 is a diagram illustrating an example display of the transmissive display unit 40 during a process of displaying related information related to a TV screen being viewed at the same time.

Next, the system controller 110 acquires information generated by the service, such as the related information related to the TV program being viewed, image information, and display position information, from the server (step S208). Next, the system controller 110, by comparing an image captured by the image capture unit 103 to the acquired image information, specifies the angle of the TV screen (step S210). Subsequently, the system controller 110 presents an AR display of the related information at a predetermined relative position with respect to the TV screen indicated by the acquired display position information, as illustrated in FIG. 35. In FIG. 35, information 14*a* indicating the program title, information 14*b* indicating details about the program, and information 14*c* and 14*d* indicating characters are presented as an AR display.

After that, suppose that a terminal used by the person on the phone, that is, the third party, transmits an operation information request (step S212). Subsequently, by having the mobile terminal 10 transmit an authentication signal to the terminal of the person on the phone in response to the operation information request (step S214), the terminal of the person on the phone receives an authentication signal (step S216).

Figure 36:
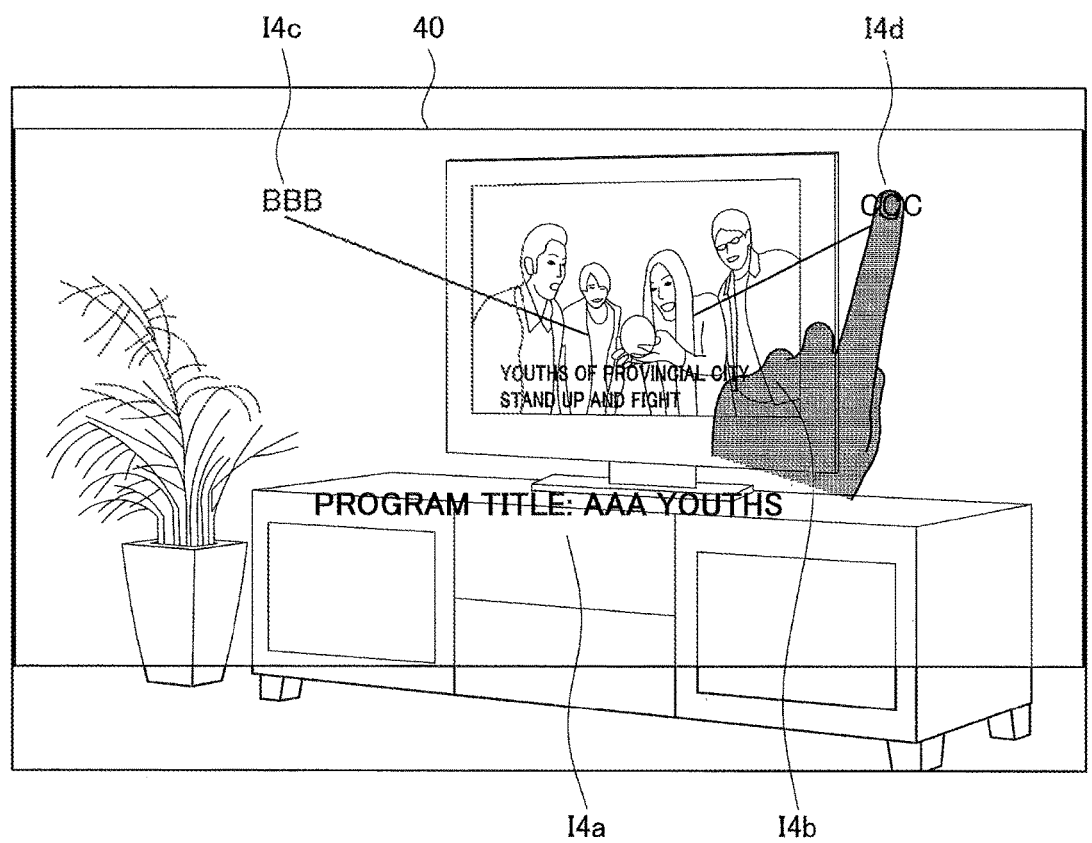
FIG. 36 is a diagram illustrating an example display of the transmissive display unit 40 during a process of displaying related information related to a TV screen being viewed at the same time.

Next, the system controller 110 of the mobile terminal 10 determines whether or not the user's fingertip and the related information have been overlapping for a predetermined time (step S218). Subsequently, if it is determined in step S218 that the fingertip and the related information have been overlapping for a predetermined time (Yes), in the case in which the fingertip is overlapping the information 14*d* indicating a character as illustrated in FIG. 36, for example, the system controller 110 accesses an URL associated with the related information 14*d* overlapped by the fingertip (step S220). Consequently, a webpage corresponding to the related information 14*d* is acquired.

Next, the system controller 110 transmits information including the URL accessed in step S220 to the terminal of the person on the phone (step S222), and thus the terminal of the person on the phone receives information including the URL (step S224). The terminal of the person on the phone accesses the URL included in the received information (step S226).

Figure 37:
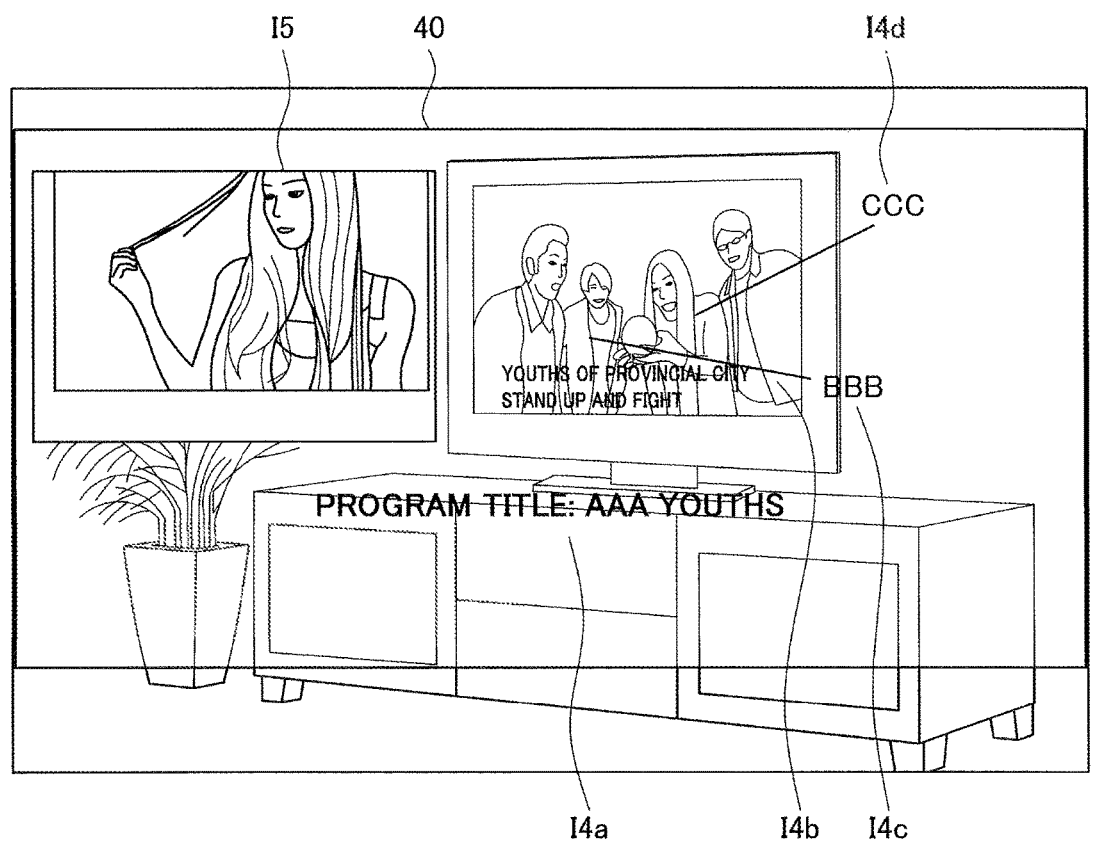
FIG. 37 is a diagram illustrating an example display of the transmissive display unit 40 during a process of displaying related information related to a TV screen being viewed at the same time.

The system controller 110 of the mobile terminal 10 displays the webpage 15 of the accessed URL on the transmissive display unit 40, as illustrated in FIG. 37 (step S228). At this point, the system controller 110 displays the webpage 15 while avoiding the TV screen, and also modifies the position of the related information 14*c* so that the related information 14*c* and the webpage do not overlap.

Figure 38:
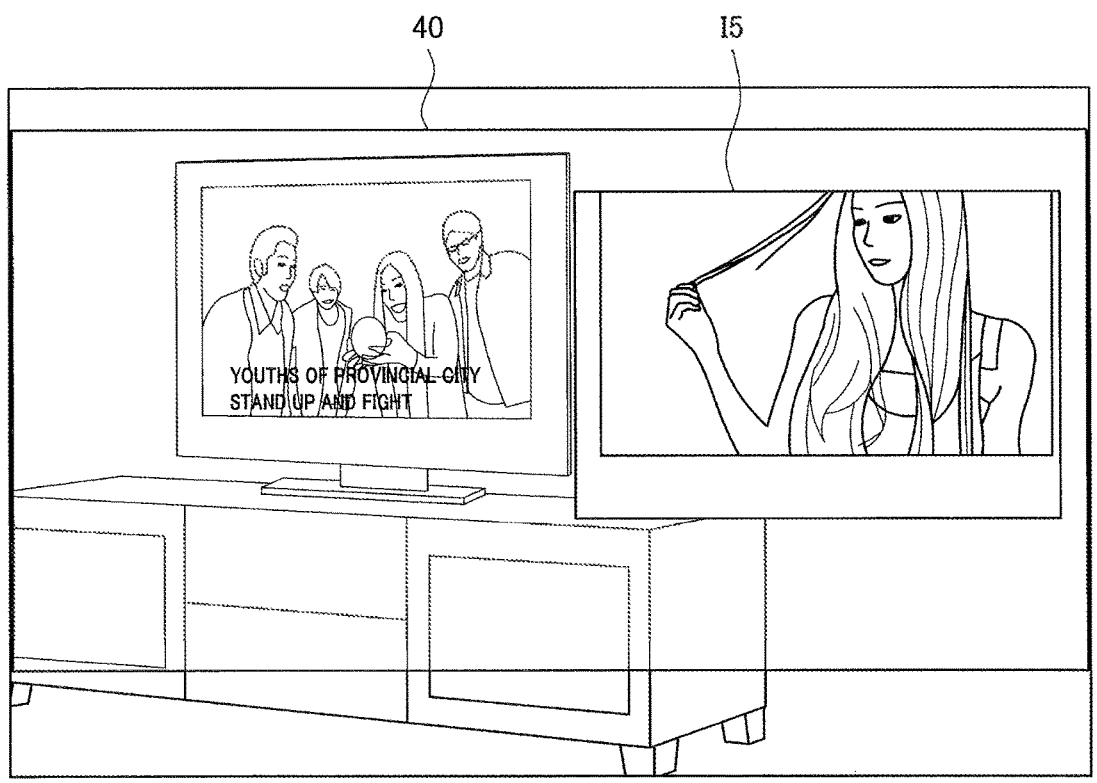
FIG. 38 is a diagram illustrating an example display of the transmissive display unit 40 during a process of displaying related information related to a TV screen being viewed at the same time.

The terminal of the person on the phone, similarly to the mobile terminal 10, displays the webpage of the accessed URL (step S230). If the terminal of the person on the phone and the mobile terminal 10 are similar terminals, the display control described in step S228 above is conducted, as illustrated in FIG. 38. Note that FIG. 38 is an example display of the transmissive display unit 40 of a mobile terminal used by the person on the phone.

According to the display process discussed above, the system controller 110 accesses an URL corresponding to a TV screen being viewed at the same time as the person on the phone, and acquires a webpage corresponding to the URL. Subsequently, the system controller 110 displays the acquired webpage on the transmissive display unit 40. As a result, by viewing the displayed webpage, the user more easily obtains additional information related to the TV screen being viewed.

(5-3. Process of Automatically Displaying Summary of Talk with Other Person)

When the user is in the middle of a phone call with a third party (the person on the phone), the mobile terminal 10 according to the present embodiment is able to generate, and automatically display on the transmissive display unit 40, a summary of the talk with the person on the phone. Hereinafter, a process of displaying a summary of a talk with a person on the phone will be described with reference to FIGS. 39 to 41.

Figure 39:
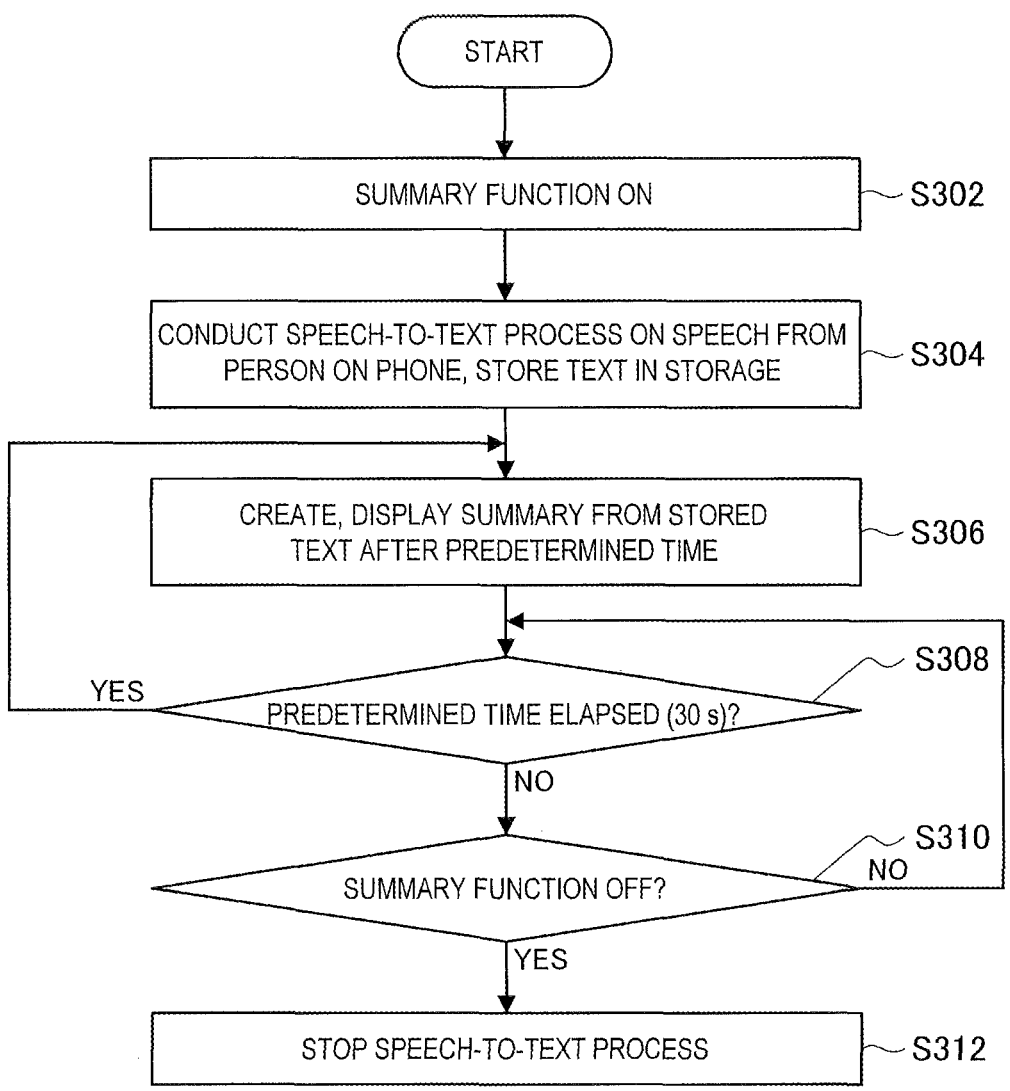
FIG. 39 is a flowchart illustrating a process of displaying a summary of a talk with a person on the phone.
Figure 40:
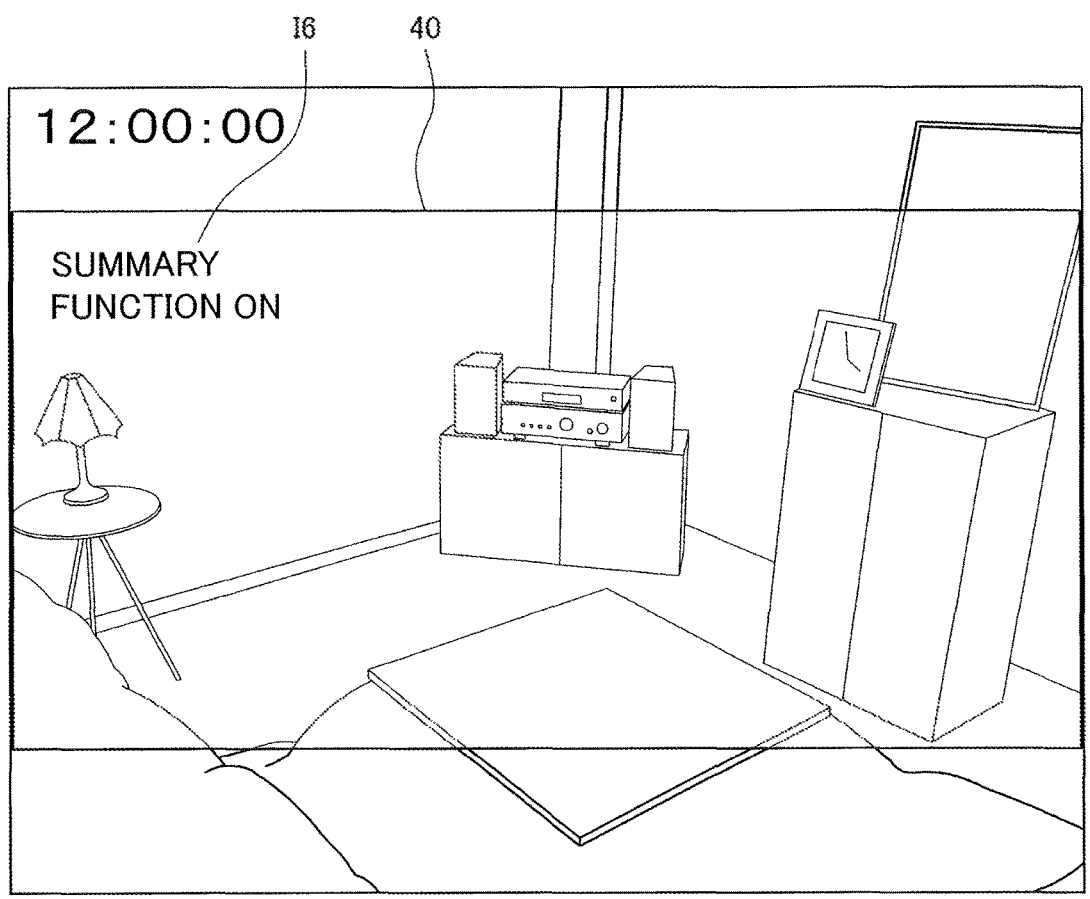
FIG. 40 is a diagram illustrating an example display of the transmissive display unit 40 during a process of displaying a summary of a talk with a person on the phone.

FIG. 39 is a flowchart illustrating a process of displaying a summary of a talk with a person on the phone. FIGS. 40 and 41 are diagrams illustrating an example display of the transmissive display unit 40 during a process of displaying a summary of a talk with a person on the phone.

The flowchart in FIG. 39 starts when the user of the mobile terminal 10 makes a phone call to the person on the phone while the transmissive display unit 40 is also in the open state and positioned in front of the user's eye.

First, if the user performs an operation on the operating unit to turn on a summary function, the system controller 110 of the mobile terminal 10 turns on the summary function (step S302). At this point, as illustrated in FIG. 40, information 16 indicating that the summary function is in the on state is displayed on the transmissive display unit 40.

Next, the system controller 110 of the mobile terminal 10 converts the speech of the person on the phone into text with the audio input/output control 128, and stores the convened text data in the storage 125 (step S304).

Next, after a predetermined time (for example, 5 minutes), the system controller 110 creates a summary from the content of the text data for the predetermined time stored in the storage 125, and as illustrated in FIG. 40(*a*), displays the summary on the transmissive display unit 40 (step S306). In FIG. 40(*a*), a summary 17*a* is displayed in the area of the right half of the transmissive display unit 40.

An example of a method of creating a summary of text data will now be described. To create a summary of text data, first, the text data is divided into components such as words, phrases, or sentences, and features such as the frequency at which the divided words, phrases, or the like appear and their mutual closeness are acquired. Subsequently, on the basis of the acquired features of the words, phrases, or the like, the importance of the words, phrases, or the like in the text data is ranked while taking into account how characteristics such as order and closeness affect the summary. Subsequently, summary text is created on the basis of the ranking.

The description will now return to FIG. 39 and proceed. The system controller 110 determines whether or not a predetermined time has elapsed since display of the summary (step S308). Herein, the predetermined time is 30 seconds, for example, but is not limited thereto.

Subsequently, if the predetermined time has elapsed in step S308 (Yes), the system controller 110 again creates a summary of the talk with the person on the phone, and displays the summary on the transmissive display unit 40, as illustrated in FIGS. 40(*b*) and 40(*c*). FIGS. 40(*b*) and 40(*c*) illustrate summaries 17*b* and 17*c* that differ from FIG. 40(*a*). In other words, the system controller 110 repeats the creation and display of a summary.

On the other hand, if the predetermined time has not yet elapsed in step S308 (No), the system controller 110 determines whether or not the user performed an operation on the operating unit to turn off the summary function (step S310). Subsequently, if the summary function is turned off in step S310 (Yes), the system controller 110 stops the process of converting the speech of the person on the phone into text with the audio input/output control 128 (step S312).

According to the display process discussed above, the system controller 110 generates, and displays on the transmissive display unit 40, a summary of the content of speech acquired from the terminal of a person on the phone during a phone call, and thus the content spoken by the person on the phone during a phone call may be appropriately understood.

(5-4. Process of Displaying Navigation Information Based on Gesture by Person on the Phone)

The mobile terminal 10 according to the present embodiment is able to generate navigation information on the basis of gesture information from a person on the phone acquired from the terminal of the person on the phone, and display the generated navigation information on the transmissive display unit 40. Hereinafter, a process of displaying navigation information based on a gesture by a person on the phone will be described with reference to FIGS. 42 and 43.

Figure 42:
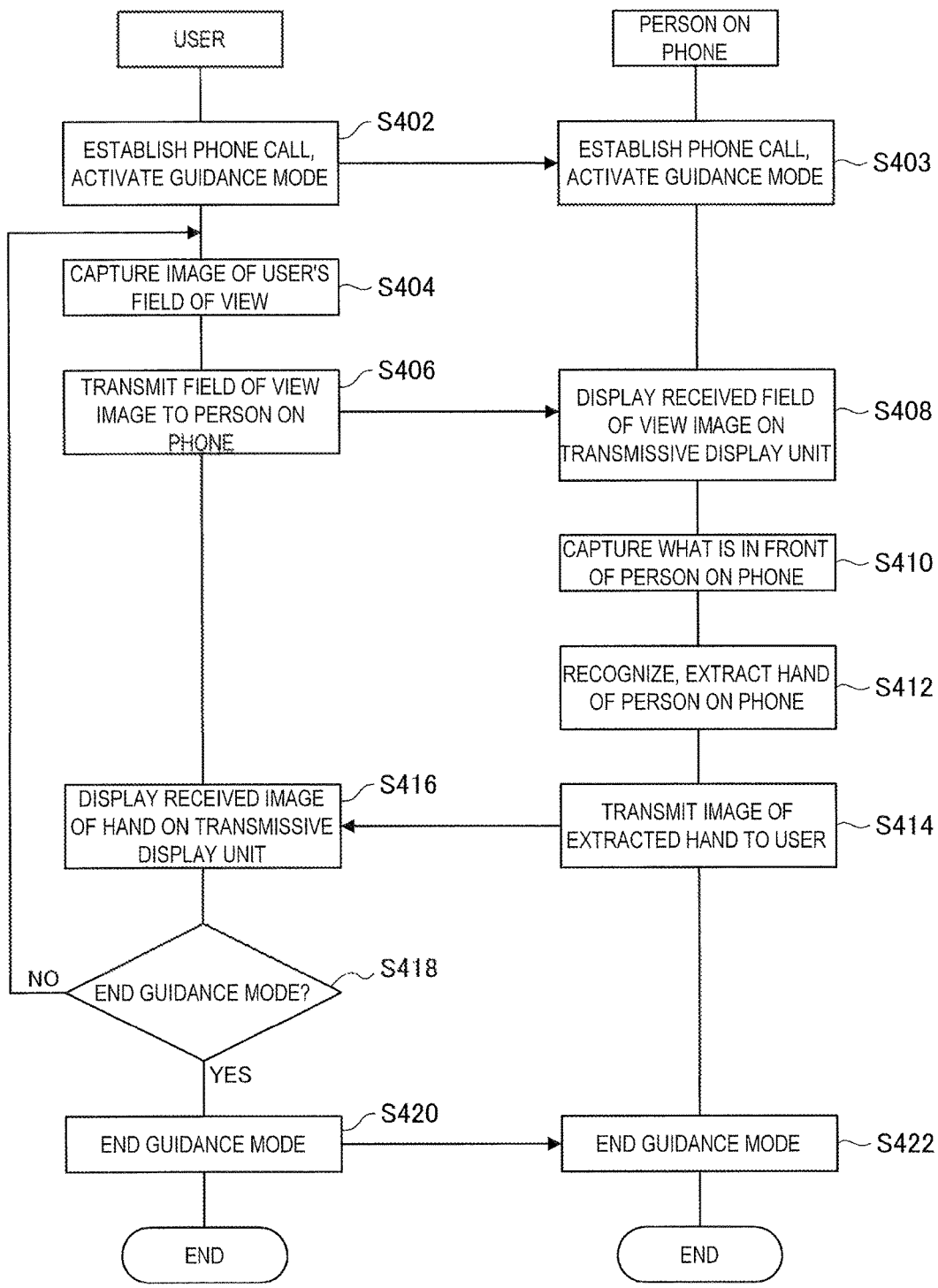
FIG. 42 is a flowchart illustrating a process of displaying navigation information based on a gesture by a person on the phone.
Figure 43:
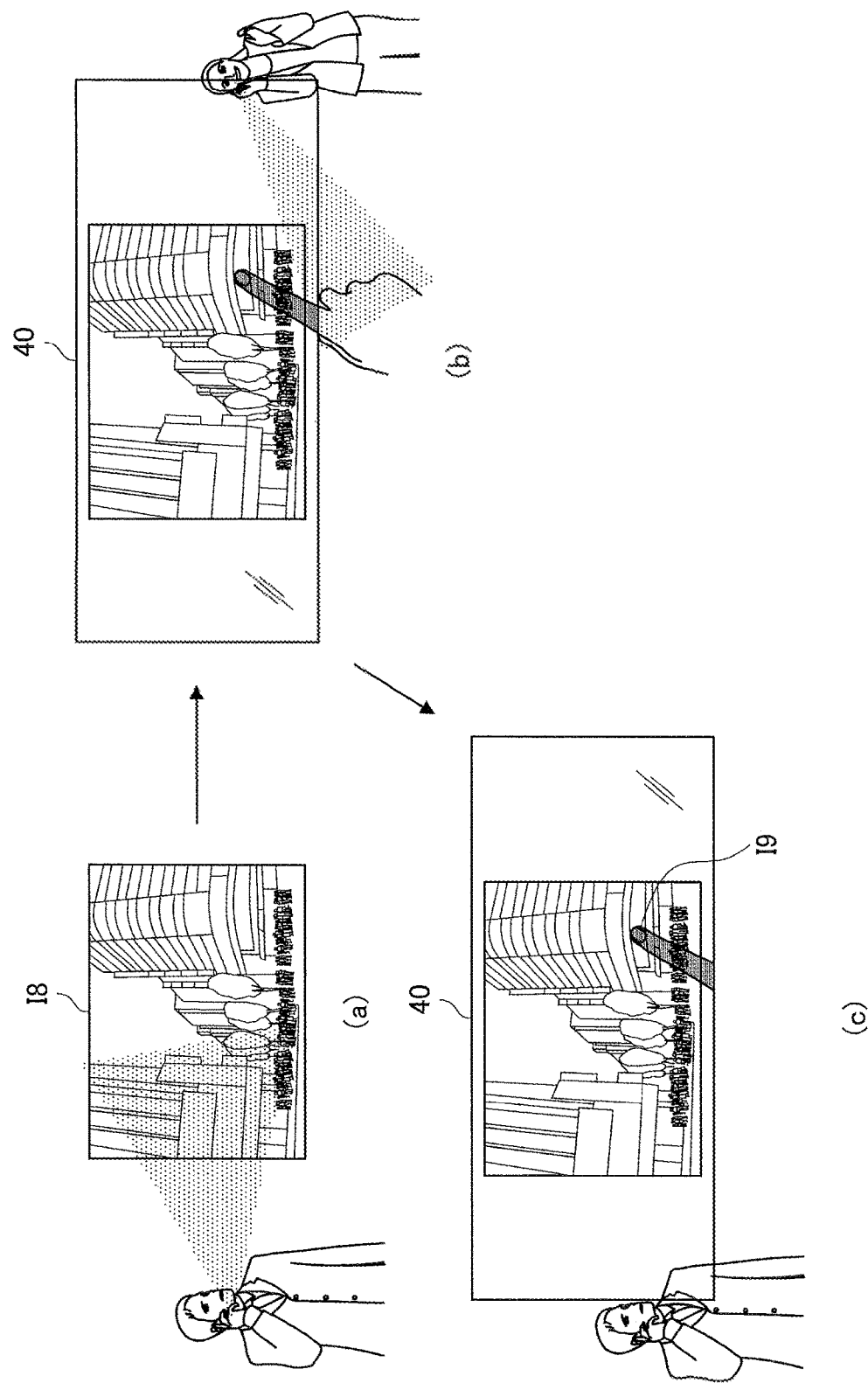
FIG. 43 is an explanatory diagram for explaining a flow of a process of displaying navigation information based on a gesture by a person on the phone.

FIG. 42 is a flowchart illustrating a process of displaying navigation information based on a gesture by a person on the phone. FIG. 43 is an explanatory diagram for explaining a flow of a process of displaying navigation information based on a gesture by a person on the phone.

The flowchart in FIG. 42 starts when the mobile terminal 10 of the user establishes a phone call with the terminal of the person on the phone, and activates a guidance mode (step S402). The mobile terminal 10 of the user, after activating the guidance mode, transmits that information to the terminal of the person on the phone. Consequently, the terminal of the person on the phone also activates guidance mode (step S403). Note that the present display process supposes that the terminal of the person on the phone is also a mobile terminal 10 that includes a transmissive display unit 40.

Next, the mobile terminal 10 of the user (specifically, the system controller 110) uses the image capture unit 103 to capture an image 18 of the user's field of view as illustrated in FIG. 43(*a*) (step S404). Next, the mobile terminal 10 of the user transmits the captured field-of-view image to the terminal of the person on the phone (step S406). At this point, the user asks the person on the phone a question related to guidance to a destination, for example.

The mobile terminal 10 of the person on the phone displays the received field-of-view image on the transmissive display unit 40 (step S408). Next, the mobile terminal 10 of the person on the phone uses the image capture unit 103 to capture an image of what is in front of the person on the phone (the area including the transmissive display unit 40) (step S410). The person on the phone, in order to answer the user's question related to guidance to the destination, places a finger over the destination in the image displayed on the transmissive display unit 40, as illustrated in FIG. 43(*b*). Subsequently, the mobile terminal 10 of the person on the phone captures an image of the transmissive display unit 40 together with the finger of the person on the phone.

Next, the mobile terminal 10 of the person on the phone recognizes and extracts the hand of the person on the phone from the captured image (step S412). Next, the mobile terminal 10 of the person on the phone transmits an image of the extracted hand to the mobile terminal 10 of the user (step S414).

Next, the mobile terminal 10 of the user displays the image 19 of the hand received from the terminal of the person on the phone on the transmissive display unit 40 as navigation information, as illustrated in FIG. 43(*c*) (step S416). As a result, the user is able to easily grasp the destination. After that, if the user performs an operation to end the currently active guidance mode or the like (step S418: Yes), the mobile terminal 10 of the user ends the currently active guidance mode (step S420). At this point, the mobile terminal 10 of the user ends the guidance mode, and additionally transmits that information to the mobile terminal 10 of the person on the phone. Consequently, the mobile terminal 10 of the person on the phone also ends the currently active guidance mode (step S422). Consequently, the present display process ends.

Note that although an image of a hand is displayed on the transmissive display unit 40 as navigation information in the above description, the configuration is not limited thereto. For example, the navigation information may also be an arrow pointing to the destination, a circular or square graphic enclosing the destination, or text or the like. In addition, audio related to the destination may also be output as navigation information.

According to the display process discussed above, the system controller 110 acquires action information related to an action by a person on the phone during a phone call, generates navigation information based on the acquired action information, and displays the navigation information on the transmissive display unit 40. Specifically, the system controller 110 acquires gesture information from the person on the phone, and displays navigation information based on the acquired gesture information on the transmissive display unit 40. Consequently, by viewing the navigation information displayed on the transmissive display unit 40, the user more easily understands the guidance of the person on the phone, for example.

(5-5. Process of Displaying Navigation Information Based on Keyword Extracted from Speech)

The mobile terminal 10 according to the present embodiment is able to extract a keyword specifying a destination from speech by a person on the phone, and display navigation information to the destination based on the extracted keyword on the transmissive display unit 40. Hereinafter, a process of displaying navigation information based on a keyword extracted from speech by a person on the phone will be described with reference to FIGS. 44 and 45.

Figure 44:
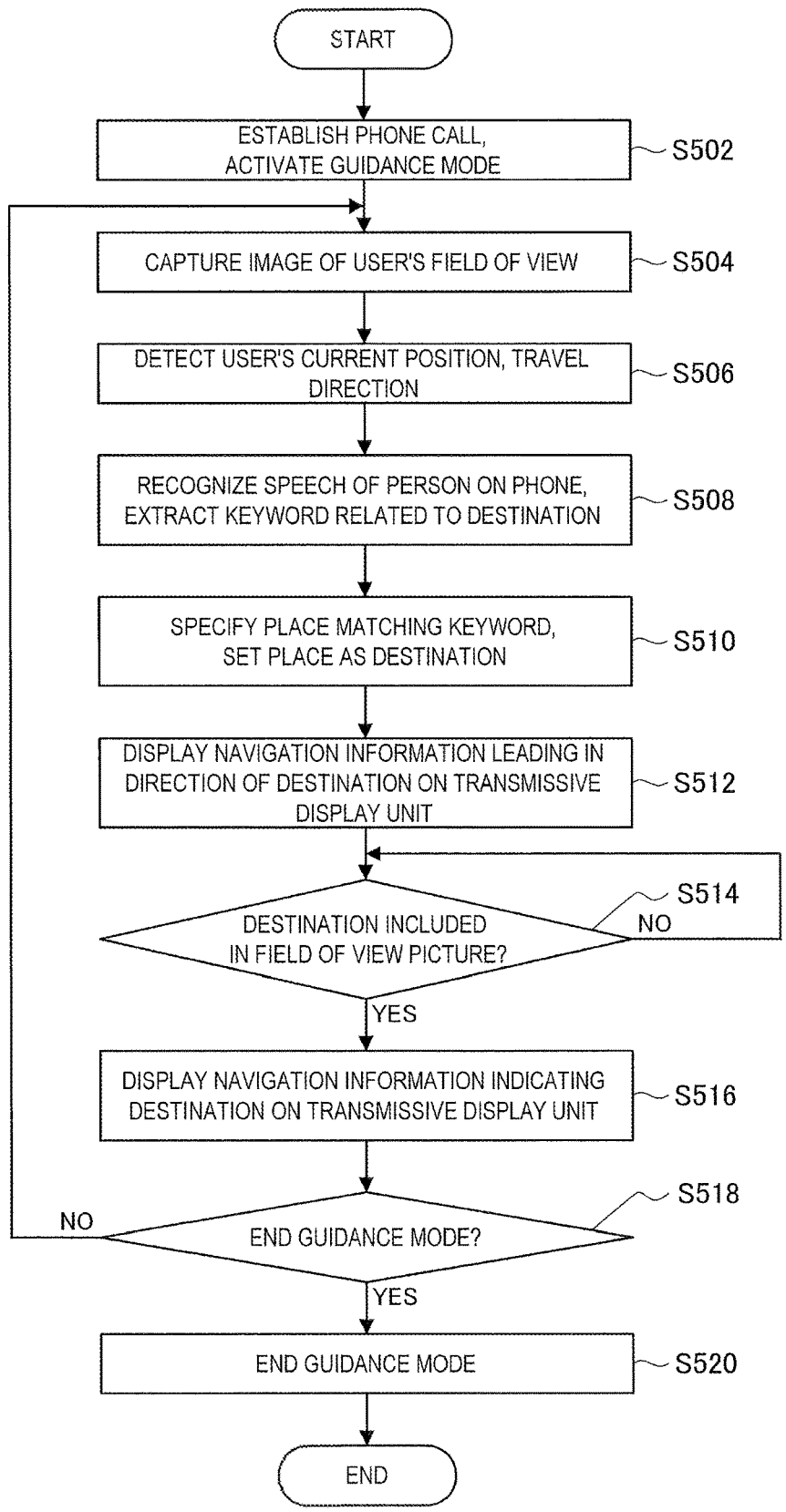
FIG. 44 is a flowchart illustrating a process of displaying navigation information based on a keyword extracted from speech by a person on the phone.

FIG. 44 is a flowchart illustrating a process of displaying navigation information based on a keyword extracted from speech by a person on the phone. FIG. 45 is an explanatory diagram for explaining a flow of a process of displaying navigation information based on a keyword extracted from speech by a person on the phone.

The flowchart in FIG. 44 starts when the mobile terminal 10 of the user establishes a phone call with the terminal of the person on the phone, and activates a guidance mode (step S502). Note that in the present display process, it is sufficient for the terminal of the person on the phone to at least have a telephony function.

Next, the system controller 110 of the mobile terminal 10 uses the image capture unit 103 to capture an image from the user's field of view as illustrated in FIG. 45(*a*) (step S504). Next, the mobile terminal 10 uses the GPS receiving unit 121 to detect the current position and travel direction of the user of the mobile terminal 10 (step S506).

After that, suppose that the user asks the person on the phone a question related to guidance to a destination, for example, and the person on the phone makes speech related to the destination ("ABC department store") in response to the user's question, as in FIG. 45(*b*).

Subsequently, the system controller 110 conducts speech recognition to recognize the speech from the person on the phone, and extracts a keyword related to the destination (step S508). Herein, the system controller 110 extracts "ABC department store" as a keyword.

Next, the system controller 110 specifies, from map information, a place matching the extracted keyword near the current position of the user, and sets the specified place as the destination (step S510). Subsequently, the system controller 110 displays navigation information leading in the direction of the destination on the transmissive display unit 40, as illustrated in FIG. 45(*c*) (step S512). In FIG. 45(*c*), an arrow 110 indicating the direction of the destination is displayed as the navigation information.

Next, the system controller 110 determines, from the current position and travel direction of the user, whether or not the destination is included within a field-of-view picture (step S514). Subsequently, if it is determined that the destination is included in step S514 (Yes), the system controller 110 displays navigation information indicating the destination on the transmissive display unit 40, as illustrated in FIG. 45(*d*) (step S516). In FIG. 45(*d*), a circular graphic 111 enclosing the destination is displayed as the navigation information. After that, if the user performs an operation to end the currently active guidance mode or the like (step S518: Yes), the system controller 110 ends the currently active guidance mode (step S520). Consequently, the present display process ends.

Note that although an arrow indicating the direction of the destination or a circular graphic enclosing the destination is displayed as navigation information in the above description, the configuration is not limited thereto. For example, instead of the arrow, text or a graphic may be displayed, and instead of the circular graphic, another graphic (a square, for example) or text may be displayed. In addition, audio related to the direction to the destination of the place of the destination may also be output as navigation information.

According to the display process discussed above, the system controller 110 acquires speech spoken by a person on the phone, and displays navigation information based on the acquired speech on the transmissive display unit 40. Consequently, by viewing the navigation information displayed on the transmissive display unit 40, the user more easily understands the guidance of the person on the phone, for example.

<6. Conclusion>

In the mobile terminal 10 discussed above, the transmissive display unit 40 may be disposed in a plane intersecting the principal face of the casing 20 while audio is being output by an audio output unit. Consequently, since the transmissive display unit 40 is positioned at an easy-to-see position while the user is listening to audio being output by placing the mobile terminal 10 against his or her ear, for example, the user is able to suitably grasp the display of the transmissive display unit 40.

Particularly, as illustrated in FIG. 3, the transmissive display unit 40 may be disposed in a plane intersecting the principal face of the casing 20 during a phone call with a third party. Consequently, since the transmissive display unit 40 is positioned at an easy-to-see position while the user is on the phone with a third party, the user more easily grasps the display of the transmissive display unit 40.

It should be understood by those skilled in the art that various modifications, combinations, sub-combinations and alterations may occur depending on design requirements and other factors insofar as they are within the scope of the appended claims or the equivalents thereof.

The steps illustrated in the flowcharts in the embodiments naturally include processes performed in the described and chronological order, and further include processes that are not necessarily performed in chronological order, but are also performed in parallel or are individually performed. Needless to say, it is also possible to change the order as necessary even in the steps for chronologically performing the processes.

The processing by the information processing apparatus described herein may be realized by any one of software, hardware, and a combination of software and hardware. Programs included in the software are stored in advance, for example, in recording media provided inside or outside of the respective apparatuses. Each program is read out, for example, by random access memory (RAM) when each program is executed, and executed by a processor such as a CPU.

Additionally, the present technology may also be configured as below.

(1)

A mobile terminal including:

a casing that includes an audio output unit that outputs audio; and a transmissive display unit provided rotatable about the casing, wherein the transmissive display unit is disposable in a plane intersecting a principal face of the casing while the audio output unit is outputting audio.

(2)

The mobile terminal according to (1), further including:

a telephony unit that makes a phone call, wherein the transmissive display unit is disposable in a plane intersecting a principal face of the casing during a phone call.

(3)

The mobile terminal according to (1) or (2), wherein the transmissive display unit rotates about the casing between a closed state and an open state, and a display face of the transmissive display unit positioned in the closed state and a principal face of the casing are positioned on a same face.

(4)

The mobile terminal according to (1) or (2), wherein the transmissive display unit rotates about the casing between a closed state and an open state, and a display face of the transmissive display unit positioned in the closed state and a principal face of the casing are parallel to each other.

(5)

The mobile terminal according to any one of (1) to (4), wherein the transmissive display unit is disposable in a plane intersecting the principal face when positioned in a first open state rotated in a first direction about the casing, or a second rotated state rotated in a reverse direction of the first direction.

(6)

The mobile terminal according to any one of (1) to (5), wherein the transmissive display unit includes a non-transmissive second display unit.

(7)

The mobile terminal according to (6), wherein the second display unit presents a display when the transmissive display unit is positioned in a closed state with respect to the casing.

(8)

The mobile terminal according to any one of (1) to (7), further including:

a detecting unit that detects a rotated state of the transmissive display unit; and a control unit that controls display of the transmissive display unit, wherein the control unit controls display according to a rotated state of the transmissive display unit detected by the detecting unit.

(9)

The mobile terminal according to any one of (1) to (8), further including:

a telephony unit that makes a phone call;

an acquisition unit that acquires speech or an image; and a control unit that, according to speech or an image acquired by the acquisition unit, generates and displays on the transmissive display unit related information related to the speech or the image.

(10)

The mobile terminal according to (9), further including:

a web information acquisition unit that accesses a URL and acquires web information, wherein the control unit controls accesses to a URL related to a topic corresponding to speech acquired by the acquisition unit.

(11)

The mobile terminal according to (9) or (10), further including:

a web information acquisition unit that accesses a URL and acquires web information, wherein the control unit controls access to a URL corresponding to an image acquired by the acquisition unit.

(12)

The mobile terminal according to any one of (9) to (11), wherein the control unit generates and displays on the transmissive display unit a summary of content of speech acquired by the acquisition unit.

(13)

The mobile terminal according to any one of (1) to (12), further including:

a telephony unit that makes a phone call;

an acquisition unit that acquires action information related to an action by a person on a phone during a phone call; and a control unit that generates and displays on the transmissive display unit navigation information based on action information acquired by the acquisition unit.

(14)

The mobile terminal according to (13), wherein the acquisition unit acquires gesture information of the person on the phone as the action information, and the control unit displays on the transmissive display unit navigation information based on the acquired gesture information.

(15)

The mobile terminal according to (13) or (14), wherein the acquisition unit acquires speech spoken by the person on the phone as the action information, and the control unit displays on the transmissive display unit navigation information based on the acquired speech.

(16)

The mobile terminal according to any one of (1) to (15), wherein the transmissive display unit includes a base unit rotatable about the casing, a light guide unit, provided on a surface of the base unit, which guides light from an image display element to an exit while totally reflecting the light, and an air layer formed between the base unit and the light guide unit.

(17)

The mobile terminal according to (16), wherein the light guide unit includes a first light guide unit provided on a first surface of the base unit, and a second light guide unit provided on a second surface on an opposite side of the first surface of the base unit, and the air layer includes a first air layer formed between the first surface of the base unit and the first light guide unit, and a second air layer formed between the second surface of the base unit and the second light guide unit.

(18)

The mobile terminal according to (17), wherein the base unit is positioned in a first open state rotated in a first direction about the casing, or a second rotated state rotated in a reverse direction of the first direction, when the base unit is positioned in the first open state, the first light guide unit guides light from the image display element to an exit while totally reflecting the light, and when the base unit is positioned in the second open state, the second light guide unit guides light from the image display element to an exit while totally reflecting the light.

REFERENCE SIGNS LIST 10 mobile terminal
20 casing
20a front face
24 speaker
40 transmissive display unit
41 base unit
42 second display unit
43, 47 light guide plate
44, 48 air layer
45 hinge unit
75 rotation detecting unit
110 system controller

The invention claimed is:

1. An information processing apparatus, comprising:
a casing that includes audio output circuitry, the audio output circuitry being configured to output audio;
a transmissive display configured to be positioned in front of at least one eye of a user, and configured to provide, during a communication using the audio output circuitry, a view of a display on the transmissive display, and a view of an outside world through the transmissive display; and
processing circuitry configured to
convert a speech of the communication into text data,
store the converted text data in a memory,
extract a topic based on content of the text data stored in the memory, and
display information associated with the extracted topic on the transmissive display, wherein the transmissive display includes
a base device rotatable about the casing,
a light guide, provided on a surface of the base device, which guides light from an image display element to an exit while totally reflecting the light, and
an air layer formed between the base device and the light guide.

2. The information processing apparatus according to claim 1, wherein the displayed information includes literal information or image information or a Uniform Resource Locator (URL).

3. The information processing apparatus according to claim 1, wherein the processing circuitry is configured to display another information based on input of the user in accordance with the displayed information.

4. The information processing apparatus according to claim 1, wherein the displayed information includes images of Uniform Resource Locators (URLs) associated with the extracted topic.

5. The information processing apparatus according to claim 1, wherein the transmissive display includes a non-transmissive second display.

6. The information processing apparatus according to claim 1, wherein the transmissive display is attached to a second casing which is movable with respect to the first casing.

7. The information processing apparatus according to claim 1, wherein the processing circuitry is configured to detect a moved state of the transmissive display, and control the display according to the detected moved state of the transmissive display.

8. The information processing apparatus according to claim 1, wherein the processing circuitry is configured to capture an image including an environment in front of the at least one eye of the user during the communication.

9. A method, comprising:
converting, via processing circuitry, a speech of a communication into text data;
outputting audio from a casing that includes audio output circuitry configured to output the audio;
storing, via the processing circuitry in a memory, the converted text data;
extracting, via the processing circuitry, a topic based on content of the text data stored in the memory; and
displaying, via the processing circuitry on a transmissive display, information associated with the extracted topic, the transmissive display configured to be positioned in front of at least one eye of a user, and configured to provide, during the communication, a view of a display on the transmissive display, and a view of an outside world through the transmissive display, wherein the transmissive display includes a base device rotatable about the casing, a light guide, provided on a surface of the base device and, an air layer formed between the base device and the light guide, the method further comprising
guiding light with the light guide from an image display element to an exit while totally reflecting the light.

10. The method according to claim 9, wherein the displayed information includes literal information or image information or a Uniform Resource Locator (URL).

11. The method according to claim 9, wherein the displaying displays another information based on input of the user in accordance with the displayed information.

12. The method according to claim 9, wherein the displayed information includes images of Uniform Resource Locators (URLs) associated with the extracted topic.

13. The method according to claim 9, wherein the transmissive display includes a non-transmissive second display.

14. The method according to claim 9, further comprising detecting a moved state of the transmissive display, and controlling the display according to the detected moved state of the transmissive display.

15. The method according to claim 9, further comprising capturing an image including an environment in front of the at least one eye of the user during the communication.

16. A non-transitory computer-readable medium storing computer-readable instructions thereon which when executed by a computer cause the computer to perform a method, the method comprising:
converting a speech of a communication into text data;
outputting audio from a casing that includes audio output circuitry configured to output the audio;
storing the converted text data in a memory;
extracting a topic based on content of the text data stored in the memory; and
displaying, on a transmissive display, information associated with the extracted topic, the transmissive display configured to be positioned in front of at least one eye of a user, and configured to provide, during the communication, a view of a display on the transmissive display, and a view of an outside world through the transmissive display, wherein the transmissive display includes a base device rotatable about the casing, a light guide, provided on a surface of the base device and, an air layer formed between the base device and the light guide, the method further comprising
guiding light with the light guide from an image display element to an exit while totally reflecting the light.

* * * * *